(12) United States Patent
Morgan et al.

(10) Patent No.: US 12,123,115 B2
(45) Date of Patent: Oct. 22, 2024

(54) TEXTILE COMPONENT PRODUCTION SYSTEMS AND METHODS

(71) Applicant: NIKE, Inc., Beaverton, OR (US)

(72) Inventors: Daniel Morgan, Portland, OR (US); Merav Gazit, Portland, OR (US); Carrie McKnelly, Portland, OR (US); Brad N. Clarkson, Beaverton, OR (US); Travis Davidson, Beaverton, OR (US); Vasilios Fasois, Beaverton, OR (US); Orion Granatir, Beaverton, OR (US); Michael T. Horne, Beaverton, OR (US); Jack Wilson, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/681,339

(22) Filed: Feb. 25, 2022

(65) Prior Publication Data

US 2022/0251742 A1     Aug. 11, 2022

Related U.S. Application Data

(63) Continuation of application No. 16/426,706, filed on May 30, 2019, now Pat. No. 11,293,124.
(Continued)

(51) Int. Cl.
*D04B 1/24*     (2006.01)
*A41H 43/00*    (2006.01)
(Continued)

(52) U.S. Cl.
CPC .............. *D04B 1/24* (2013.01); *A41H 43/00* (2013.01); *D04B 1/102* (2013.01);
(Continued)

(58) Field of Classification Search
CPC ...... G05B 19/4097; G05B 2219/45196; G06F 2113/12
See application file for complete search history.

(56) References Cited

U.S. PATENT DOCUMENTS 3,790,704 A    2/1974   Collomosse et al.
3,844,139 A    10/1974  De Cerjat et al.
(Continued)

FOREIGN PATENT DOCUMENTS

CN    107464156 A    12/2017
EP    3251536 B1     10/2020
(Continued)

OTHER PUBLICATIONS

Guptaa, Deepti, "Design and engineering of functional clothing." Indiana Journal of Fibre & Textile Research 36 (2011): 327-335. https://pdfs.semanticscholar.org/8574/408e4794e7ed04d9cb268b2e9642394a49ce.pdf.
(Continued)

*Primary Examiner* — Grace Huang
(74) *Attorney, Agent, or Firm* — Banner & Witcoff, Ltd.

(57) ABSTRACT

Systems and methods for manufacturing a garment, include: receiving garment design input data for a garment design including data representing a first textile structural unit at a first location and data representing a second textile structural unit at a second location; generating a textile production machine instruction data set based on the garment design input data; forming a first garment using a first textile production machine to include the first textile structural unit and the second textile structural unit; creating revised garment design input data for the garment design based on the first garment based on receiving additional body map data relating to the first garment; generating revised textile production machine instruction data set based on the revised garment design input data; and forming a second garment
(Continued)

using a textile production machine and the revised garment design input data including the changes to the garment design.

20 Claims, 27 Drawing Sheets

Related U.S. Application Data

(60) Provisional application No. 62/677,927, filed on May 30, 2018.

(51) Int. Cl.
*D04B 1/10* (2006.01)
*G05B 19/4097* (2006.01)
*A43B 23/02* (2006.01)

(52) U.S. Cl.
CPC ........ *G05B 19/4097* (2013.01); *A43B 23/025* (2013.01); *D10B 2501/043* (2013.01); *G05B 2219/45196* (2013.01)

(56) References Cited

U.S. PATENT DOCUMENTS

| | | | |
|---|---|---|---|
| 3,983,370 A * | 9/1976 | Caspi | D04B 15/66 66/219 |
| 4,346,366 A * | 8/1982 | Kajiura | G06T 1/0007 700/141 |
| 4,608,642 A | 8/1986 | Shima | |
| 5,163,007 A | 11/1992 | Slilaty | |
| 5,307,283 A | 4/1994 | Sawazaki et al. | |
| 5,388,050 A | 2/1995 | Inoue et al. | |
| 5,557,527 A | 9/1996 | Kotaki et al. | |
| 5,719,777 A | 2/1998 | Kotaki | |
| 5,791,271 A * | 8/1998 | Futamura | D05B 19/08 112/102.5 |
| 5,818,720 A * | 10/1998 | Grigalunas | D03C 19/005 700/133 |
| 5,862,682 A | 1/1999 | Maenaka et al. | |
| 6,233,979 B1 | 5/2001 | Plath | |
| 6,415,199 B1 | 7/2002 | Liebermann | |
| 6,564,118 B1 | 5/2003 | Swab | |
| 6,611,730 B1 | 8/2003 | Stoll et al. | |
| 6,725,124 B2 | 4/2004 | Yan | |
| 6,813,440 B1 | 11/2004 | Yu et al. | |
| 6,947,807 B2 * | 9/2005 | Panebianco | A41H 43/00 700/134 |
| 7,092,782 B2 | 8/2006 | Lee | |
| 7,127,321 B2 | 10/2006 | Kenji et al. | |
| 7,197,371 B2 | 3/2007 | Koichi et al. | |
| 7,203,566 B2 | 4/2007 | Terai et al. | |
| 7,242,999 B2 * | 7/2007 | Wang | G06Q 30/06 700/130 |
| 7,272,462 B2 | 9/2007 | Smedley et al. | |
| 7,385,601 B2 | 6/2008 | Bingham et al. | |
| 7,386,360 B2 | 6/2008 | Noriyuki | |
| 7,437,774 B2 | 10/2008 | Baron et al. | |
| 7,474,936 B2 | 1/2009 | Toshiaki et al. | |
| 7,577,488 B2 | 8/2009 | Okamoto | |
| 7,657,341 B2 | 2/2010 | Lind | |
| 7,664,564 B2 | 2/2010 | Kawasaki et al. | |
| 7,743,476 B2 | 6/2010 | Rock et al. | |
| 7,788,952 B2 | 9/2010 | Morrison | |
| 7,848,841 B2 | 12/2010 | Piana et al. | |
| 8,165,711 B2 | 4/2012 | Brooking et al. | |
| 8,490,436 B2 | 7/2013 | Chung et al. | |
| 8,813,378 B2 | 8/2014 | Grove | |
| 9,241,516 B2 | 1/2016 | Sokolowski et al. | |
| 9,462,838 B1 | 10/2016 | Smith et al. | |
| 9,486,160 B2 | 11/2016 | Russell | |
| 9,635,895 B1 | 5/2017 | Rose et al. | |
| 9,661,886 B1 | 5/2017 | Selvarajan | |
| 9,681,694 B2 | 6/2017 | Ng et al. | |
| 9,858,361 B2 | 1/2018 | Fernandez | |
| 9,980,527 B2 | 5/2018 | Ferrara et al. | |
| 10,228,682 B2 | 3/2019 | Colaianni et al. | |
| 10,310,616 B2 | 6/2019 | Rose et al. | |
| 10,351,982 B2 | 7/2019 | deGuzman et al. | |
| 10,366,175 B2 | 7/2019 | Gupta et al. | |
| 10,889,061 B2 | 1/2021 | Sugano et al. | |
| 10,918,151 B2 | 2/2021 | Mahanty et al. | |
| 10,984,342 B2 * | 4/2021 | Yu | G06N 7/01 |
| 11,164,381 B2 * | 11/2021 | O'Brien | G06F 30/20 |
| 11,293,124 B2 | 4/2022 | Morgan et al. | |
| 2002/0193904 A1 | 12/2002 | Arndt et al. | |
| 2005/0131571 A1 | 6/2005 | Costin | |
| 2005/0267615 A1 | 12/2005 | Lavash et al. | |
| 2006/0212157 A1 | 9/2006 | Watanabe | |
| 2007/0250203 A1 | 10/2007 | Yamamoto et al. | |
| 2012/0072007 A1 * | 3/2012 | Rock | G06Q 50/04 700/132 |
| 2013/0195330 A1 | 8/2013 | Kim et al. | |
| 2013/0269211 A1 | 10/2013 | Deans et al. | |
| 2014/0277663 A1 | 9/2014 | Gupta et al. | |
| 2014/0297020 A1 | 10/2014 | Nishikawa | |
| 2014/0311187 A1 | 10/2014 | Amarasiriwardena et al. | |
| 2015/0033447 A1 | 2/2015 | Riaz | |
| 2015/0366293 A1 | 12/2015 | Clarkson | |
| 2015/0376822 A1 | 12/2015 | Onishi et al. | |
| 2017/0027248 A1 | 2/2017 | McFarlane et al. | |
| 2018/0130112 A1 | 5/2018 | Gerson | |
| 2018/0177249 A2 * | 6/2018 | Piper | A41D 31/24 |
| 2018/0271184 A1 | 9/2018 | Shalev et al. | |
| 2019/0008225 A1 | 1/2019 | Bajaj et al. | |
| 2019/0183189 A1 | 6/2019 | Ng et al. | |
| 2019/0183256 A1 | 6/2019 | Upadhyay et al. | |
| 2019/0281915 A1 | 9/2019 | Levi et al. | |
| 2021/0095403 A1 | 4/2021 | Dion et al. | |
| 2021/0312097 A1 | 10/2021 | Sargent et al. | |

FOREIGN PATENT DOCUMENTS

| | | |
|---|---|---|
| JP | H07166404 A | 6/1995 |
| JP | 2006233387 A | 9/2006 |
| JP | 2011168901 A | 9/2011 |
| JP | 4890036 B2 | 3/2012 |
| WO | 2006/045135 A1 | 5/2006 |

OTHER PUBLICATIONS

Domina, Tanya, Patrick Kinnicutt, and Maureen MacGillivray. "Thermal pattern variations analyzed using 2D/3D mapping techniques among females." Journal of Textile and Apparel, Technology and Management 7.1 (2011). http://ojs.cnr.ncsu.edu/index.php/JTATM/article/view/1083/912.

"A Perfectly Fitting Machine Knitted Sweater of Your Own Design." Materia, materia.nl, Apr. 26, 2017. https://materia.nl/article/perfectly-fitting-knitted-sweater/.

Spice, Byron. Software Automatically Generates Knitting Instructions for 3-D Shapes.: Carnegie Mellon University, cmu.edu, Mar. 29, 2018. https://www.cmu.edu/news/stories/archives/2018/march/3d-knitting.html.

Feb. 14, 2023—(EP) European Patent Convention Article 94 Application No. 19 733 905.4.

Feb. 7, 2023 (JP) Notice of Reasons for Refusal—App 2020-566836.

Oct. 14, 2019 (WO) International Search Report and Written Opinion—App PCT/US/2019/034599, 17 pages.

\* cited by examiner

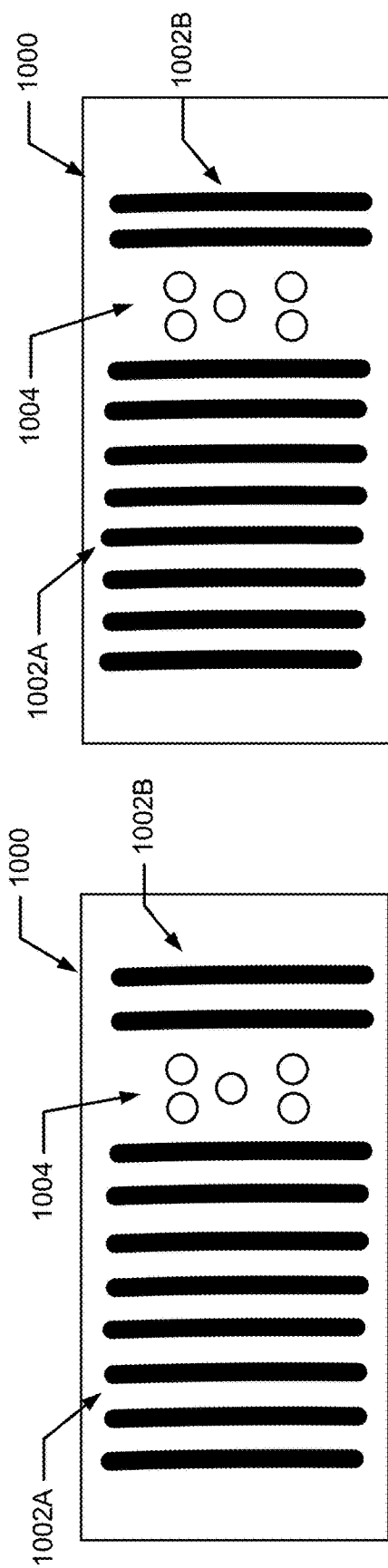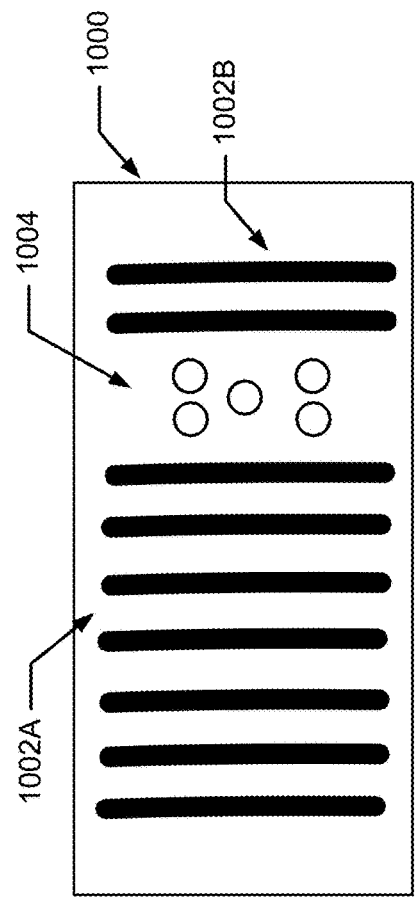
FIG. 10A
FIG. 10B
FIG. 10C

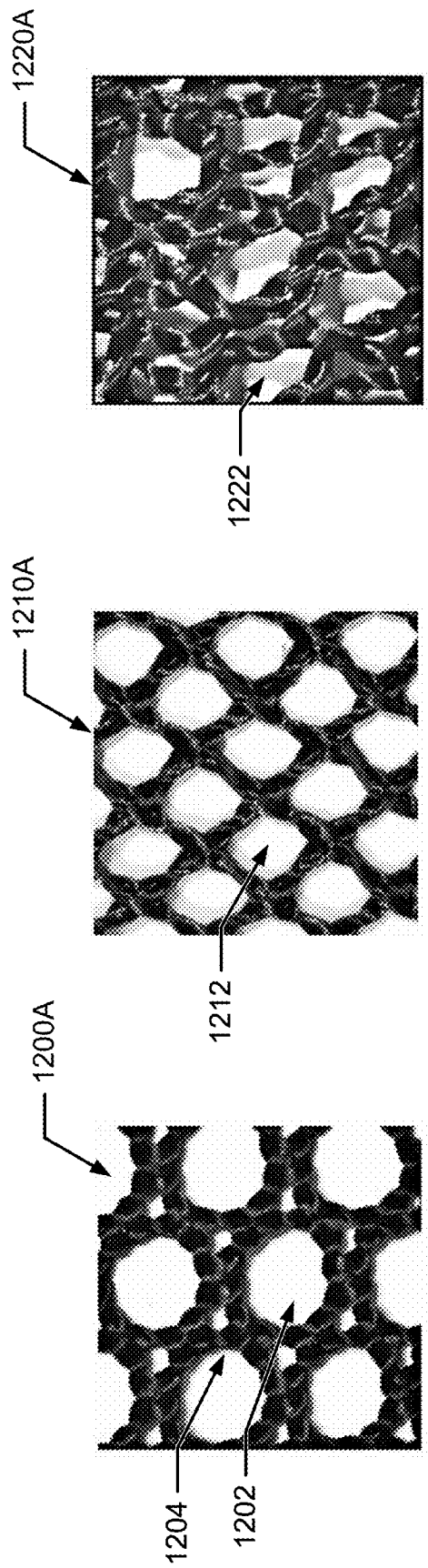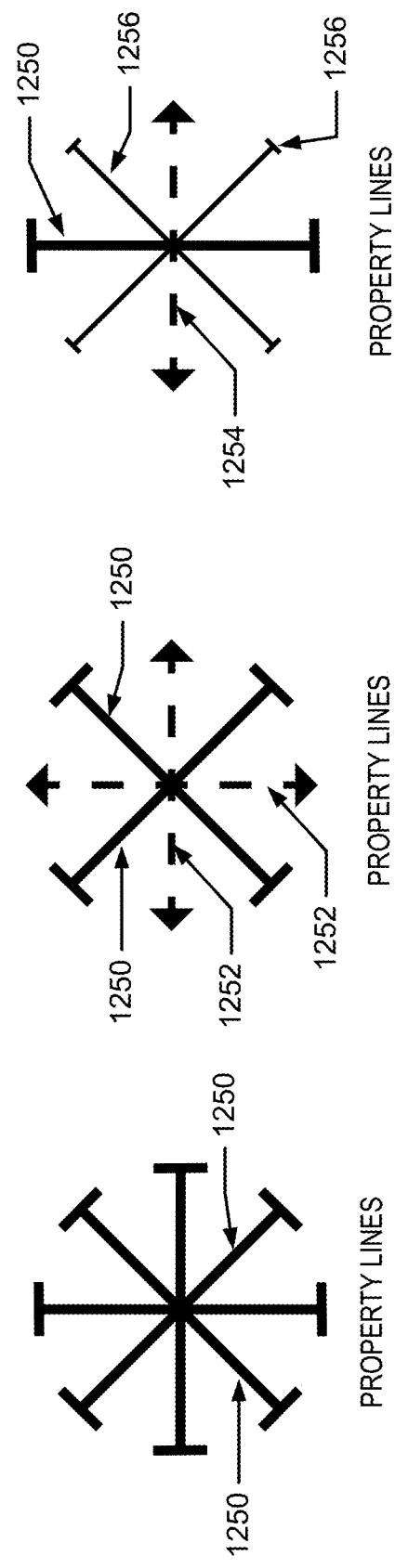
FIG. 12A
FIG. 12B
FIG. 12C

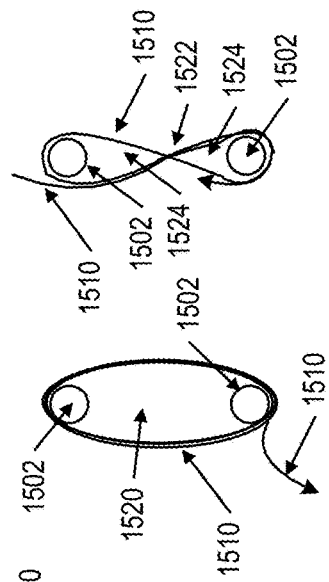
FIG. 16A
FIG. 16B
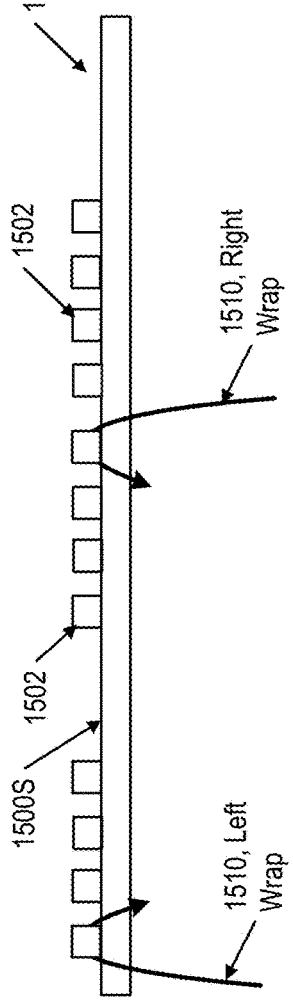
FIG. 17

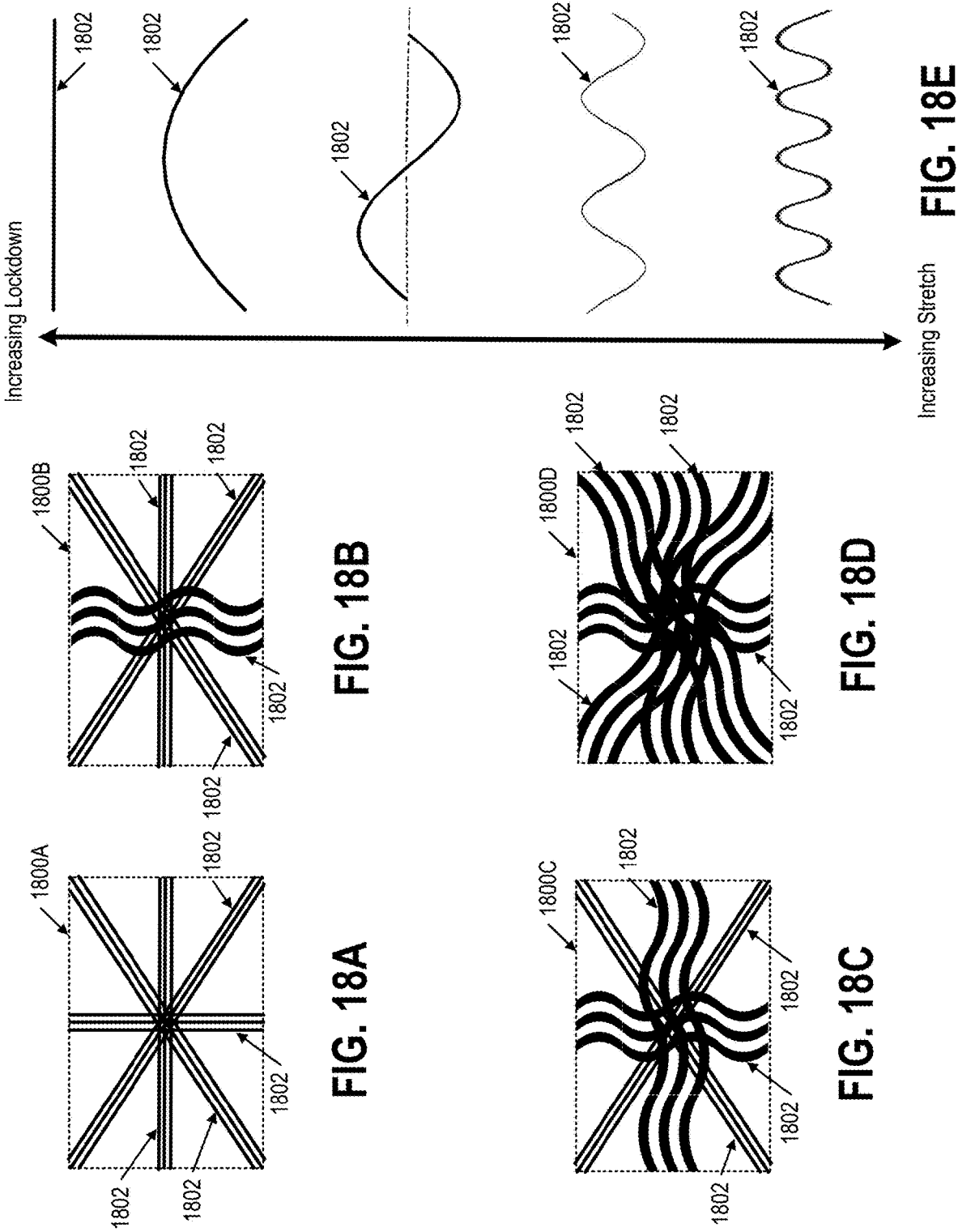

TEXTILE COMPONENT PRODUCTION SYSTEMS AND METHODS

RELATED APPLICATION DATA

This application is a continuation of U.S. application Ser. No. 16/426,706, entitled "TEXTILE COMPONENT PRODUCTION SYSTEMS AND METHODS," filed on May 30, 2019, which is a U.S. Non-Provisional Patent Application based on and claims priority to U.S. Provisional Patent Application No. 62/677,927, filed May 30, 2018, each of which is expressly incorporated herein by reference in its entirety for any and all non-limiting purposes.

Aspects of this invention may relate to subject matter described in: (a) U.S. Provisional Patent Appln. No. 62/015,698 filed Jun. 23, 2014, (b) U.S. patent application Ser. No. 14/747,517 filed Jun. 23, 2015, (c) U.S. patent application Ser. No. 11/059,357 filed Feb. 17, 2005 (now U.S. Pat. No. 9,332,792), (d) U.S. patent application Ser. No. 15/091,847 filed Apr. 6, 2016, (e) U.S. patent application Ser. No. 15/055,129 filed Feb. 26, 2016 (now U.S. Pat. No. 9,867,425), (f) U.S. patent application Ser. No. 15/055,113 filed Feb. 26, 2016, (g) U.S. patent application Ser. No. 15/055,086 filed Feb. 26, 2016, (h) U.S. patent application Ser. No. 15/055,016 filed Feb. 26, 2016, and/or (i) U.S. patent application Ser. No. 15/839,032 filed Dec. 12, 2017. Each of U.S. Provisional Patent Appln. No. 62/015,698, U.S. patent application Ser. Nos. 14/747,517, 11/059,357, U.S. Pat. No. 9,332,792, U.S. patent application Ser. Nos. 15/091,847, 15/055,129, 15/055,113, 15/055,086, 15/055,016, 15/839,032, and U.S. Pat. No. 9,867,425 is expressly incorporated herein by reference in its entirety for any and all non-limiting purposes.

FIELD OF THE INVENTION

The technologies disclosed relate to systems, methods, and tangible, non-transitory computer-readable media storing computer-executable instructions thereon used to design and produce footwear, garments, and/or other products, e.g., including a knitted component, a braided component, a wound component, a woven component, a non-woven component, an embroidered component, and/or a fused filament component, etc. (such as footwear uppers, garments, etc.).
Terminology/General Information First, some general terminology and information is provided that will assist in understanding various portions of this specification and the invention(s) as described herein.

The term "garment" as used herein means a piece of apparel to be worn or any portion thereof that may be joined with one or more other component parts to form the completed garment. Thus, a "garment" includes a panel of material that is incorporated into a completed garment or apparel product.

The term "textile structural unit," as used herein, means a one, two, or three dimensional textile structural component formed in a textile that differs from the one, two, or three dimensional structure forming a largest proportion of the textile's structure and/or that differs from the one, two, or three dimensional structure of the textile in immediately adjacent surrounding areas. "Textile structural units" may be purposefully included in discrete areas of a textile component so as to provide desired properties for that discrete area of the textile component. The textile component and the textile structural units can be formed by any desired textile forming process, such as knitting, braiding, winding, embroidery, weaving, as non-wovens, as fused filaments, etc. When applied to a particular textile forming process, the term "structural unit" may be modified herein to include the type of process, e.g., a "knit structural unit," a "braided structural unit," a "wound structural unit," an "embroidered structural unit," a "woven structural unit," a "non-woven structural unit," a "fused filament structural unit," etc.

The term "knit structural unit," as used herein, means a combination of two or more stitches and/or needle actions in a course direction and/or a wale direction of a knitted component's structure to provide a one, two, or three dimensional structure in the knitted component that differs from the one, two, or three dimensional structure forming a largest proportion of the knitted component's structure and/or that differs from the one, two, or three dimensional structure in immediately adjacent surrounding areas.

Examples of textile "structural units" include, but are not limited to:
- structure forming open holes (e.g., knitted-in open holes, braided-in open holes, open holes formed by a winding process, open holes formed by a braiding process, open holes formed in a weaving process, open holes formed in a non-woven, open holes formed in a fused filament fabrication process, etc.);
- structure forming texture on at least one surface (e.g., knitted-in texture elements, braided in texture elements, texture elements formed by a winding process, texture elements formed by embroidery, texture elements formed by weaving, texture elements formed in non-wovens, texture elements formed in a fused filament fabrication process, etc.);
- pleats;
- ribbed structures;
- areas of increased material thickness (e.g., as compared to a thickness of a surrounding area and/or a thickness of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));
- areas of decreased material thickness (e.g., as compared to a thickness of a surrounding area and/or a thickness of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));
- areas of increased thermal conductivity (e.g., as compared to a thermal conductivity of a surrounding area and/or a thermal conductivity of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));
- areas of decreased thermal conductivity (e.g., as compared to a thermal conductivity of a surrounding area and/or a thermal conductivity of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));

areas of increased air permeability (e.g., as compared to an air permeability of a surrounding area and/or an air permeability of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));

areas of decreased air permeability (e.g., as compared to an air permeability of a surrounding area and/or an air permeability of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));

areas of increased moisture wicking capability (e.g., as compared to a moisture wicking capability of a surrounding area and/or a moisture wicking capability of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));

areas of decreased moisture wicking capability (e.g., as compared to a moisture wicking capability of a surrounding area and/or a moisture wicking capability of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));

areas of increased stretchability (e.g., as compared to a stretchability of a surrounding area and/or a stretchability of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));

areas of decreased stretchability (e.g., as compared to a stretchability of a surrounding area and/or a stretchability of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));

areas of increased durability (e.g., as compared to a durability of a surrounding area and/or a durability of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));

areas of decreased durability (e.g., as compared to a durability of a surrounding area and/or a durability of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));

areas of increased material density (e.g., as compared to a material density of a surrounding area and/or a material density of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));

areas of decreased material density (e.g., as compared to a material density of a surrounding area and/or a material density of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));

areas of increased hydrophobicity (e.g., as compared to a hydrophobicity of a surrounding area and/or a hydrophobicity of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.));

areas of decreased hydrophobicity (e.g., as compared to a hydrophobicity of a surrounding area and/or a hydrophobicity of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.)); and areas having a surface texture that differs from a surface texture of a surrounding area and/or from a surface texture of a largest proportion of the continuous textile structure (e.g., the continuous knitted structure, the continuous braided structure, the continuous wound structure, the continuous embroidered structure, the continuous woven structure, the continuous non-woven structure, the continuous fused filament structure, etc.).

The various "areas" having different characteristics or properties, as described above, may be formed, at least in part, by changing a material in the textile structure (e.g., the knit or other structure) at the various areas and/or by using various of different production techniques (e.g., combinations of stitches and/or needle actions during a knitting process when knitting the various areas). In knitting embodiments, the combinations of stitches and/or needle actions may include using one or more of the following over the course direction and/or the wale direction of a knitted component's structure: (a) knit stitches or knit actions; (b) held stitches or hold actions; (c) tuck stitches or tuck actions; (d) float or miss stitches or float or miss actions; and/or (e) transfer stitches or transfer actions. The term "continuous knitted structure," as used herein, means a one piece knitted component in which the "knitted structural unit" is formed by knitting in a knitting process. The term "continuous textile structure," as used herein, means a one piece textile component in which the "textile structural unit" is formed by a single process (e.g., a braiding process, a winding process, an embroidery process, a weaving process, a nonproduction process, a fused filament fabrication process, etc.).

BRIEF DESCRIPTION OF THE DRAWINGS

The present technologies disclosed are illustrated by way of example and not limited in the accompanying figures in which like reference numerals indicate similar elements and in which:

FIGS. 8A-10C provide various examples of design changes that may be entered and application and use of systems and methods in accordance with one or more aspects of the present disclosure;

FIGS. 12A through 12E provide various examples of braid structural units and example properties thereof, e.g., for inclusion in a structural unit library for braided constructions;

FIGS. 16A and 16B illustrate additional potential features of winding equipment and processes;

FIG. 17 illustrates an example data structure representation for garment design input data and/or revised garment design input data that may be used in accordance with one or more aspects of the present disclosure for winding examples; and FIGS. 18A-18J illustrate various features and provide information relating to fused filament processes in accordance with some examples of this technology.

DETAILED DESCRIPTION OF THE INVENTION

Figure 1:
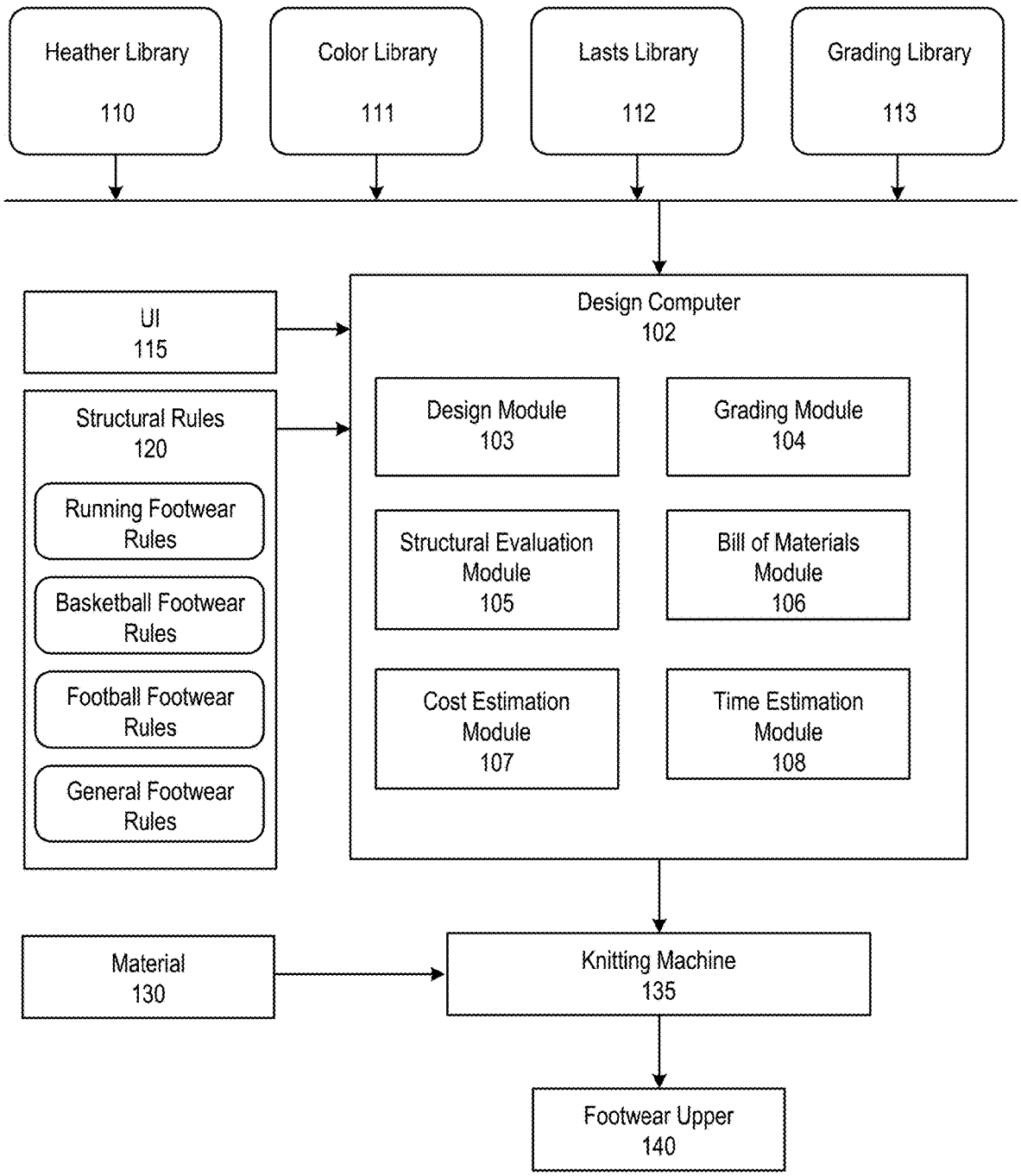
FIG. 1 illustrates a system for designing footwear, in accordance with one or more aspects of the present disclosure.

In general, as described above, some aspects of the present disclosure relate to systems, methods, and tangible, non-transitory computer-readable media storing computer-executable instructions for designing consumer products, such as articles of footwear, garments, etc.

Any desired type of footwear design data may be controlled, altered, or customized by a user of systems and methods according to aspects of the present disclosure, such as: a color of a portion of the article of footwear (e.g., the various upper portions or elements). If desired, systems and methods according to at least some examples of the present disclosure further may allow a user to select from a variety of materials or other characteristics for various portions of the article of footwear, such as different upper material(s); upper thickness(es); upper stiffness characteristics; arch support characteristics; impact-attenuation characteristics; size, orientation, and/or location of openings or windows in the upper; patterns of openings provided in the uppers; laser cutting designs and/or characteristics; laser etching designs and/or characteristics; etc.

While described above in conjunction with design of articles of footwear, aspects of the present disclosure also may be used for design of other consumer products, such as articles of apparel, etc.

In the footwear example, a user may be permitted to select various features of the footwear and manipulate the visual image of the footwear from a software application that is displayed on the user interface or display screen. The user interface may display one or more tools for changing aspects of or otherwise manipulating various design data of the footwear, as described herein. Users may select any desired features of knit structural units or other textile structural units, e.g., of the types described above. The same or similar features and/or tools may be provided in systems and methods for designing articles of apparel as well as other consumer products.

Users may use computing devices to access the design application and/or website. The computing devices establish a communication channel within a network and communicate with a messaging server system (comprising one or more server computers) that provide interactive design features used to change the design of a product. As will be disclosed in more detail below, any desired communication link and communication protocol may be used to provide and control the data exchange between computing devices and the system. Users may use a computing device to connect to the online design system via a network, such as the Internet, a local area network (LAN), a wide area network (WAN), or the like. Users may connect their computing devices to the system via any communication channel, such as website portals and applications from various internal and/or external sites that link to the portal of the manufacturer.

Any desired types of computing devices may be used without departing from the present disclosure, such as any computing device capable of establishing a networked connection and/or a peer-to-peer connection and capable of providing the necessary display, user interface, and input capabilities, as will be described in more detail below. Some more specific examples of computing devices that may be used in systems and methods in accordance with at least some examples of the present disclosure include, but are not limited to: desktop computers, personal computers, laptop computers, palmtop computers, handheld computers, cellular telephones, any other mobile devices or smartphones, personal digital assistants, computer workstations, televisions, and the like.

Computing devices that may be used in systems and methods in accordance with examples of the present disclosure may include one or more input devices and a data processing system (e.g., including one or more microprocessors). Examples of input devices that may be included with the computing devices include, but are not limited to conventional input devices, such as: a keyboard (hard keyboard or soft keyboard); a mouse, trackball, rollerball, touchpad, or other pointing device; a stylus or other pen-type input device (e.g., for a tablet PC type computing device); a disk drive; a USB port; a network connection; a joystick type controller; a telephone connection; an Ethernet connection; voice recognition capabilities; etc. Also, the computing devices may have "touch screen" capabilities, such that a user input data into the computing device by physically touching the screen of the display with the user's fingers or a selection device, such as a stylus. Additionally, any desired type of display device may be provided for use in conjunction with the computing devices of systems and methods according to aspects of the present disclosure, including display devices integrated with the computing device itself or display devices separate from the computing devices but in communication therewith, such as projector displays, separate monitor displays.

FIG. 1 illustrates a system for designing and manufacturing footwear uppers. A computing device, such as design computer 102 may be programmed with software modules that perform various functions when executed by at least one processor. Software includes computer-executable instructions that may be stored on at least one tangible non-transitory computer-readable medium, such as a solid state or magnetic memory.

The design computer 102 may be connected to a network (not shown) in any desired manner without departing from aspects of the present disclosure, including in conventional manners that are known and used in the art, such as any conventional wired or wireless connection and using any network connection protocol. Systems and methods in accordance with examples of the present disclosure also will provide a user interface display on the user's computing device. This interface will allow the user to see the subject matter of the design effort and will allow the user to introduce his/her input to the design effort. The user interfaces on various devices will be provided and controlled by the user's computing device and/or by the server system, and data for generating, maintaining, and receiving input through the user interfaces will be generated and provided via computer readable media included as part of or associated with the computing device and/or the server system. Examples of such computer readable media include, but are not limited to: computer-readable memories, both internal to a computer (e.g., hard drives) or separable from the computer (such as disks, solid state or flash memory devices, data available over a networked connection, etc.), including any type of computer readable media that is conventionally known and used in the computer arts.

A color library 111 may contain various color values. Individual color values may be arranged in a database, such as a FileMaker Pro database. In one embodiment, the color values have four channels such as CMYK color values. In another embodiment, the color values have three channels such as RGB color values. The individual color values may correspond to the colors of various materials (e.g., yarn) that are in supply or available to the manufacturer of the footwear upper. As another example, heather library 110 may be connected to design computer 102 via the Internet. The heather library may contain various heather patterns that may be created by one or more knitting machines (or a structural library, e.g., with textile structural units for other textile production machines, such as braiding machines, winding machines, embroidering machines, weaving machines, nonwoven textile production machines, fused filament fabrication machines, etc.) available to the manufacturer of the footwear upper. A lasts library 112 may contain lasts of various shapes and forms. The last library may also store data files corresponding to base footwear designs. A grading library 113 may contain a collection of previously graded uppers. The collection may identify features of the footwear, such as locations of structures and other attributes along with modifications that were made to grade a base design for use with a range of shoes sizes.

As will be described in more detail with respect to FIG. 2A, design websites, interfaces, and/or applications as described herein may display various patterns or models available for custom design, e.g., in one portion of an interface display. These various different models of the product (footwear) may include template or "base" models that are available for a user to select as part of the design process. Such "base" models or templates may be added to or changed based on the user's selections during the design process.

Some of the components shown in FIG. 1 may communicate data to and from design computer 102 during a design session. For example, UI 115 may establish a communication channel with design computer 102 to provide a user interface for customizing or modifying a footwear design. As another example, structure rules component 120 may provide design computer 102 with data relating to one or more structural rules associated with the physical and/or structural integrity required for a footwear upper to be manufactured and the corresponding base footwear design. As will be discussed in more detail, these structural rules may place certain limitations on a user's ability to modify certain aspects of the footwear design during a design session in order to maintain the structural integrity of the footwear upper when manufactured and for use by a wearer. In some aspects of the present disclosure, the structural rules associated with the physical and/or structural integrity required for a footwear upper may vary based on the type of footwear (e.g., running footwear, basketball footwear, football footwear, etc.).

Design computer 102 may contain various modules, including a design module 103 for processing various design changes made to a footwear design via user interface 115. Design module 103 may also render images of the footwear design in accordance with the processed design changes. Design computer 102 may include a grading module 104 for processing and determining changes that may be applied to a footwear design based on a grading change (e.g., increase or decrease in footwear size). For example, grading module 104 may extract information associated with a base footwear design and compare that information to data stored in grading library 113 to render a new base design for a different footwear grading. In some embodiments, grading module 104 may recommend one or more design changes to a base footwear design in view of processed grading information.

Design computer 102 may include a structural evaluation module 105 for processing data to determine whether design changes made to a footwear design via user interface 115 are acceptable. For example, structural evaluation module 105 may extract information associated with a base footwear design and compare that information with data from structural rules component 120 to determine whether a design change conforms to the predetermined structural rules and/or physical limitations associated with the base footwear design and/or knitting machine used to manufacture the footwear upper. In some aspects of the present disclosure, the evaluation module 105 may operatively communicate with a database (or other suitable form of storage) storing a plurality of predetermined structural integrity characteristics associated with each of base footwear designs available for selection by the user.

Design computer 102 may include a bill of materials module 106 for processing data relating to the availability of the various materials that may be utilized for manufacturing footwear upper 140 in accordance with the footwear design. Design computer 102 may extract information associated with a base footwear design and compare that information with data relating to a current supply or availability of material 130 to determine whether a requested design change is acceptable.

Design computer 102 may also include a cost estimation module 107 for processing data relating to the cost of manufacturing upper 140 based on the footwear design. Design computer 102 may extract information associated with a footwear design and compare that information to data collected by and/or stored in cost estimation module 107 to calculate a cost to manufacture footwear upper 140 based on the footwear design, and to determine whether the cost exceeds any predefined cost thresholds. The cost estimation module 107 may recommend one or more design changes to the footwear design to reduce the estimated cost below the predefined cost threshold. Similar features may be used to recommend one or more design changes to the footwear design to improve the "sustainability" of the design (e.g., to suggest use of renewable materials with similar properties to a selected material, suggest ways to reduce material consumption while achieving similar properties, etc.).

Design computer 102 may also include a time estimation module 108 for processing data relating to the amount of time needed to manufacture upper 140 based on the footwear design. Design computer 102 may extract information associated with a footwear design and compare that information to data collected by and/or stored in time estimation module 108 to calculate an amount of time required to manufacture footwear upper 140 based on the footwear design, and to determine whether the time exceeds any predefined time thresholds. The time estimation module 108 may recommend one or more design changes to the footwear design to reduce the estimated manufacturing time below the predefined time threshold. In some aspects of the present disclosure, an interface or sub-interface may be displayed to a user during a design session depicting the amount of time required to manufacture the footwear upper in view of the current footwear design. As the user modifies the footwear design, the interface (or sub-interface) may be updated to reflect an updated amount of time required to manufacture the footwear upper.

Design computer 102 may also include a variety of interface units and drives for reading and writing data or files. Exemplary interface units and drives include a keyboard, pointing device, microphone, pen device, touchscreen or other input devices.

As discussed above, some of the components shown in FIG. 1 may be connected to each other via a network, such as a local area network (LAN) or a wide area network (WAN). For example, color library 111 may be connected to design computer 102 via the Internet. In another example, design computer 102 may transmit knitting instructions to knitting machine 135 in the form of an encrypted file via the Internet. The system shown in FIG. 1 may include conventional network components (not shown), such as switches, wireless access points and routers to connect the components shown.

Various features of user interfaces generated by a computing device for accepting user input and providing a user with information regarding the design will be described in more detail below. Those skilled in the art will appreciate that the following description and the attached drawings merely represent examples of potential features, functionality, arrangement of interface components, orientation of interface components, combinations of interface components, and the like, of systems, methods, and user interfaces in accordance with one or more aspects of the present disclosure.

Additional aspects of the present disclosure relate to user interfaces provided on computing devices that allow users to design articles of footwear (or other consumer products). The user interfaces may include elements and features that allow use and/or activation of any of the features and/or functionality described above and/or any of the features and/or functionality described in more detail below.

As some more specific examples, aspects of the present disclosure relate to computer readable media including computer executable instructions stored thereon for generating a user interface for a footwear design session on a computer controlled display device. This user interface may include, for example: (a) a first display portion including at least one rendering of an article of footwear; (b) one or more selector elements (such as a pointer or cursor) that allow a first user to select a portion of the article of footwear; (c) an indicator indicating what portion(s) of the article of footwear has been selected via an individual selector element (such as text, icons, pictures, animations, etc.); and (d) a first element for producing a change in an appearance of the rendering of the article of footwear in the first display portion based on input generated by the first user. The first element (or at least some element of the interface) may include features like a color palette or color menu that allows users to change a color of a selected portion of the article of footwear and/or a component of the article of footwear (e.g., knit material); one or more orientation elements that allow users to change an orientation of the article of footwear as rendered in the first display portion; one way, two way, or multi-way user communication elements or features (such as textual input and display panel(s), instant messaging capabilities, audio and/or video communication capabilities, etc.); etc. The user interface further may include an input portion through which the first user can input data used to set up a collaborative footwear design session with a second user (or another user).

Any one or more of these features may be provided in systems and/or methods for designing articles of apparel and/or other products.

Given this general background and information, more detailed information regarding specific examples of systems, methods, computer-readable media, and user interfaces in accordance with the present disclosure will be described in more detail below. It should be understood that this more detailed description relates to various specific examples of the present disclosure and their features and functionality, and this description should not be construed as limiting the scope of the present disclosure.

In at least some aspects of the present disclosure, a design session may be launched or initiated from a user's on-line shopping venture. FIG. 2A illustrates an example interface for modifying a footwear design in accordance with one or more aspects of the present disclosure. As noted in more detail below, during the creation of a base footwear design, a user may modify the base footwear design based on a variety of user selections during the design process, including the creation of certain design features. After a base footwear design has been created and/or selected, the user may customize the footwear design based on a variety of user selections, including the selection of knit structures, materials, and colors that may be applied to the footwear design.

Figure 2A:
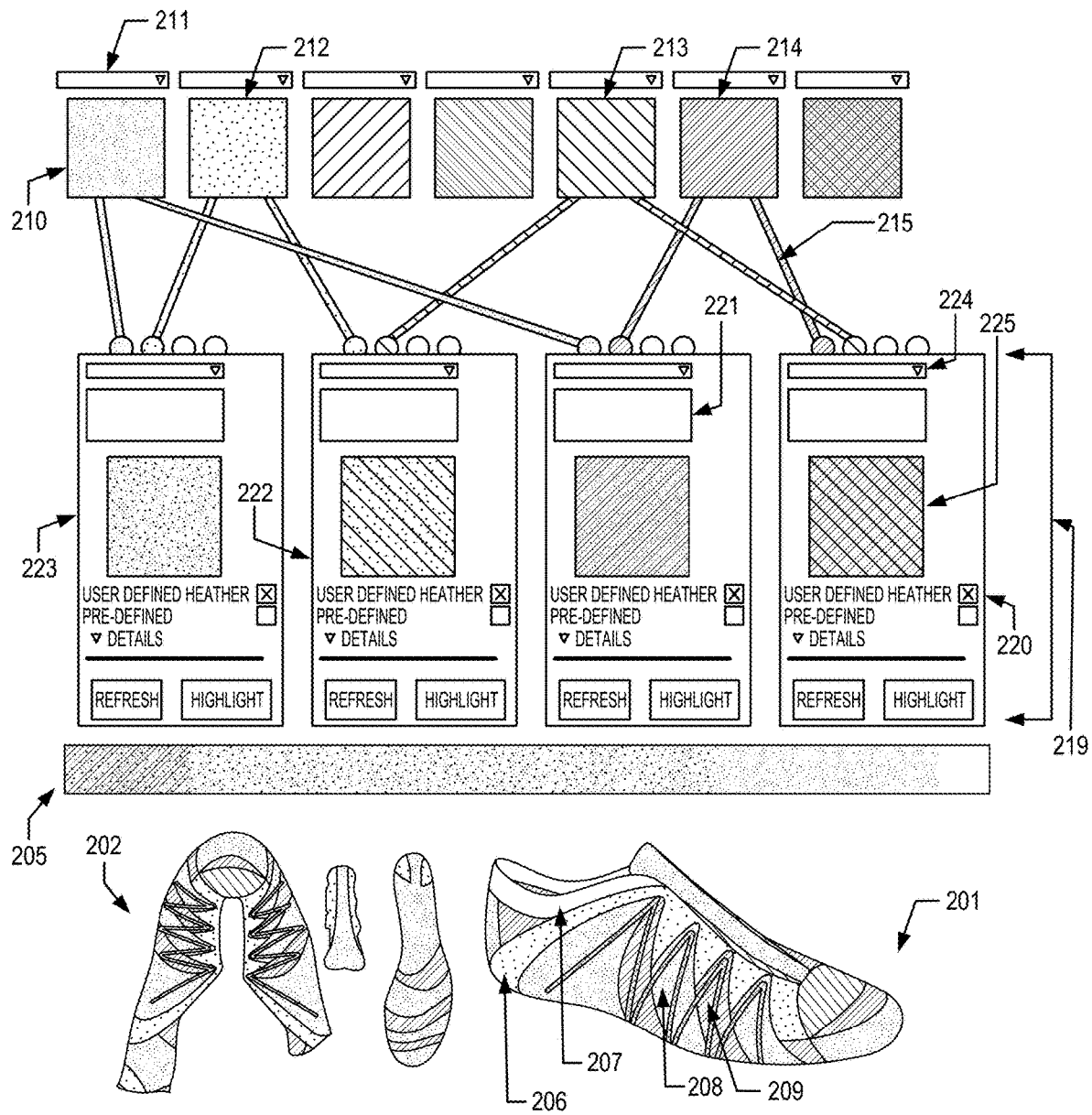
FIG. 2A illustrates an example interface for designing footwear, in accordance with one or more aspects of the present disclosure.

Initiation of a design session may result in the launch of a customization webpage or website or a customization application program or software, e.g., to create an example user interface screen 200 like that shown in FIG. 2A. Also, initiation of a design session may result in generation of a Customization Session Identification Number (e.g., a unique "Session ID") for the session (e.g., by a server or other computing device that may be in control of the session and the transfer of data relating to the session).

In some aspects of the present disclosure, user interface 200 may be generated by computing device 102. User interface 200 may be configured to have the same functionality as user interface 115. User interface 200 may include various customization features, in any desired arrangement, orientation, or display, without departing from the scope of the present disclosure.

As will be discussed in further detail with reference to FIG. 3, the user interface 200 may correspond to and/or simulate the physical layout and operation of knitting machine 135 so as to provide the user with the impression that they are physically designing and/or manufacturing the footwear upper in accordance with the footwear design. Such a layout is intended to ease the cognitive burden on the user when associating the relationship between the availability and/or supply of material 130, the physical limitations of knitting machine 135 used to manufacture footwear upper 140, and the limitations on design choices in order to maintain the structural integrity of upper 140.

The software for generating the user interface may reside on computer readable media present on or available to the computing device or server system. Alternatively, if desired, the software, or at least some portion(s) thereof, may reside on more than one computing device or server system. The sever system may be operated and maintained by the same organization(s) or individual(s) that operate and maintain the computing device and/or network, or the server system may be operated, controlled, and maintained by a party separate from any or all of these entities. As some more specific examples, the server system may be operated and maintained (and the user interface software also may be operated and maintained) by one or more entities whose products are being marketed through the design systems and methods described below (e.g., a manufacturer, a vendor selected by a manufacturer or retailer, etc.).

In some aspects of the present disclosure, and as will be described in more detail below, the user interface 200 may include a portion in which the product being customized appears (e.g., portions 201, 202), a "color palette" portion for selecting colors for various parts (e.g., portion 210), one or more controllers for changing the appearance or view of the product in portions 201 (such as rotation controls, zoom-in, zoom-out, change in views shown, etc.), an "undo" control (to eliminate the last action or design change), a "redo" control (to re-do a previously erased action or design change), a cost information panel, and a product design information panel. While the product design information may be provided in any desired manner without departing from aspects of the present disclosure, the product design information panel (not shown) may provide information about the various portions of the article of footwear being designed, such as color information, size information, material information, etc.

A user interface, such as user interface 115 or user interface 200, may display various lasts that are available when creating the base footwear design, e.g., in a portion of the interface display, such as display 201. The various lasts may be retrieved from a last library, such as library 112. When a user selects a last, the user interface may provide the user with an option to create a "base" footwear design corresponding to the selected last (e.g., same or similar size, shape, form, etc.). Such base footwear designs may be edited or modified based on user's selections during the design process. For example, the user may draw or paint a variety of features onto the base footwear design to delineate a "styling" of the footwear design. As will be appreciated, the user interface may provide the user with a variety of tools to create and/or modify various features of the base footwear design. A user may store a created and/or modified base footwear design in memory.

If desired, the user may retrieve from memory a predefined base footwear design. For example, base footwear designs may be stored in data files in the memory of design computer 102. These base footwear designs may include footwear designs that were previously created by the user or other users, and that are available for the user to select as the first step of the design process.

The base footwear design serves as the blueprint for a knitting machine, such as knitting machine 135, to manufacture a footwear upper. As will be discussed further below, each base footwear design may include data defining various structural and/or physical limitations of the corresponding footwear upper, such as upper 140, that may limit a user's design choices. Accordingly, while a user may modify or edit a base footwear design during the design process, certain design choices may be restricted during the design process or must be accepted by design computer 102 before the design change will take effect. Such design limitations provide a "real-world" perspective for a user or designer when making design choices that may affect the manufacturing process of the footwear upper.

The user interface provides a realistic basis for delineating limitations in certain design choices due to a variety of factors, including the physical limitations of a knitting machine. For example, a user may be limited to the amount of detail (e.g., point size of a digital paintbrush) that may be used when creating or modifying features of a base footwear design because the user interface may not permit the user to design features that are too small to knit by a knitting machine, or that may be unrealistic given limitations during the manufacturing process (e.g., cost, time, etc). In one embodiment each stitch of a knit pattern cannot be displayed by fewer than one pixel. This "real-world" perspective provided by the user interface may create efficiencies and reduce the amount of work required during the design and manufacturing process of footwear uppers, may result in faster iterations of footwear designs created by a user during the design and manufacturing process, and may enable more accurate samples of footwear designs that are created during the design and manufacturing process.

Other features and functionality may be provided in the user interface, if desired, without departing from the present disclosure. The following features and functionality may be provided in some manner via the interface: the ability to directly return to a previously viewed interface screen, the ability to save the design, the ability to print the design, the ability to store this design at a location for sharing with others (which may launch an interface that allows one to identify specific persons, classes of persons, or groups (public or private) with whom the design may be shared), the ability to "return to the default" design (e.g., to the blank product on which the customization process was initiated for this product or some other intermediate default design (optionally selected and stored by the user), and the ability to exit or quit the session.

Another feature that may be included in the computer interface is a "last action" capability, which allows users to view the last several steps in the design session (and possibly to see a list of all steps in the design session), more details regarding the individually displayed step (e.g., more specifics about the color, position, size, material or orientation selections, etc.), or the like. The "last action" tool may allow users to select any desired individual step for further action, such as an "undo" action (to undo that step), a "view" change action (e.g., to cause the interface to highlight the change made at that step in the user's views), a reselection action (e.g., to cause the interface to reselect the same part for further action), etc.

Another potential feature that may be included in systems, methods, and computer interfaces in accordance with at least some examples of the present disclosure includes a "cost variations" icon (although other interface elements may be used to activate this functionality). User selection of this interface element may provide users with information and an opportunity to change various features of the designed shoe to either increase or decrease its costs (optionally, with little or no performance change, although any anticipated effect on performance may be displayed for the user to consider). For example, interaction with this interface element may provide the costs associated with a design change made to the base footwear design. As a more specific example, a change in material and/or arrangement of materials for some portion(s) of the upper may make the shoe more comfortable, more stable, and/or otherwise affect its performance characteristics. As another example, the interface may advise the user of the costs associated with adding another design element or feature to the shoe (e.g., changing the knit structure of the upper, adding additional knit material types or colors to the upper, etc.) or changing an existing design element or feature (e.g., changing sizes of various design elements, changing materials, etc.). The cost change associated with eliminating or modifying a design element or feature also may be provided. Systems, methods, and computer interfaces according to one or more aspects of the present disclosure may display a list of various options to the user with the cost differential associated therewith, or in some other manner make this type of cost variation information available to the user. Similar features may be used to recommend one or more design changes to improve the "sustainability" of the design (e.g., to suggest use of renewable materials with similar properties to a selected material, suggest ways to reduce material consumption while achieving similar properties, etc.).

Referring back to FIG. 2A, in this illustrated example, the user interface 200 includes a display portion 201 in which a 3D view of the footwear design appears, a display portion 202 in which a "lay-flat" 2D view of the footwear design appears, a portion 219 representing the one or more knit structures for the footwear design (e.g., knit structures 221-223), a drop down listing 224 for selecting the knit structure, a portion 225 representing a "material swatch" that displays a texture image representing the knit structure based on the one or more color values selected for the material (e.g., yarn construction) comprising the knit structure, a grayscale 205 indicating where various knit structures correspond to specific "zones" (or areas) on a mapping or rendered image of the base footwear design, a "color picker" or "color palette" portion 210 for selecting colors for the various materials and/or knit structures that may comprise the footwear design.

The user interface may also include one or more drop-down listings 211 for selecting the various color options (or color values) for the color palette, and a color vector 215 indicating which color options have been assigned to one or more knit structures for the footwear design. The color palette 210 may identify the various colors of knit materials selected by the user to be incorporated in the footwear design. For example, as illustrated in FIG. 2A, a first portion of color palette 210 corresponding to menu 211 is green thus indicating that a green knit material will be incorporated into the footwear design. Similarly, the respective color for each portion of the color palette may represent the corresponding color of the knit material used for designing and manufacturing the article of footwear (e.g., portion 212 indicates a light-green color has been selected; portion 213 indicates a red color has been selected; portion 214 indicates a yellow color has been selected; etc.).

Changes to various portions of the footwear design may be made in any desired manner without departing from the scope of the present disclosure. For example, a user might first use the pointer to "select" a knit structure associated with some specific zone (or area) of the base footwear design. Once selected, the user can make changes to the knit structure. For example, to change color of the knit structure, first the user may move the pointer over the depiction of the desired part in the display portion (e.g., drop-down listing 211) and "click" a mouse button (or other input device) to "select" that part. This selection action may cause the interface to display a listing of available color options (e.g., color values) that may be applied to a knit structure. Each color option in the listing may also have a specific color name or color reference number. In some aspects of the present disclosure, the system may limit the number of available colors (and/or other design choices) that may be applied to the footwear design. Additionally or alternatively, this selection action may cause the interface to highlight a corresponding part of the footwear in some manner, such as by enlarging it, coloring it differently, or by bolding the external boundary of it.

When a color option has been selected, the user may associate the color option with a knit structure by drawing a color vector (e.g., color vector 215) from a portion of the color palette (e.g., portion 214) to a knit structure. One or more color vectors may be drawn from a particular portion of the color palette to one or more knit structures in a manner permitted by the base footwear design without departing from the scope of the present disclosure. A user may be limited to a predetermined number of color options that may be associated with a particular knit structure based on rules provided by structural rules component 120, or other components in the system illustrated in FIG. 1. In some aspects of the present disclosure, a particular footwear design may be associated with particular structural rules based on the manufacturing process to create the article of footwear utilizing the footwear design. For example, the structural rules associated with a first footwear design template may be configured to permit a knit structure to include a predetermined number of colors.

Another example feature of systems, methods, and computer interfaces in accordance with at least some examples of the present disclosure relates to a "cost" or "pricing" box. This element of the user interface tracks the cost of the article of footwear in its present design state. As one or more features of the shoe are designed or changed, this may cause the cost of the shoe to change somewhat (e.g., if more expensive materials are used, if a large amount of customization is requested, if additional manufacturing steps or different manufacturing techniques are required, etc.). The interface may maintain a price display so that the user can be aware of which changes to the design have caused a shift in price, and the user may be better able to control the final price of the product.

As noted above, the various color options available to a user in color palette 210 may correspond to the various materials 130 (e.g., yarn construction) that are available for manufacturing footwear upper 140. Accordingly, a user may be limited to the number and/or types of color options that may be used for a footwear design and/or associated with a particular knit structure based on data provided by bill of materials module 106, other components illustrated in FIG. 1, or another computing device.

User design choices may also be limited based on the time and/or cost estimated to manufacture the upper in accordance with the corresponding footwear design. After associating one or more color options with a knit structure, the material swatch 225 may display a texture image for the knit structure showing the updated color effects. The user may have the option of rendering an updated 2D view and 3D view of the footwear design during the design session. This may be accomplished by selecting a "render" icon on interface 200 (not shown). Additionally or alternatively, the user interface may automatically update portions 201 and 202 to display the footwear design with updated color effects and other design changes.

As another example, a user may have the option of changing the heather pattern associated with a knit structure. The user may have the option of selecting from one or more pre-defined heathers stored in heather library 110, or the user may design new heather patterns for the knit structure. To change the heather pattern for the knit structure, the user may move the pointer over the depiction of the desired part in the display portion of the structure and "click" a mouse button (or other input device) to "select" the desired heather option. This selection action may cause the interface to display a listing of available pre-defined heather options that may be applied to the corresponding knit structure. A user's ability to create or modify a heather pattern may be limited by the structural and physical limitations of an available knitting machine utilized for manufacturing the article of footwear (or other product).

As yet another example, a user may have the option of adding or modifying knit structures for a footwear design. A user may modify a "zone" of the footwear design associated with a particular knit structure by using the pointer to "select" the knit structure. Once selected, the user may change the position of the knit structure with respect to grayscale 205 by "dragging" the knit structure to a desired position along grayscale 205. As will be discussed in further detail with reference to FIGS. 2B-2D, each color reference along grayscale 205 may indicate where the different knit structures correspond to specific "zones" (or areas) on a rendering or mapping of the base footwear design. After the knit structure is placed in a new position along grayscale 205, display portion 201 and display portion 202 of interface 200 may reflect the change in knit structures and corresponding design properties.

The portions of a user interface representing knit structures (e.g., knit structures 220-223) may be positioned along a grayscale, such as grayscale 205 in user interface 200. As will be appreciated, the grayscale may provide a color reference corresponding to the various zones on an image of the base footwear design. For example, as illustrated in portions 201 and 202, the user interface 200 may depict a rendered image of the base footwear design that includes a grayscale mapping based on the positions of knit structures 220-223 along grayscale 205. As illustrated by elements 230-233, one or more color references on the grayscale (e.g., "darker grey," "dark grey," "grey," "light grey," etc.) may correspond to specific zones on (or portions of) the rendered image of the base footwear design, and as will be explained in more detail below, a knit structure may be associated with one or more particular zones on the base footwear design. Each knit structure assigned to a zone(s) of the base footwear design may have its own unique pattern, heathering, coloring, and other characteristics.

In some aspects of the present disclosure, by positioning a knit structure adjacent to (or in alignment with) a particular color reference on grayscale 205, the zone (or area) of the base footwear design associated with that color reference may adopt the design properties (e.g., color, heather, etc.) of the knit structure. For example, as illustrated in FIG. 2A, the "darker grey" reference of grayscale 205 is located toward the leftmost portion of the grayscale. Additionally, various zones of a footwear design may be illustrated in portions 201 and 202 of user interface 200.

For example, the darker grey reference of grayscale 205 may be associated with a first knit structure and further indicate (or correspond to) a first zone of the footwear design depicted in portion 201. In this example, as depicted by element 209 in FIG. 2A, the first zone of the footwear design is illustrated by the darker grey portions of the footwear design. The first knit structure adjacent to (or in alignment with) the darker grey reference of grayscale 205 may cause the first zone of the footwear design to inherit the features, properties, and/or characteristics of the first knit structure. Similarly, positioning a second knit structure adjacent to (or in alignment with) the darker grey reference of grayscale 205 may cause the first zone of the footwear design to inherit the features, properties, and/or characteristics of the second knit structure.

As another example, the dark grey reference of grayscale 205 may be associated with a knit structure and further indicate (or correspond to) a second zone of the footwear design, as depicted by element 208 in FIG. 2A. Additionally, a grey reference of grayscale 205 may be associated with a knit structure and further indicate a third zone of the footwear design, as depicted by element 206; and a light grey reference of grayscale 205 may be associated with a knit structure and further indicate a fourth zone of the footwear design, as depicted by element 207.

Figure 2B:
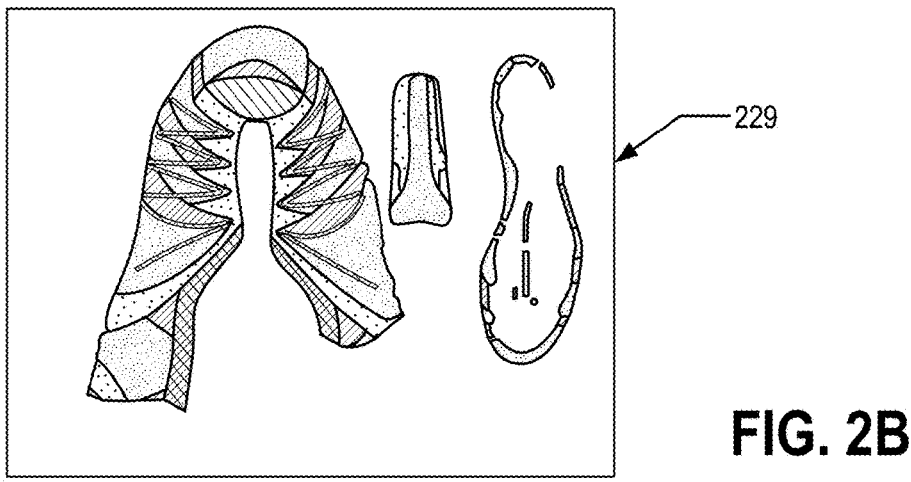
FIG. 2B illustrates a rendering of a footwear design in accordance with one or more aspects of the present disclosure.
Figure 2C:
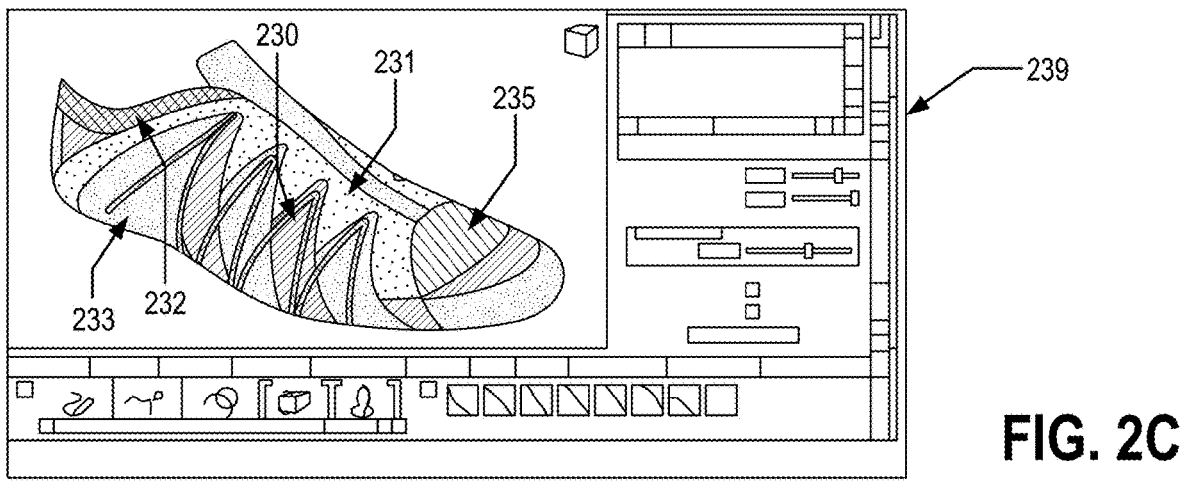
FIG. 2C illustrates an example interface for designing footwear, in accordance with one or more aspects of the present disclosure.

FIGS. 2B-2E illustrate additional example views of 2D and 3D images of a base footwear design that may appear in user interface 200. FIG. 2B illustrates an exemplary rendering of an image showing a "lay-flat" 2D view of the base footwear design. This exemplary 2D view of the base footwear design (e.g., element 229) may be shown in display portion 202 of user interface 200. As will be appreciated, the lay-flat 2D view provides a graphical representation of the knit material corresponding to the base footwear design. FIG. 2C depicts an exemplary interface screen (e.g., interface screen 239) displaying a 3D view of a base footwear design. This exemplary 3D view of the base footwear design may be shown in display portion 201 of user interface 200. In some aspects of the present disclosure, the 3D view of the footwear design may include a color-coded mapping of the various zones of the footwear design.

As noted above, a base footwear design may be represented by various zones that may correspond to different knit structures for the article of footwear to be manufactured. For example, the base footwear design depicted in FIG. 2C includes at least 4 different zones, each having particular design properties and/or characteristics, and being represented by a different color in the user interface to distinguish the various zones. In the example shown in FIG. 2C, a first zone (corresponding to element 233) may be represented by the color red; a second zone (corresponding to element 232) may be represented by the color yellow, a third zone (corresponding to element 231) may be represented by the color teal, and a fourth zone (corresponding to element 230) may be represented by the color purple. FIG. 2C further depicts a fifth zone in the base footwear design (corresponding to element 235), which may be represented by the color blue.

Referring back to FIG. 2A, knit structure 223 is positioned adjacent to (or in alignment with) the darker grey color reference on grayscale 205. As such, knit structure 223 and its corresponding design properties (e.g., color, heather, etc.) may be associated with a corresponding zone (e.g., the first zone) of the base footwear design. In some embodiments, an image or rendering of the footwear design may be dynamically updated to reflect user design, such as changes to the knit structure of the footwear design.

Figure 2D:
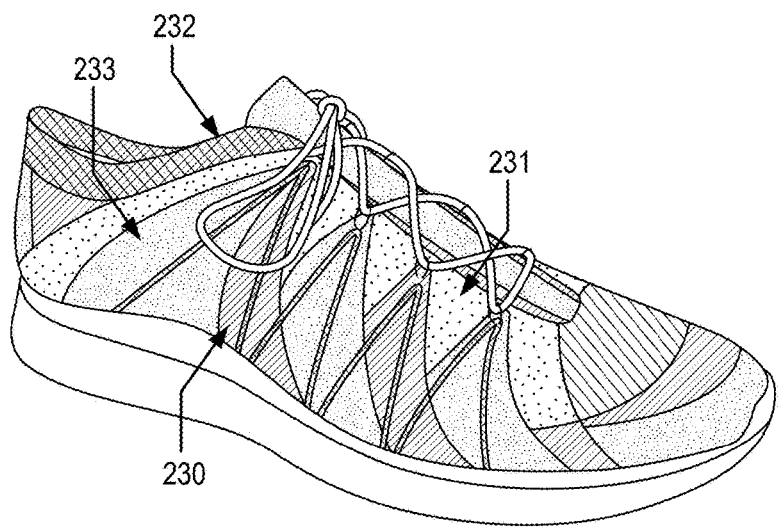
FIGS. 2D-2E illustrate a rendering of a footwear design in accordance with one or more aspects of the present disclosure.

FIG. 2D depicts a rendered image of the base footwear design that may be displayed in a portion of user interface 200. The rendered image of the footwear design that includes a mapping of the knit structures displayed in user interface 200 (e.g., knit structures 220-223). In some aspects of the present disclosure, the rendering of the footwear design may be dynamically updated to reflect user design changes, such as changes to knit structures for the footwear design.

Referring now to FIG. 2C, the first zone of the base footwear design depicted by element 233 may be associated with a particular knit structure, and may be rendered into a 3D graphical representation of the article of footwear, as illustrated in FIG. 2D. When a knit structure, such as knit structure 223 is positioned adjacent to a particular color reference on grayscale 205 corresponding to the first zone, the knit structure and its corresponding design properties may be associated with the first zone of the base footwear design, and subsequently rendered in a portion of user interface 200. In this particular example, knit structure 223 would correspond to a knit structure having a first heather pattern, and that includes various colors and shades of knit material, such as yellow and green knit materials, as illustrated in FIG. 2D. As depicted by element 233, those portions of the base footwear design corresponding to the first zone in FIG. 2C, are illustrated in FIG. 2D as being associated with the particular knit structure having the first heather pattern and various shades of yellow and green knit materials in accordance with knit structure 223. As discussed above and as discussed in more detail below, the characteristics and/or properties of a knit structure, such as knit structure 223, may be adjusted or modified in a variety of ways by the user. Additionally or alternatively, the user may associate a second knit structure with the first zone of the footwear design. Further, the user interface may visually modify a graphical representation of the design, such as the rendering depicted in FIG. 2D, to reflect any changes and/or modifications made to one or more knit structures.

Referring to the example above, as illustrated in FIG. 2C, element 232 depicts a second zone of the footwear design and may be represented by the color yellow on the rendered image of the base footwear design. Referring back to FIG. 2A, knit structure 222 may be positioned adjacent to a particular color reference on grayscale 205 corresponding to the second zone of the footwear design (e.g., element 232). Accordingly, knit structure 222 and its corresponding design properties (e.g., color, heather, etc.) may be associated with the second zone of the footwear design. As an example, referring to FIGS. 2C and 2D, the second zone of the base footwear design may be associated with knit structure 222 in view of the knit structure's placement along grayscale 205 and the grayscale mapping of zones for the footwear design, as described above with reference to portion 201 of user interface 200. Knit structure 222 corresponds to a knit structure having a second heather pattern (e.g., horizontal stripes), and that includes various shades or colors of knit materials (e.g., yellow, blue, and green knit materials), as illustrated in FIG. 2D. As depicted by element 232, those portions of the footwear design corresponding to the second zone in FIG. 2C may be rendered to include the characteristics associated with knit structure 222 (e.g., the second heather pattern and various shades of yellow, blue, and green knit materials).

Referring to the example above, as illustrated in FIG. 2C, element 231 depicts a third zone of the footwear design and may be represented by the color teal on the rendered image of the base footwear design. Referring back to FIG. 2A, knit structure 221 may be positioned adjacent to a particular color reference on grayscale 205 corresponding to the third zone of the footwear design (e.g., element 231). Accordingly, knit structure 221 and its corresponding design properties (e.g., color, heather, etc.) may be associated with the third zone of the footwear design. As an example, referring to FIGS. 2C and 2D, the third zone of the base footwear design may be associated with knit structure 221 in view of the knit structure's placement along grayscale 205 and the grayscale mapping of zones for the footwear design, as described above with reference to portion 201. Knit structure 221 corresponds to a knit structure having a third heather pattern, and that includes various shades of knit materials (e.g., green knit materials), as illustrated in FIG. 2D. As depicted by element 231, those portions of the footwear design corresponding to the second zone in FIG. 2C may be rendered to include the characteristics associated with knit structure 221 (e.g., the third heather pattern and various shades of green knit materials).

Lastly, as illustrated in FIG. 2C, element 230 depicts a fourth zone of the footwear design that may be represented by the color purple on the rendered image of the base footwear design. Referring back to FIG. 2A, knit structure 220 may be positioned adjacent to a particular color reference on grayscale 205 corresponding to the fourth zone of the footwear design (e.g., element 230). Accordingly, knit structure 220 and its corresponding design properties (e.g., color, heather, etc.) may be associated with the fourth zone of the footwear design. As an example, referring to FIGS. 2C and 2D, the fourth zone of the base footwear design may be associated with knit structure 220 in view of the knit structure's placement along grayscale 205 and the grayscale mapping of zones for the footwear design, as described above with reference to portion 201. Accordingly, knit structure 220 and its corresponding design properties may be associated with the fourth zone of the base footwear design. In this particular example, knit structure 220 would correspond to a knit structure having a fourth heather pattern, and that includes various shades of green and blue knit materials, as illustrated in FIG. 2D. As depicted by element 230, those portions of the base footwear design corresponding to the fourth zone in FIG. 2C may be rendered to include the characteristics associated with knit structure 220 (e.g., the fourth heather pattern and consists of various shades of green and blue knit materials).

Figure 2E:
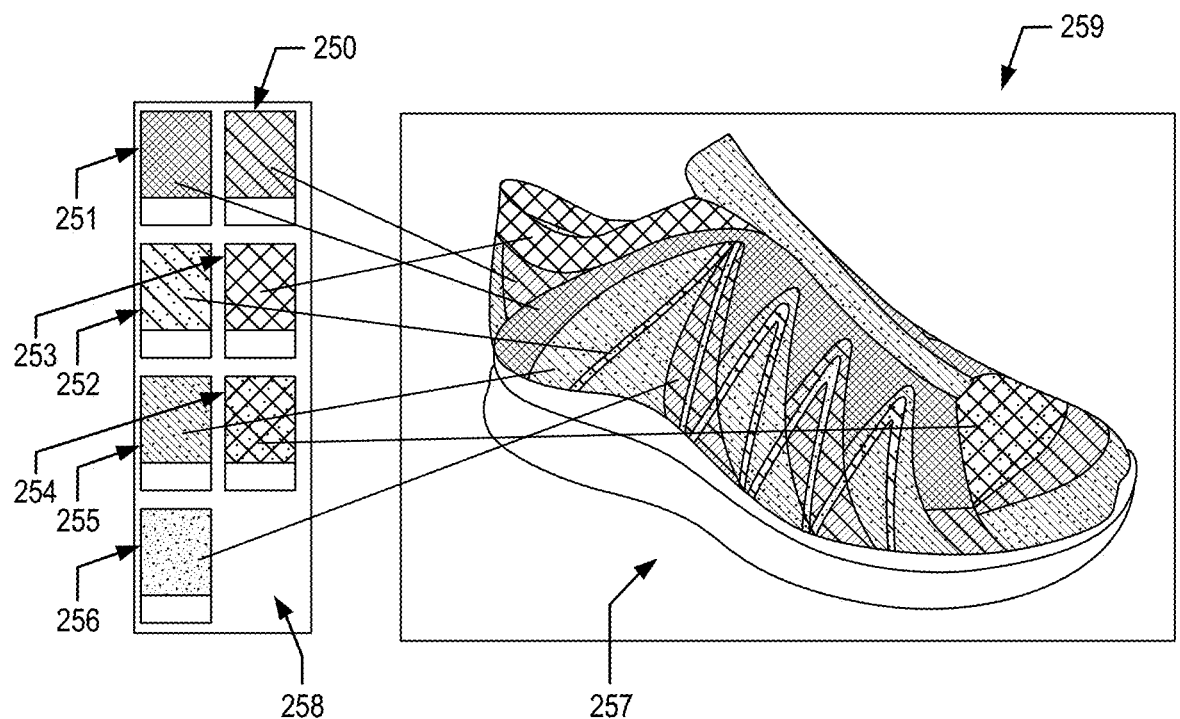

FIG. 2E depicts an example interface screen 259 that shows a 3D graphical representation of the base footwear design in portion 257 of the interface screen. The 3D graphical representation of the base footwear design includes a color and texture mapping of the various zones of the base footwear design based on the design properties (e.g., color, heather, etc.) of a plurality of corresponding knit structures. In this illustrated example, the base footwear design includes at least 7 zones, each represented by a knit structure having different design properties, as illustrated by elements 250-257. A user may interact with interface screen 259 to modify the design properties of the one or more knit structures (corresponding to elements 250-257) that comprise the base footwear design. In some aspects of the present disclosure, the user may modify the design characteristics for one or more zones of the base footwear design by modifying the location of a knit structure in portion 258 of interface screen 259. When a user changes the position of the one or more knit structures in portion 258 of the interface screen, the rendered design properties of the various zones of the base footwear design illustrated in portion 257 of the interface screen may be updated to reflect the change in design properties. As will be appreciated, the position of knit structures need not be in reference to a grayscale, but may be referenced with respect to various other scales or positions within a portion of the interface screen that may indicate (or are associated with) one or more zones (or areas) of the footwear design.

Figure 2F:
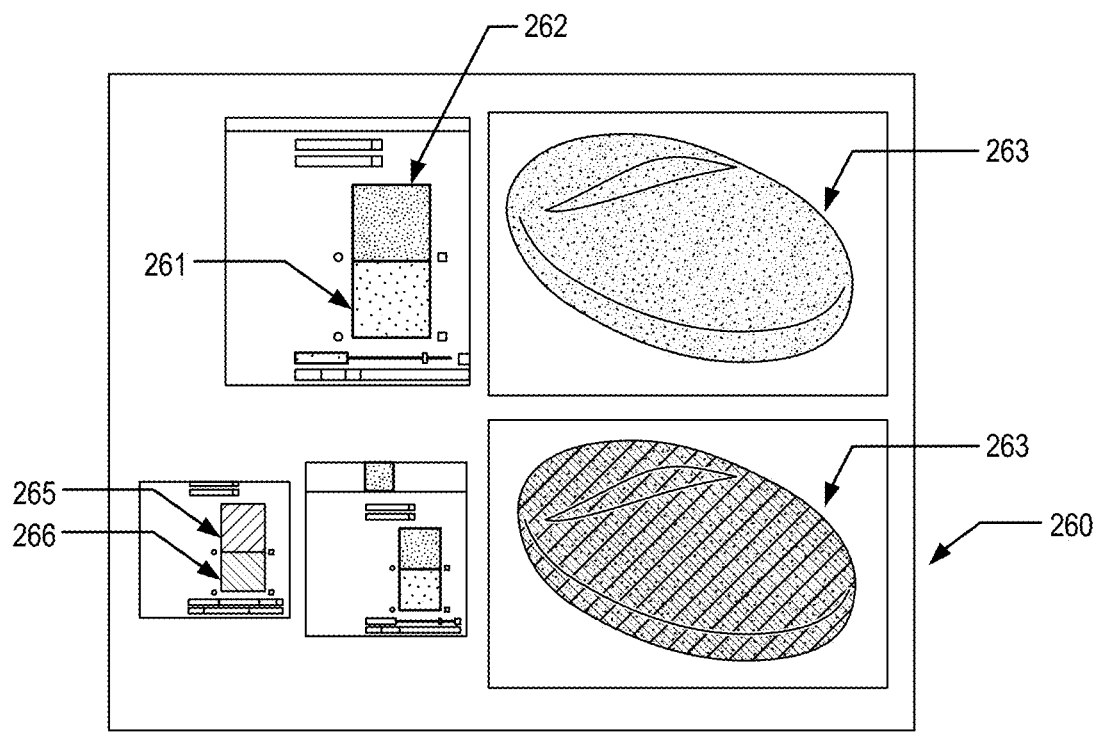
FIG. 2F illustrates a portion of an example interface for designing footwear, in accordance with one or more aspects of the present disclosure.

FIG. 2F depicts a user interface 260 for selecting various color values (e.g., color options) to assign a knit structure. As noted above, one or more color values may be assigned to a particular knit structure that may be associated with a zone of a footwear design. As illustrated in FIG. 2F, a first color (corresponding to element 261) and a second color (corresponding to element 262) have been assigned to a knit structure. The first color and second color may correspond to RGB, CMYK, or other suitable color values, respectively. Display portion 263 of the user interface illustrates a graphical rendering of an image representing the selected knit structure and its corresponding design properties, including color and heather. As a user modifies the first and second color values of the knit structure, display portion 263 of the interface screen may be dynamically updated to reflect that changes (and/or received user input).

In some aspects of the present disclosure, a user interface may provide the user with tools to generate a color option that comprises multiple colors. For example, referring to FIG. 2F, secondary colors 265 and 266 may be combined to generate a new color that can be assigned to the knit structure. Subsequently, display portion 263 of the user interface renders a new image representing the selected knit structure and its corresponding design properties, including the new color values.

Other features and functionality may be provided in the interface, if desired, without departing from the scope of the present disclosure. The following features and functionality may be provided in some manner via the interface: the ability to save the design, the ability to print the design, the ability to store this design at a location for sharing with others (which may launch an interface that allows one to identify specific persons, classes of persons, or groups (public or private) with whom the design may be shared), the ability to "return to the default" design (e.g., to the blank product on which the customization process was initiated for this product or some other intermediate default design (optionally selected and stored by the user)), and the ability to exit or quit the design session.

Figure 3:
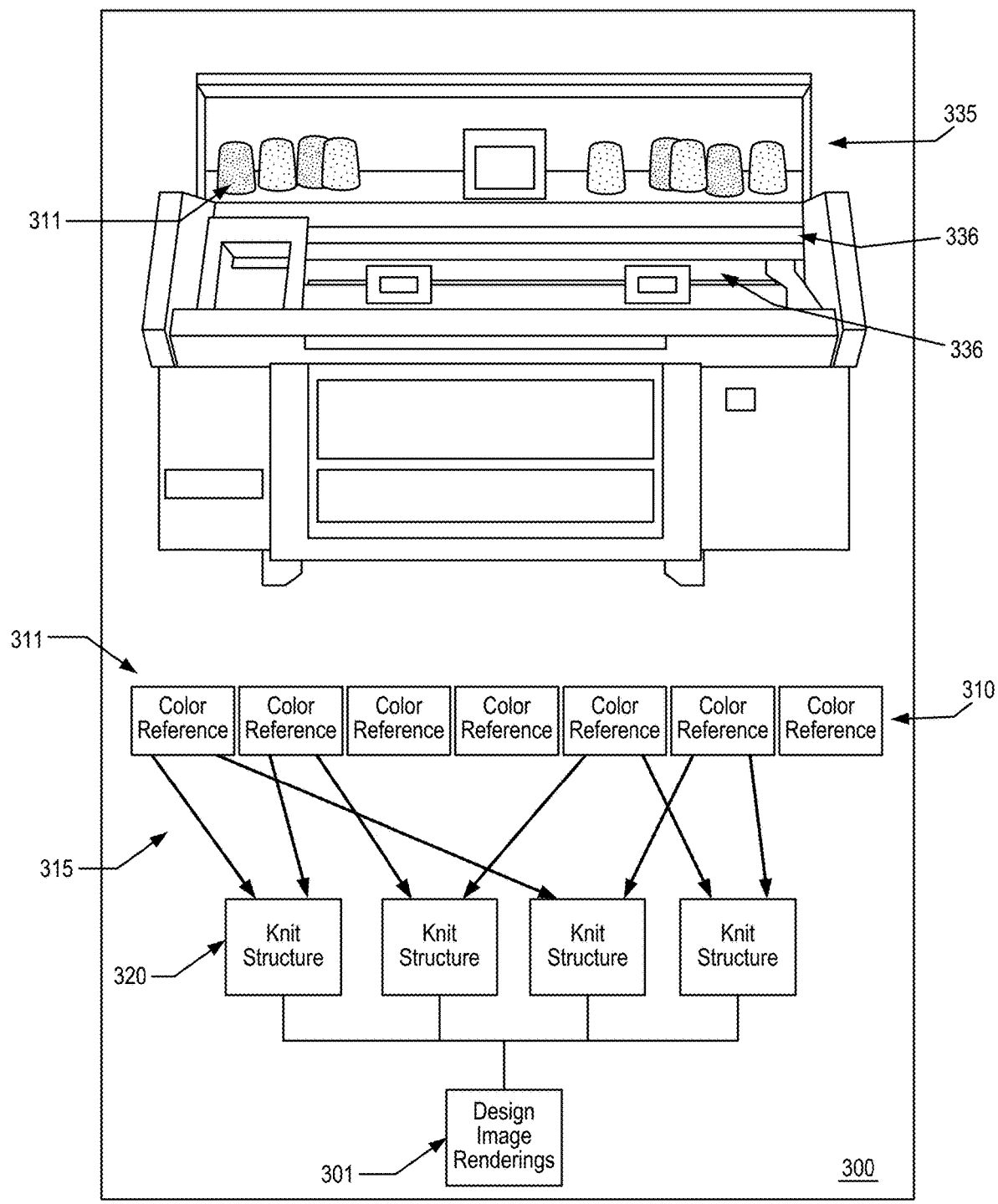
FIG. 3 illustrates an example interface for designing footwear, in accordance with one or more aspects of the present disclosure.

FIG. 3 illustrates an example interface for modifying a footwear image in accordance with one or more aspects of the present disclosure. As noted above, user design choices may be constrained based on a number of factors, including structural rules, cost to manufacture, time to manufacture, and the availability or supply of materials.

User interface 300 includes a knitting machine image 335, a palette of color references 310, one or more color vectors (e.g., vector 315), portions of the interface representing knit structures (e.g., knit structure 320), and a display portion 301 illustrating renderings of the footwear design. User interface 300 may display animations illustrating the various design choices and selections made by a user during the design process. As will be appreciated, the components of user interface 300 may include the same or similar features and functions of corresponding components in interface 200. For example, color reference palette 310 may include the same or similar features and/or functions as color palette 210. For instance, while not shown in FIG. 3, color reference 311 may include a drop down menu to provide a list of available color values. By selecting or hovering a pointer (e.g., mouse pointer) over an interface component, such as color reference 311 or knit structure 320, user interface 300 may display additional information associated with that component.

As another example, knit structure 320 may include the same or similar features and/or functions as knit structure 220. For instance, while not shown in FIG. 3, knit structure 320 may include a display of a texture image (e.g., material swatch) associated with the knit structure, or may include an icon permitting the user to modify the heather associated with the knit structure. Similar to user interface 200, a user may draw a color vector 315 in user interface 300 to associate (or assign) a color value to a particular knit structure. After the color vector has been drawn or modified, user interface 300 may graphically illustrate a material, (such as yarn from the one or more spools associated with the selected color value) being arranged in one or more portions of knitting machine image 335, as illustrated by element 336.

As yet another example, the display portion 301 may include the same or similar features and functions of display portion 201 and display portion 202. Display portion 301 may depict a graphical representation (or rendering) of the footwear upper in accordance with the user's footwear design.

Knitting machine image 335 in user interface 300 may serve as a graphic representation of a knitting machine (e.g., knitting machine 135) used to manufacture footwear uppers (e.g., upper 140). Material, such as material 130, used by knitting machine 135 to manufacture footwear upper 140 may be graphically represented in knitting machine image 335. For example, as illustrated by element 310, each color or color reference selected by a user may be graphically represented by one or more spools of yarn (or some other material) in knitting machine image 335.

As the user selects and/or modifies various design choices, these choices may be reflected (e.g., graphically represented or simulated) in knitting machine image 335. For example, changes made to the color value of color reference 310 may be reflected in knitting machine image 335 by changing the color of one or more spools of yarn to correspond to the new color value. As another example, the number of colors that may be used for a particular footwear design may be graphically represented by the number of spools in knitting machine image 335. In this example, an empty spool may represent an undefined or available color reference that may be added to the color palette.

As will be appreciated, the user's design choices may be limited based on limitations associated with the footwear design, such as availability of materials, structural rules, and physical limitations of a knitting machine. For example, due to limitations in the supply of certain materials used to manufacture a footwear upper, a user may be provided with a limited number of color choices that correspond to the availability or supply of those materials (e.g., yarn). Thus, when user selects color reference 311, the user may be provided with a listing of color options that correspond to the materials that are currently in supply. As another example, due to the structural or physical limitations of a knitting machine, a user may be limited in the number of color options that may be assigned to a particular knit structure. For instance, if a knitting machine, such as knitting machine 135, has a predetermined number of "feeders," a user may be limited to the number of color combinations or the number of colors that may be assigned to knit structures based on the number of feeders in the knit machine.

Figure 4:
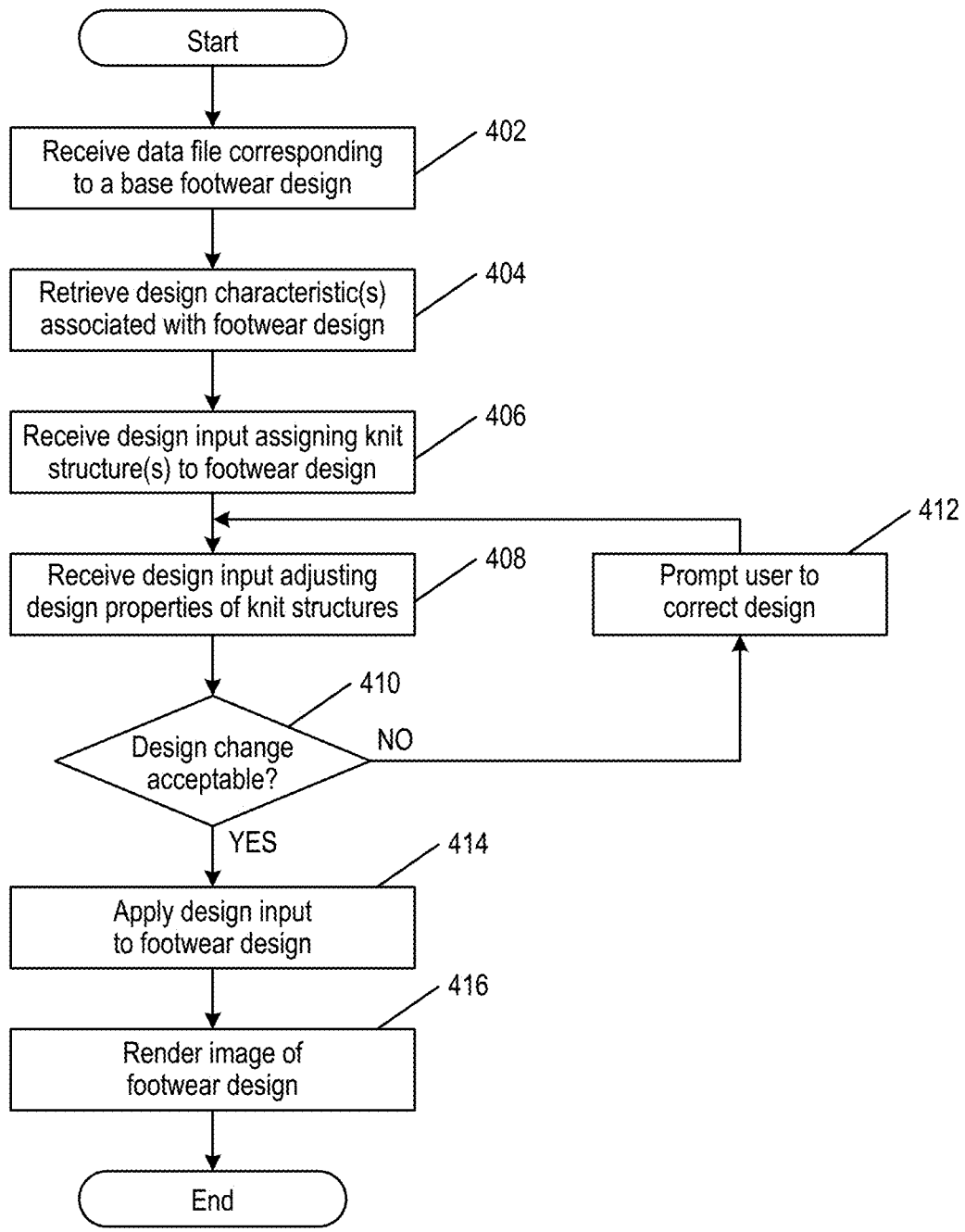
FIG. 4 illustrates a method for designing footwear, in accordance with one or more aspects of the present disclosure.

FIG. 4 illustrates a method of designing footwear in accordance with one or more aspects of the present disclosure. The steps identified in FIG. 4 may be performed with a system such as the system shown in FIG. 1. First, in step 402 a data file corresponding to a base footwear design may be received by the system. The data file may identify various visual and physical attributes (e.g., features) associated with the base footwear design. In some embodiments, a user may select a base footwear design from a plurality of base footwear designs stored by the system. Next, in step 404, the system may retrieve one or more design characteristics associated with the footwear design received during step 402. The design characteristics for the footwear design may be retrieved from a variety of sources, such as grading library 113, lasts library 112, color library 111, etc. In some embodiments, the base footwear design may be edited or modified by a user. The system may store in memory the edited footwear design.

Next, in step 406 the system may receive design input assigning one or more knit structures to a footwear design. A user may identify, via a user interface (e.g., UI 115), one or more knit structures to be associated with (e.g., mapped to) particular zones (or areas) of the footwear design. The knit structures include design properties that represent the various materials (e.g., yarn construction) that provide texture and other visually perceptible attributes associated with the footwear design.

Next, in step 408 the system may receive design input adjusting one or more design properties for the one or more knit structures assigned to the footwear design during step 406. In some embodiments, during step 408, color values and heather patterns may be retrieved from a color library and heather library, respectively. The color values and heathers may be assigned to the one or more knit structures assigned to the footwear design during step 406. In step 410, the system may determine whether the design input received during step 408 is acceptable. During step 410, the system may extract various data associated with the footwear design and compare this data to information collected and/or stored by the system (e.g., structural evaluation module 105, bill of materials module 106, cost estimation module 107, time estimation module 108, etc.). For example, the system may determine whether the various knit materials selected for the footwear design are currently available in inventory. In this example, the system may compare the data indicating the knit structure and materials selected for the footwear design with data stored in bill of materials module 106 to make the determination. As another example, the system may determine whether the design changes and associated knit structures selected for the footwear design conform with the structural rules (and/or characteristics) assigned to the footwear design. In this example, the system may compare the data indicating the knit structure for the footwear design with data stored in structural evaluation module 105 to make the determination. As yet another example, the system may determine whether a design change (e.g., a change in size of the footwear) for the footwear design conforms with grading rules (and/or characteristics) assigned to the footwear design. In this example, the system may compare the data indicating a modification to the footwear design (and/or a knit structure therein) with data stored in grading module 104 to make such a determination.

In some aspects of the present disclosure, during step 410, the system may use a similarity metric when comparing the footwear design data to data stored by the system (e.g., structural evaluation module 105, bill of materials module 106, cost estimation module 107, time estimation module 108, etc.). If the footwear design data does not sufficiently meet the requirements and/or characteristics associated with the data stored by the system, the system may determine that the design change may not be accepted (e.g., the article of footwear cannot be manufactured based on the current footwear design).

If the system determines that the design change analyzed during step 410 is not acceptable, the method may proceed to step 412, where the system may prompt the user to correct or modify the unacceptable design change. In some embodiments, the system may identify the particular design change that is unacceptable and provide the user additional information regarding the design change. In other embodiments, data stored by the system (e.g., data stored in structural evaluation module 105, bill of materials module 106, cost estimation module 107, time estimation module 108, etc.) may be further processed by the system to recommend and/or suggest one or more design changes to the footwear design, such that the footwear design may be subsequently accepted by the system. Next the method returns to step 408, where the system may receive design input adjusting one or more design properties for the one or more knit structures assigned to the footwear design.

If the system determines that the design change analyzed during step 410 is acceptable, the method may proceed to step 414, where the system may apply the design input received during step 408 to the footwear design.

Finally, in step 416 the system may render an image of the footwear design. The rendered image may include simulated knit texture and colors in accordance with the various design characteristics and properties of the footwear design. In some embodiments, step 416 may be performed by an image editing application and the process may be controlled by a script. In other embodiments, steps 414 and 416 may be combined or performed simultaneously. The image rendering step may utilize a variety of existing and conventional image processing tools.

While the above specific examples focus on footwear based aspects of this technology, as noted above, some aspects of this technology also may be used for design of other consumer products, such as articles of apparel. Apparel based aspects of this technology may include one or more of: methods of designing and/or forming garments, methods of visually depicting garment designs and/or entering design changes, systems for performing the methods, and/or computer readable media, including computer-executable instructions stored thereon, for performing the methods and/or operating the systems. Any of, or any portion of, the systems, methods, and/or other information described above in conjunction with FIGS. 1-4 may be used with and/or incorporated into the systems and methods described below with respect to FIGS. 5A-11B.

Figure 5A:
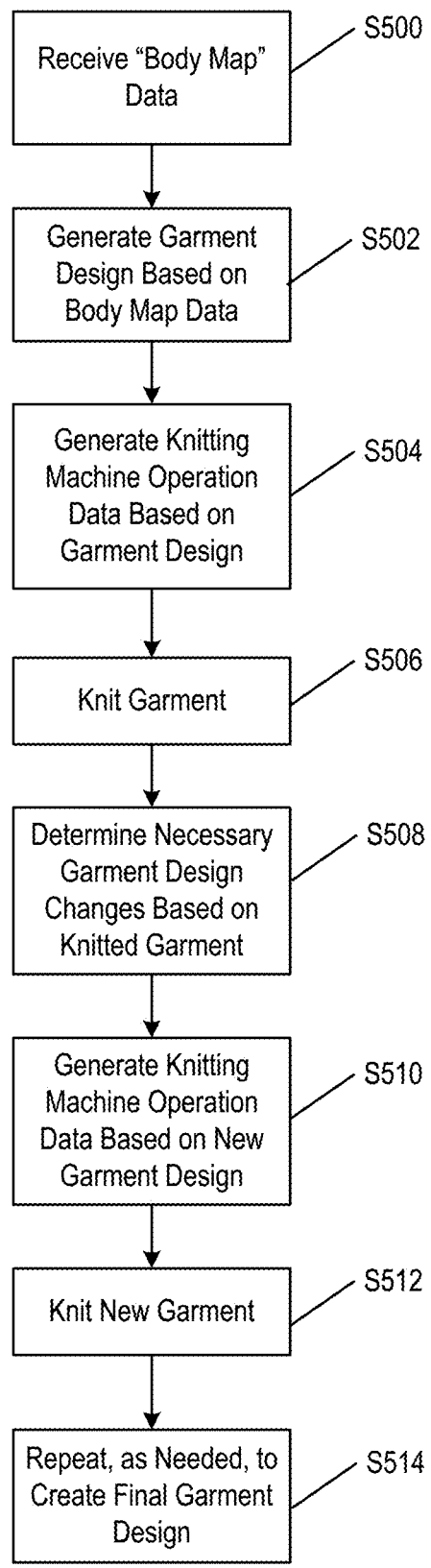
FIGS. 5A and 5B illustrate steps and workflow useful in accordance with one or more aspects of the present disclosure.
Figure 5B:
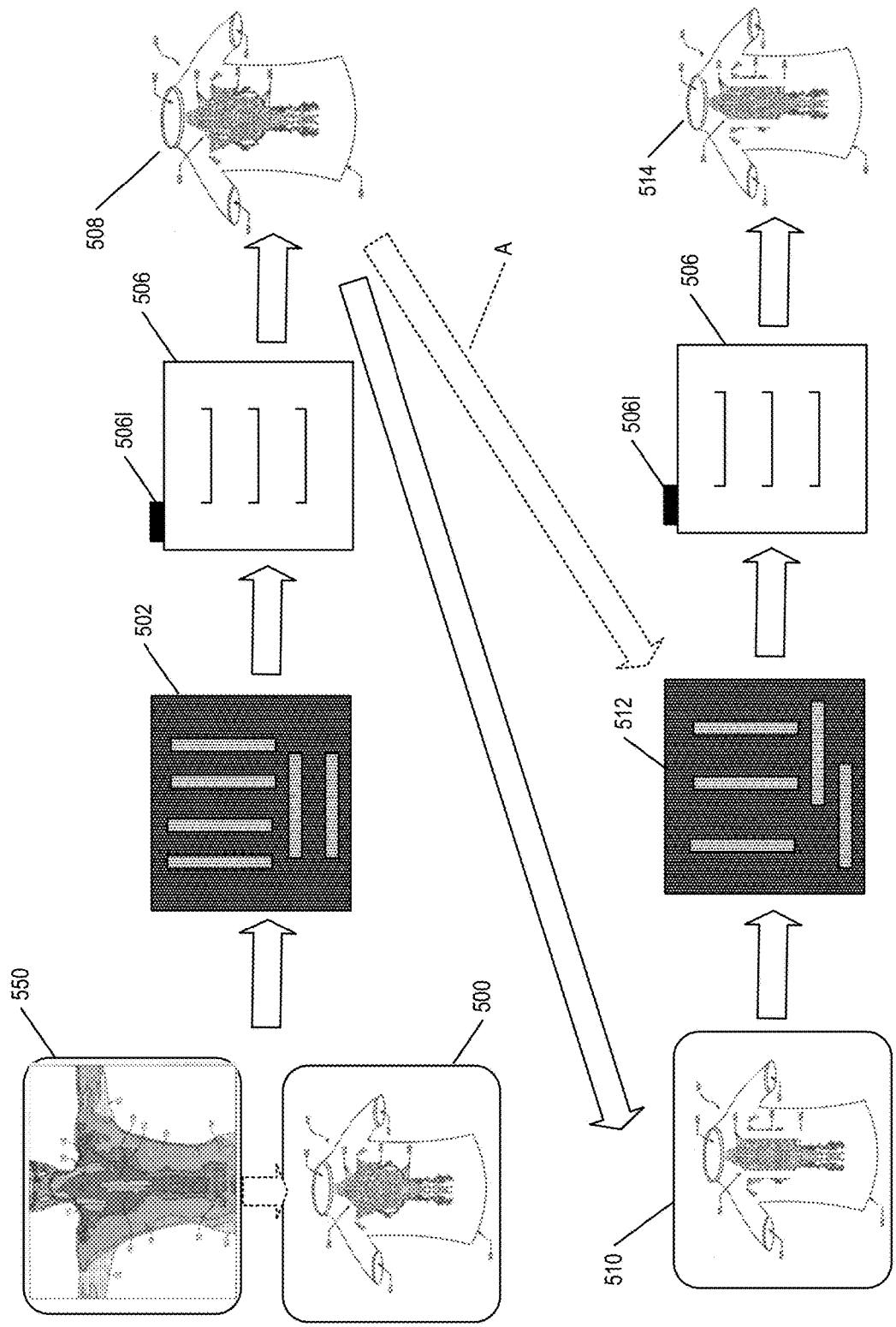
Figure 5C:
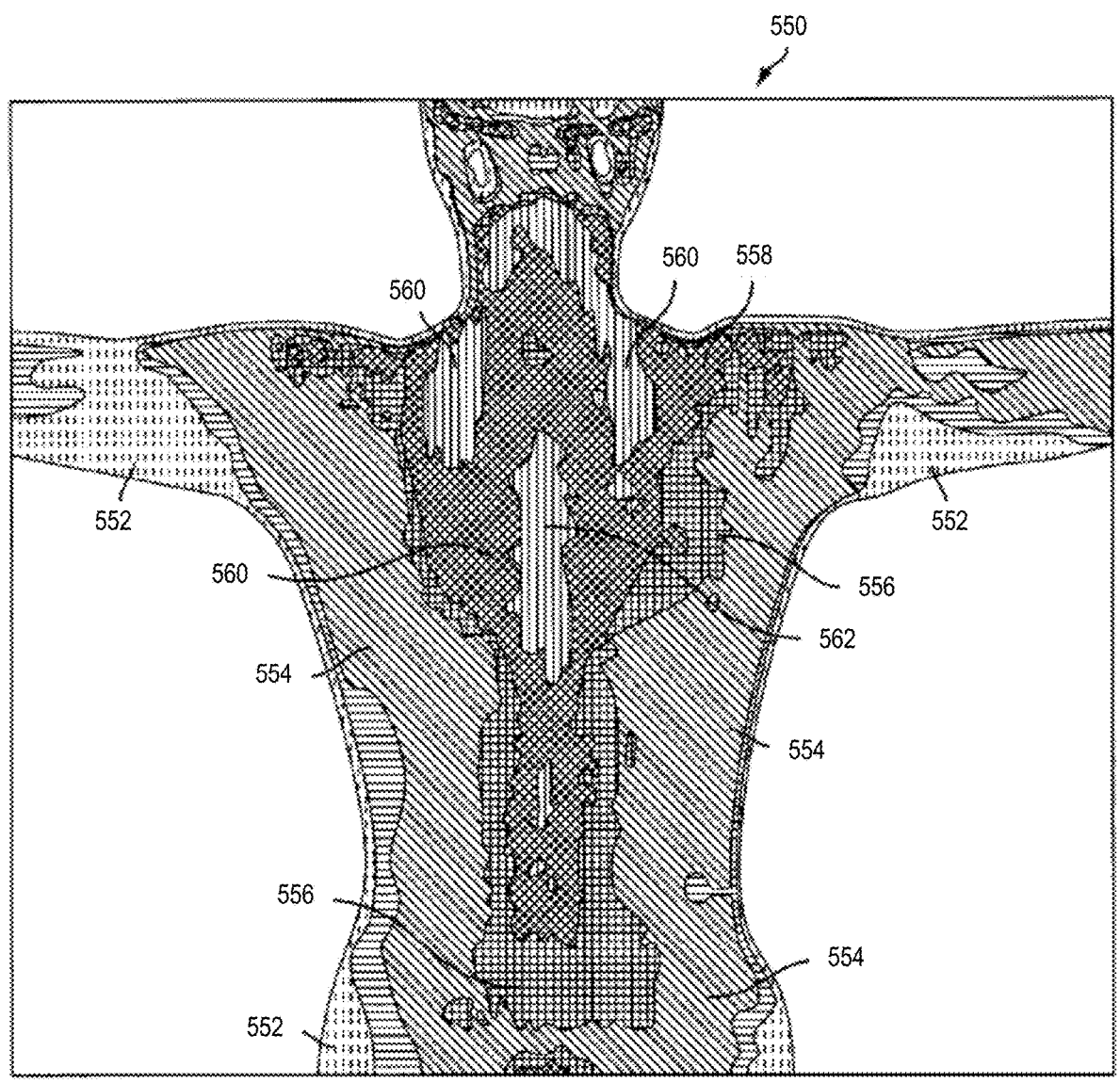
FIG. 5C illustrates an example of body map data in the form of a thermal scan useful in accordance with one or more aspects of the present disclosure.
Figure 6A:
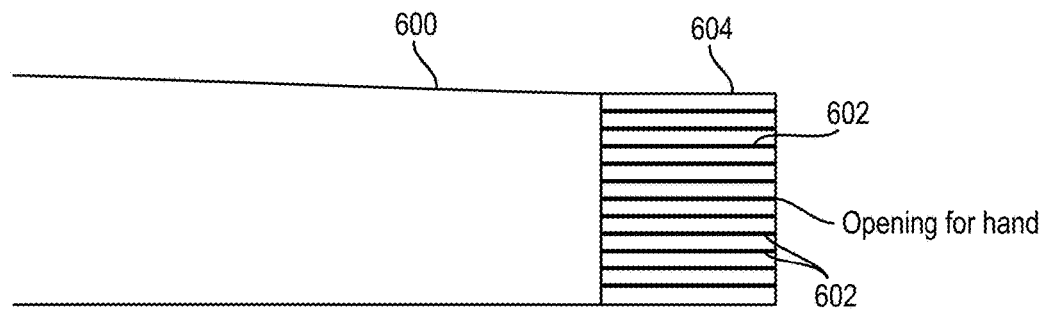
FIGS. 6A and 6B illustrate examples of knit structural units that may be formed in accordance with one or more aspects of the present disclosure.
Figure 6B:
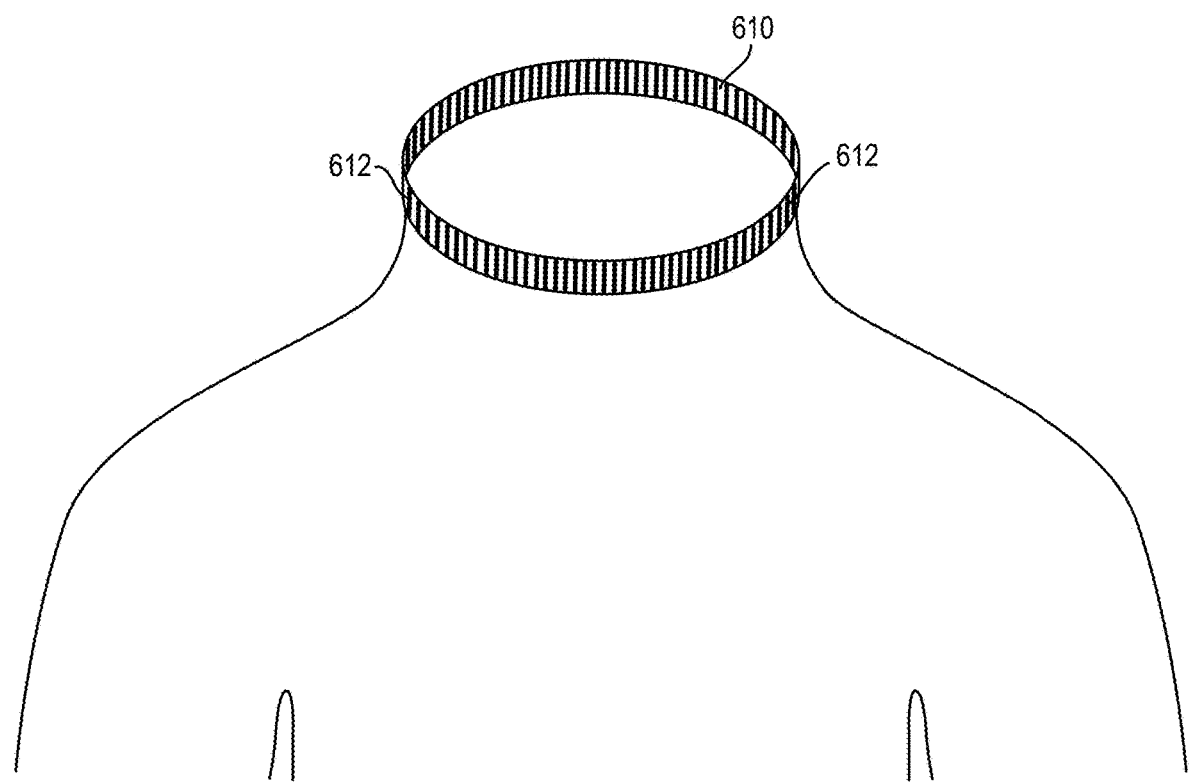

FIGS. 5A-5C provide an example of application of aspects of this technology in an apparel environment, e.g., such as in production of a garment (e.g., at least for covering an upper torso of a human). FIG. 5A includes a flow diagram that generally outlines a method in accordance with at least some aspects of this technology, and FIG. 5B illustrates additional details of the workflow and system features relating to this example. As shown in FIG. 5A, an initial step S500 of this example process includes receiving "body map" data. This body map data may come from any suitable source, such as from an optical scan of a specific wearer's body (e.g., to provide dimensional information, optionally to create a customized garment), from a thermal scan of a specific wearer's body (e.g., to provide heat release information, optionally during or after the user is engaged in an activity for which the garment is being designed), from a photograph or video data, etc. As another option, the "body map" data may be obtained or collected from a standard size source, such as a mannequin or other structure sized at a standard garment size (e.g., child/infant sizes 3 months, 6 months, 9 months, 12 months, and 18 months; toddler/small child sizes 2, 3, 4, 5, 6, and 6X; youth sizes 8, 10, 12, 14, and 16; adult sizes XS, S, M, L, XL, XXL, XXXL; etc.). The body map data may be provided, for example, in Adobe Illustrator® (graphic design software available from Adobe, Inc.) or other graphic design software. FIG. 5B shows an initial display of body map data on a computer display device at reference number 550. This specific example of body map data 550 includes a thermal scan of the back upper torso of a human body (optionally after the person is involved in some type of athletic activity), e.g., as also shown in FIG. 5C.

Based on the body map data 550 (or other appropriate garment/body information and/or data, such as stored data from a garment design 500 of a previous iteration of the process described below, a base garment design, etc.), garment design input data 502 for a garment design (e.g., for an initial garment design 500) may be generated (Step S502). In at least some examples of this technology, a "translation module" of a computer/computer program may automatically generate at least some portions of an initial garment design 500 (and optionally an entire initial garment design 500) based at least in part on the body map data 550 (e.g., based on a scan from an optical and/or thermal scanner; based on standard garment sizes/sizing data; based on data stored for a garment design 500, e.g., from a previous iteration of this method; etc.). For example, from "hot spots" shown in a thermal scan 550 (like FIG. 5C), a computer program may generate a garment design 500 having areas of higher air permeability in the garment structure (e.g., open holes, areas with higher porosity, areas with moisture wicking materials, areas with textured structure to help hold portions of the garment away from the wearer's body surface, etc.), e.g., when designing a lightweight garment for use in warm environments (such as an athletic jersey or other garment). As another example, from "hot spots" shown in a thermal scan 550, a computer program may generate a garment design 500 having areas of higher thermal insulativity (or thermal resistivity) in the garment structure (e.g., with pleats, thicker or heavier materials, etc.), for example, when creating a lightweight but warm garment for use in cold environments (e.g., to produce a garment that keeps the wearer warm by providing thermal insulation at targeted "heat release" locations, which allows other areas of the garment to be made more lightweight, flexible, and/or non-constraining). As yet another example, from a photograph, a video, an optical scan, and/or other sizing information, a computer program may generate a garment design 500 having areas of higher stretchability in the garment structure (e.g., areas made from more stretchable/elastic yarns or threads, e.g., at the elbows, shoulders, armpits, knees, etc.).

In view of the discussion above, when producing a knitted garment, a designer often will want different areas or zones of the garment to provide different functions and/or performance benefits (e.g., zones of air permeability, thermal insulation, durability, texture, stretchability, moisture wicking, hydrophobicity, etc.). When knitting a garment, zones having different functions and/or performance benefits may be created, for example, by knitting different structures into the garment at specific areas or zones of the garment structure and/or by selecting different materials for the garment at specific areas or zones of the garment structure. Thus, at Step S502, based on the body map data 550 (or other appropriate garment/body information and/or data, including an earlier iteration of the garment design 500), garment design input data 502 for a garment design may be generated. This step S502 may be performed, at least in part, by a computer using a "translation module" (e.g., "translation" software) examples of which are described in more detail below. This garment design input data 502 may include a data set with instructions for knitting a garment on a computer controlled knitting machine to produce the desired garment design 500. The garment design input data 502 created (e.g., by the translation module) may include data representing different knit structural units and/or different knitting actions at various locations in the garment structure. As some more specific examples, the garment design input data 502 may include: (a) data representing a first knit structural unit at a first location in the garment design 500 and (b) data representing a second knit structural unit (which may be the same or different from the first knit structural unit) at a second location in the garment design 500. A garment design 500 may have several different knit structural units located at different locations over the garment design 500. Examples of knit garment design input data 502 and different knit structural units are described in more detail below. FIG. 5B generally illustrates a portion of the garment design input data at reference number 502.

After the initial garment design input data 502 is generated, e.g., based on the body scan 550, garment design 500, or other source, this garment design input data 502 may be converted, if necessary, to a knitting machine instruction data set (S504, FIG. 5A). As a more specific example, if necessary, the garment design input data 502 may be converted to a specific form and/or format used to operate and control a knitting machine 506 (FIG. 5B). This data conversion, when needed, may take place at the design computer 102 used in the garment design process (e.g., for the garment design steps described above), at a computer included with or operating the knitting machine 506, at another computer, etc. Computer controlled knitting machines 506 and software for operating them are known and used in the art. Any desired type of computer controlled knitting machine 506 may be used in accordance with aspects of this technology, such as circular knitting machines (e.g., available from Santoni, e.g., as its model SM8-TOP2), flat knitting machines, etc. Element 506I in FIG. 5B represents an input device (e.g., a wired or wireless port) for receiving input data at a knitting machine 506. The input data received at input device 506I may include, for example, the garment design input data 502 (optionally, before it is converted to knitting machine instruction data), the knitting machine instruction data set, and/or other appropriate input data.

Once the garment design input data 502 is converted (if needed) to a knitting machine instruction data set and transmitted to the knitting machine 506, the knitting machine instruction data set operates the knitting machine 506 to create (knit) a first garment 508 based on the garment design input data 502 at Step S506 (FIG. 5A). More specifically, the knitting machine instruction data set may control individual needles of the knitting machine 506 to create the first garment 508, e.g., to create the first garment 508 with the first knit structural unit at a first location in the first garment 508 structure and the second knit structural unit at a second location in the first garment 508 structure (as well as any other knit structural units in the design).

Because of various factors (e.g., differences in yarn materials (e.g., stretch, strength, contraction, etc.), material shrinkage, material properties, etc.), sometimes a knitted product (e.g., like first garment 508) does not turn out as expected. As some examples, the first garment 508 may have bulges, recesses, areas of excess material and/or bunching; may not drape correctly; may have structural integrity issues; may not physically fit the body correctly; or the like. These unexpected issues especially tend to arise early in the process of designing a new garment and/or when trying new materials and/or new combinations of materials. As other examples, the garment 508 may not perform in the manner desired/anticipated (e.g., may not include adequate structure to hold together for long term or intended use, may not provide the desired level of air permeability, may not provide the desired level of thermal insulation, may not provide the desired level of stretch, may not provide the desired texture and/or drape features, may not fit correctly, may not have the desired aesthetic appearance, may be too heavy or too light, etc.). Any of these types of issues and/or other issues with the first garment 508 in this process may cause the garment designer to want to alter the garment design.

Therefore, in at least some examples of this aspect of the technology, at S508, the first garment 508 may be carefully evaluated to determine what garment design changes may be desired in an effort to address some/all of the issues with the first garment 508 and/or to otherwise improve the garment design. In at least some examples of this aspect of the technology, the designer may make changes to the initial/previous garment design 500 in the graphic design software (e.g., in the Adobe Illustrator® file) and thereby create a revised garment design 510 in the graphic design software (shown in FIG. 5B). The revised garment design 510 may include changes (as compared to the initial garment design 500) to at least one of: a size of the first knit structural unit in the revised garment design 510; a position of the first knit structural unit in the revised garment design 510; a size of the second knit structural unit in the revised garment design 510; a position of the second knit structural unit in the revised garment design 510; a relative positioning of the first knit structural unit with respect to the second knit structural unit in the revised garment design 510; a relative positioning of the first knit structural unit with respect to another knit structural unit in the revised garment design 510; a relative positioning of the second knit structural unit with respect to another knit structural unit in the revised garment design 510; eliminating at least one of the first knit structural unit or the second knit structural unit in the revised garment design 510; adding one or more additional knit structural units (which may be the same as or different from either or both of the first and/or second knit structural units) in the revised garment design 510; changing a material in one or more portions of the revised garment design 510 (and optionally changing a material of some or all of the first knit structural unit and/or the second knit structural unit); changing a distance between two occurrences of the first knit structural unit in the revised garment design 510; changing a number of knit stitch actions between two occurrences of the first knit structural unit in the revised garment design 510; changing a distance between the first knit structural unit and another knit structural unit in the revised garment design 510; and/or changing a number of knit stitch actions between the first knit structural unit and another knit structural unit in the revised garment design 510.

Again using the "translation" module of the software, the revised garment design 510 from the graphic design software (when used) may be used to generate revised garment design input data shown as element 512 in FIG. 5B. This revised garment design input data 512 may include changes to various features from (or as compared to) the initial garment design input data 502, such as changes to one or more of: a size of the first knit structural unit in the revised garment design input data 512; a position of the first knit structural unit in the revised garment design input data 512; a size of the second knit structural unit in the revised garment design input data 512; a position of the second knit structural unit in the revised garment design input data 512; a relative positioning of the first knit structural unit with respect to the second knit structural unit in the revised garment design input data 512; a relative positioning of the first knit structural unit with respect to another knit structural unit in the revised garment design input data 512; a relative positioning of the second knit structural unit with respect to another knit structural unit in the revised garment design input data 512; eliminating at least one of the first knit structural unit or the second knit structural unit in the revised garment design input data 512; adding one or more additional knit structural units (which may be the same as or different from either or both of the first and/or second knit structural units) in the revised garment design input data 512; changing a material in one or more portions of the garment design (and optionally changing a material of some or all of the first knit structural unit and/or the second knit structural unit) in the revised garment design input data 512; changing a distance between two occurrences of the first knit structural unit in the revised garment design input data 512; changing a number of knit stitch actions between two occurrences of the first knit structural unit in the revised garment design input data 512; changing a distance between the first knit structural unit and another knit structural unit in the revised garment design input data 512; and/or changing a number of knit stitch actions between the first knit structural unit and another knit structural unit in the revised garment design input data 512. This revised garment design input data 512 may include a data set with instructions for knitting a garment to produce the desired revised garment design 510.

Additionally or alternatively, rather than making the changes to the garment design 510 in the graphic design software, a designer may make one, some, or all of the desired garment changes directly in the revised garment design input data 512. In other words, at least one design change (and optionally any or more design changes) may follow the path of broken arrow A shown in FIG. 5B directly into the revised garment design input data 512. Additionally or alternatively, in at least some examples of this technology, changes to the garment design made in creating the revised garment design 510 and/or the revised garment design input data 512 may include changes to structure generated automatically by systems and methods according to at least some aspects of this technology, e.g., using "rules," examples of which are described in more detail below.

Once the revised garment design input data 512 is created, this revised garment design input data 512 may be converted, if necessary, to a knitting machine instruction data set (S510, FIG. 5A). As a more specific example, if necessary, the garment design input data 512 may be converted to a specific form and/or format used to operate and control a knitting machine 506 (FIG. 5B), which may be the same knitting machine 506 as used to knit the first garment 508 or a different knitting machine (of the same type/model or different type/model). This data conversion, when needed, may take place at the design computer 102 used in the garment design process (e.g., to create the revised garment design 510 and/or the revised garment design input data 512 and/or used in the other garment design steps described above), at a computer included with or operating the knitting machine 506, at another computer, etc. Element 506I in FIG. 5B represents an input device (e.g., a wired or wireless port) for receiving input data transmitted to a knitting machine 506. The input data received at input device 506I in this step may include, for example, the revised garment design input data 512 before it is converted to knitting machine instruction data, the knitting machine instruction data set, and/or other appropriate input data.

Using the revised knitting machine instruction data set, at least one knitting machine 506 knits a second garment 514 (Step S512). During this step S512, operation of the knitting machine 506 is controlled using the revised knitting machine instruction data set to create (knit) the second garment 514 corresponding to the revised garment design input data 512 including the changes from the initial garment design input data 502. More specifically, the knitting machine instruction data set may control individual needles of the knitting machine 506 to create the second garment 514 with the changes from the initial garment design input data 502.

Once created, the second garment 514 may be carefully evaluated to determine what additional garment design changes, if any, may be desired in an effort to address some/all of the issues with the second garment 514, if any. Because of various factors, as noted above, sometimes even this second generation knitted product (i.e., second garment 514 in this example) does not turn out as expected. For example, the second garment 514 may have any of the structural, fit, and/or other issues described above. Any of these types of issues with the second garment 514 in this process may cause the garment designer to want to further alter the garment design. In this instance, Steps S508-S512 may be repeated, as often as necessary, until a final desired physical garment and/or garment design is/are created (Step S514).

As shown in FIG. 5B, in some examples of this technology, the garment design input data 502 may be generated by the translation module directly from the initial body map data 550 or directly from other initial garment design 500 information. Additionally or alternatively, if desired, the translation module of systems and methods according to some examples of this technology may generate: (a) the initial garment design 500 from the body map data 550 (shown by the broken, downward arrow in FIG. 5B) or other input data and then (b) generate the initial garment design input data 502 from the initial garment design 500. Additionally or alternatively, the garment design(s) (e.g., 500, 510) may function and/or operate together with the garment design input data (e.g., 502, 512) such that changes in one data set will automatically apply and create corresponding changes in the other data set. For example, systems and methods according to at least some examples of this technology may operate such that: (a) changes made in the garment design input data 502, 512 will be translated to and/or displayed (or displayable) in a graphical user interface showing the garment design 500, 510 and/or (b) changes made to the visual representation of the garment design 500, 510 in the graphical user interface will be translated to the garment design input data 502, 512. Such corresponding changes in the two data sets 500/510 and 502/512 may take place automatically (e.g., in real time as the changes are being input), after a delay, in response to a "make changes" command, etc.

The example above with respect to FIGS. 5A and 5B describes an iterative process for designing garments to change from (e.g., correct issues or problems with) earlier iterations of a design 500. Similar iterative processes can be used, however, even if the initial garment design input data 502 and/or the first knitted garment 508 provide an acceptable garment product. For example, in methods in accordance with at least some examples of this technology, the second garment 514 (and/or the revised garment design 510 and/or the revised garment design input data 512) may be changed in overall size as compared to the size of the first garment 508 (and the first garment design 500 and/or initial garment design input data 502). In fact, in some examples, systems and methods in accordance with this technology may be used to create graded sizes of a garment design (e.g., sizes graded between two or more individual sizes of: child/infant sizes 3 months, 6 months, 9 months, 12 months, and 18 months; toddler/small child sizes 2, 3, 4, 5, 6, and 6X; youth sizes 8, 10, 12, 14, and 16; and/or adult sizes XS, S, M, L, XL, XXL, and XXXL). Potential garment design changes, knit structural unit sizes and/or spacings, and/or other potential features of size changes and/or size grading for garment designs are described in more detail below.

Additional potential features and examples of "translation" from "body map" data to a garment design now will be described. As noted above, in at least some examples of this technology, body map data 550 (e.g., from an optical or thermal scanner) may be used as a starting point for creating garment design input data 502 for a garment design 500. Additionally or alternatively, an initial, generic, or other base garment or garment design 500 on graphic design software may be used as a starting point for design, including the design of an earlier iteration of the garment being designed and the method described above. In some examples of such systems, at an appropriate time, a designer may select a base material and/or a base knit construction for the garment. Using the body scan 550 or base garment design 500, selection tools (e.g., a mouse or other pointer), or other input, the user or translation module software may identify one or more areas on the garment structure where specific knit structural units may need to be provided and/or where one or more changes to existing knit structural units may need to be made, e.g., to achieve a desired benefit (e.g., to provide desired air permeability, ventilation, thermal insulation, raised texture, structural support ribs, stretchability, expandability, hydrophobicity, etc.). The translation module then may add data to (or modify data already included in) the garment design input data 502 set and/or the revised garment design input data 512 set (e.g., to a bitmap or other appropriate data set or data structure) representing these desired knit structural units at the desired locations so that the knit structural units will be knitted at the desired locations in the garment structure. This display of the garment design 500 and/or the revised garment design 510 also may be updated to show the changes (e.g., addition of and/or modification to knit structural unit features). If necessary or desired, the translation module also may apply any desired structural rules relating to the knit structural units. This may be accomplished before, while, or after the desired knit structural units are included in the garment design input data 502 set and/or the revised garment design input data 512 set (and changes may be made by the translation module, if needed, to comply with the rules). Once all desired knit structural units are inserted into the garment design input data 502 set and/or the revised garment design input data 512 set (and optionally into the garment design 500 and/or revised garment design 510 as displayed on the design computer display), the translation module can fill in other areas of the data set (e.g., other areas of the bitmap) with data representing the base material and/or the base knit construction for the desired garment. Alternatively, if desired, the garment design 500, garment design input data 502, revised garment design 510, and/or the revised garment design input data 512 could be initially created by creating the entire garment design information using the selected base material and/or the base knit construction for the desired garment and then information identifying the knit structural units at various zones or areas to achieve the desired benefit (e.g., performance benefit) can be inserted into the garment design (e.g., into one or more of the garment design 500, garment design input data 502, revised garment design 510, and/or the revised garment design input data 512) to replace the previously present base material and/or base knit construction. Some more specific examples of operation of the translation module to create and locate the knit structural units and apply the "rules" are described in more detail below.

The following example relates to use of body map data 550 in the form of a thermal map as a base for creating a garment design 500 and/or garment design input data 502 (or revised garment design 510 and/or revised garment design input data 512). The human body releases heat, particularly when an individual is involved in physical exercise, athletic events, or other activities. Release of excess heat is imperative, as it can help keep the individual cool, improve performance, and/or prevent overheating and adverse health consequences that may arise due to overheating. The amount of heat released by a body can be qualitatively and/or quantitatively measured or displayed, e.g., using conventional infrared imaging, "night vision," or other thermal profiling technology.

FIG. 5C illustrates an example thermal profile 550 (or thermal "body map") of the upper torso of a human body in the form of an infrared image of the body that qualitatively and quantitatively indicates the amount of heat being released at various locations from the body. As is conventional, thermal profiles or body maps of this type use different colors or gray scale gradations (or other gradations or symbols) to at least partially quantify the amount of heat released by the body (at the very least, in at least some systems, the color or gray scale gradations or the like will indicate relative differences in the amount of heat released by one area of the body as compared to other areas of the body). In a typical color thermal profile/body map 550 of this type, the colors may range from black to blue to aqua to green to light green to yellow to orange to red to white (coolest to hottest). In the grayscale version of the thermal profile 550 in FIG. 5C, the reference numbers correspond to various colors in a color thermal profile as follows:

| Reference Number | Color |
| --- | --- |
| 552 | Blue |
| 554 | Green |
| 556 | Yellow |
| 558 | Orange |
| 560 | Red |
| 562 | White |

While gray scaling, as shown in FIG. 5C, may lose some of the finer gradations between the various areas or zones with different thermal characteristics, the gray scaled image of FIG. 5C generally illustrates the boundaries between areas that release more heat as compared to other areas. Any type of thermal profiling, thermal imaging, storage, display, and/or use of thermal profiling or imaging data may be used without departing from the disclosure.

From "hot spots" shown in a thermal scan 550 (such as FIG. 5C), a computer program translation module may generate a garment design 500 having specific "knit structural units" to provide areas or zones of higher air permeability in the garment structure positioned to efficiently and effectively cool the body. These "knit structural units" may include, for example, knitted-in open holes, areas with higher porosity, areas with moisture wicking materials, areas with texture or other structure that help lift portions of the garment off the wearer's body surface (e.g., to enhance air flow), etc., at locations corresponding to higher amounts of released heat (based on information available in the thermal scan 550). This information can be used, for example, when designing a lightweight garment for use in warm environments (e.g., an athletic jersey or other garment). Size, positioning, total number, and/or relative positioning of these "knit structural units" may be controlled to provide the desired level of air permeability and/or heat release in the final garment design. As another option or alternative, if desired, a user may select one or more specific areas on the body map (through a graphical user interface) and make a selection to include one or more knit structural unit(s) (e.g., areas of increased air permeability and/or heat release) in the garment design 500, 510 based on the selected specific areas of the body map.

As another example, from "hot spots" shown in a thermal scan 550 (such as FIG. 5C), a computer program translation module may generate a garment design having specific "knit structural units" to provide areas or zones of higher thermal insulativity (or thermal resistivity) in the garment structure positioned to help efficiently and effectively hold in heat. These "knit structural units" may include, for example, pleats, thicker or heavier materials, etc. at locations corresponding to higher amounts of released heat (based on information available in the thermal scan 550). This information can be used, for example, when designing a lightweight but warm garment for use in cold environments, e.g., to produce a garment that keeps the wearer warm by providing thermal insulation at targeted locations and keeping other areas of the garment lighter and more flexible by using lightweight and/or stretchable/non-constraining materials. As another option or alternative, if desired, a user may select one or more specific areas on the body map 550 (through a graphical user interface) and make a selection to include one or more knit structural units (e.g., areas of increased thermal insulativity and/or heat retention) in the garment design 500, 510 based on the selected specific areas of the body map.

As yet other options or alternatives, if desired, based on a photograph, video, and/or optical scan of a body, areas of increased stretchability may be identified and incorporated into a garment design 500, 510 by incorporating specific "knit structural units" to promote or support stretch in specific areas or zones in the garment structure. These "knit structural units" may include, for example, zones made from higher elastic/stretchable material(s), physical structures (such as closely spaced ribs 602 at a sleeve 600 cuff 604 (see FIG. 6A) or closely spaced ribs 612 at a neck opening 610 (see FIG. 6B)) that stretch and/or fold (e.g., accordion style) or otherwise promote expansion in one or more directions, or the like. The computer program (e.g., translation module) may locate these areas where increased stretchability may be desired, e.g., in the shoulder and/or armpit area(s) of a garment structure; in the elbow and/or sleeve area of a garment structure; across the central, rear shoulders or rear back of the garment structure; in the knee area of the garment structure; etc. As another option or alternative, if desired, a user may select one or more specific areas on the body map (through a graphical user interface) and make a selection to include one or more knit structural units (e.g., areas of increased stretchability) in the garment design 500, 510 based on the selected specific areas of the body map.

As yet other options or alternatives, if desired, areas of increased wear and/or where increased durability are desired may be identified in the body map data 550 and incorporated into a garment design 500, 510 by incorporating specific "knit structural units" of increased durability or wear resistance in specific areas or zones in the garment structure. These "knit structural units" may include, for example, zones made from more wear resistant materials, physical structures (such as closely spaced ribs 602 at a sleeve 600 cuff 604 (see FIG. 6A) or closely spaced ribs 612 at a neck opening 610 (see FIG. 6B)) that provide thicker material at selected areas, or the like. The computer program (e.g., translation module) may locate these areas in a body map 550 for providing increased wear resistant knit structural units in a garment design 500, 510 and/or garment structure, such as in the sleeve and/or neck opening area(s) of a garment structure, at the elbow area, at the knee areas, etc. As another option or alternative, if desired, a user may select one or more specific areas on the body map (through a graphical user interface) and make a selection to include knit structural units (e.g., areas of increased wear resistance) in the garment design 550, 510 based on the selected specific areas of the body map 550.

In similar manners, areas or zones of increased hydrophobicity may be designed into a garment structure using body map data 550 (e.g., by incorporating specific "knit structural units" with materials having increased hydrophobicity in specific areas or zones in the garment structure). These "knit structural units" may include, for example, zones made from more hydrophobic materials.

In the systems and methods described above, body map data 550 or other garment design data 500, 510 (e.g., from Adobe Illustrator® or other graphic design tool) is transformed or translated (by a computer "translation module") into garment design input data 502 and/or revised garment design input data 512. The data or data structure corresponding to the garment design input data 502 and/or the revised garment design input data 512 may have any desired form, format, and/or configuration without departing from this aspect of the disclosure.

Figure 7:
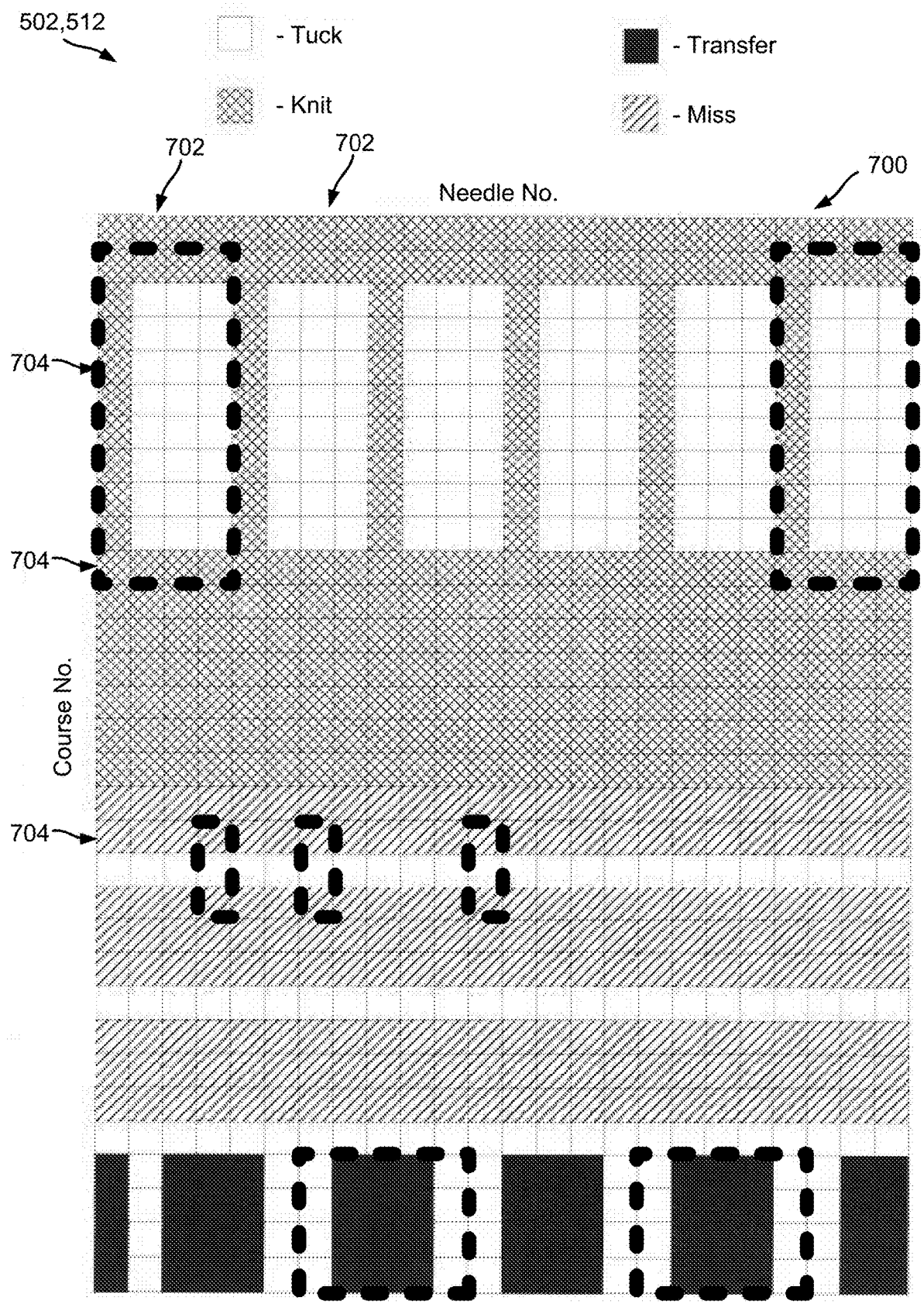
FIG. 7 illustrates an example data structure representation for garment design input data and/or revised garment design input data that may be used in accordance with one or more aspects of the present disclosure.

FIG. 7 illustrates example features of a potential data structure for garment design input data 502 and/or revised garment design input data 512 in accordance with at least some examples of this technology. In this illustrated example, the garment design input data 502 and/or the revised garment design input data 512 is provided as a bitmap 700. Each column 702 (vertical in FIG. 7) of the bitmap 700 represents a specific needle of a knitting machine 506 (e.g., a circular knitting machine, a flat knitting machine, etc.) and/or a wale of the garment design or garment structure to be knitted, and each row 704 (horizontal in FIG. 7) of the bitmap 700 represents a specific course of the garment design or garment structure to be knitted. The different information provided within each individual bit of the bitmap 700 (e.g., each different type of shading and/or color) provides information as to what the specific needle of that column 702 should do during that specific course 704 of the knitting operation (i.e., what the specific knitting needle of the knitting machine 506 should do when the knitting machine 506 knits that row 704 (or course) of the garment structure 508, 514). The top-to-bottom structure of the bitmap 700 of this example corresponds to the length of the garment structure (e.g., an axial length of the knitted garment when knitted on a circular knitting machine).

In this example bitmap 700 data, each bit of the bitmap 700 is assigned a color (shown by different shading in the example of FIG. 7), and that color provides information as to what the knitting machine needle is to do at that specific location in the garment structure. For a circular knitting machine 506 according to this specific example, a needle can take one of at least four actions: (a) perform a "knit" stitch or take a "knit" action, (b) perform a "tuck" stitch or take a "tuck" action, (c) perform a "miss" stitch (or a "float" stitch) or take a "miss" action (or a "float" action), or (d) perform a "transfer" stitch or take a "transfer" action. Therefore, in this example bitmap 700 data structure, a different color is assigned to each of these needle actions, as shown in the KEY at the top of the figure. A bitmap 700 (or other appropriate data structure) may include colors, shading, data, or other information corresponding to other actions for the needle/knitting machine 506. Another potential action may include performing a "hold" action (or forming a "held stitch").

Some information relating to these actions follows. The "knit stitch" of this specific example refers to a conventional weft knitted stitch. A "held stitch" includes a stitch having stitch legs that interloop in a first course and a stitch head that interloops in a second course, wherein one or more intermediary courses are arranged between the first course and the second course. As a result, the limbs of a held stitch often are elongated because the head of the held loop is not interlooped or intermeshed with the course that is successively arranged after the first course. A held stitch may be created by holding the stitch loop in the needle for the one or more intermediary courses in a manner that avoids interlooping with the intermediary courses, before eventually interlooping with a stitch in the second course. Float or miss stitches are generally created in the presence of a held stitch and in one or more courses that are successive to a first course in which a held-stitch base or legs are initially interlooped. In addition, the float stitch is generally in the same wale as the held stitch. In general, the float stitch includes a yarn segment that extends from a knitted loop in a wale on one side of the held stitch to another knitted loop in another wale on the other side of the held stitch. The yarn segment of the float stitch generally traverses across the wale in which the held loop is positioned. A float stitch is generally formed when a needle holding the held loop fails to receive the new yarn segment. In contrast, when the needle holding the held loop receives the new yarn segment, then a tuck stitch is typically formed, and the set of intermediary knit courses could also include tuck stitches. A transfer stitch operation involves transferring a stitch from a selected needle to a following needle (e.g., see U.S. Pat. No. 6,085,554, which patent is entirely incorporated herein by reference). The stitch on the selected needle is enlarged or widened. Once the stitch on the selected needle is sufficiently enlarged, the following needle is inserted through the enlarged stitch such that the stitch can then be secured around the following needle. Finally, the selected needle is removed from the enlarged stitch thereby causing the selected needle to release the stitch. As a result, the stitch is completely transferred from the selected needle to the following needle and a controlled perforation is formed in the article being created. A pattern of perforations can be formed in the article by selecting needles in accordance with a predetermined set of instructions. The transfer stitch structure includes a stitch base that interloops with a first stitch in a first wale and a stitch head that interloops with a second stitch in a different wale (often adjacent).

While the example bitmap 700 of FIG. 7 shows only four potential needle actions, at least some knitting machines 506 also can use multiple different yarns or threads in creating a knitted garment (e.g., yarns or threads of different color, yarns or threads with different stretch properties, yarns or threads of different sizes/weights, yarns or threads with different hydrophobicity, yarns or threads with different feel and/or drape properties, yarns or threads with other varying properties, etc.). Therefore, a set (e.g., four or more) of colors may be provided for each different yarn or thread to be used in creating a garment and/or a set (e.g., four or more) of colors may be provided for each individual spool from which the knitting machine 506 can draw yarn or thread during a knitting operation. As a potential additional or alternative option, the bitmap 700 data bits also may provide information as to how the yarns or threads are engaged with the needle (e.g., to selectively place one of two different yarns at a given location on the front of the knitted structure and the other of two different yarns at the given location on the back of the knitted structure).

As described above, each row 704 on the bitmap 700 essentially provides information that identifies what the knitting machine 506 is to do with each individual needle of the knitting machine 506 as the knitting machine 506 knits each row (course) of the knitted garment design 500, 510. As an example, "knit" and "tuck" actions (e.g., as shown at the top of the bitmap 700) may be used to make a ribbed like design, e.g., ribs 602/612 of the types shown on cuffs 604 of sleeves 600 (FIG. 6A) and/or around neck openings 610 (FIG. 6B) of some garments. The types of knit stitches and "knit structural units" made from a combination of plural stitches/actions may control the properties of the garment and/or the properties of zones or areas of garments. For example, "tuck" actions can be used to create pleats and/or raised texture in a garment structure, and these pleats/raised texture may improve/control garment insulation (with pleats forming thicker material) or air permeability/breathability (with raised texture, openings, etc.). Controlling the material, stitch types, combination of stitches or knit structural units, knit loop tightness, or the like, used at various areas or zones of the garment design provides engineered placement of knit structural units, e.g., and can be used to control air permeability, insulativity, stretchability, support, drape, weight, and/or other desired properties and/or performance benefits of the garment structure.

Various examples of the technology described above included "structural rules" 120 that may be applied when designing knitted products. Such "rules" also may be included and utilized in systems and methods according to aspects of this technology as described above with respect to FIGS. 5A-7. These rules may be applied by the "translation module" that creates the garment design 500, the revised garment design 510, the garment design input data 502, and/or the revised garment design input data 512 (optionally from body map data 550 or other starting data). In general, knitted stitches and/or other knit structural units do not live in isolation. Rather, they may affect and may be affected by stitches and/or structural units that surround them both in the knitted wale (column) and/or the knitted course (row). Therefore, "rules" may be provided (and enforced by the "translation module") that limit and/or otherwise control features of a knit construction. These "rules" may be provided, for example: (a) to prevent needle/machine damage/breakage (e.g., "mandatory rules"), (b) to protect the garment's structural integrity (not necessarily a mandatory rule, e.g., present to produce a stable final product), and/or (c) to follow knitting "best practices" for a designer or manufacturer (also not necessarily a mandatory rule, e.g., present to make an aesthetically pleasing knit structure, to control costs, to improve sustainability, etc.).

As some more specific examples: (a) the "rules" may limit the number of consecutive needle actions of a particular type within a row and/or column of a knitted design and/or a bitmap in order to assure that the garment holds together structurally (e.g., too many "tuck" operations in a row might create excessively large opening or unstructured space in a garment and/or cause the garment to drape in an undesired manner, so the "rule" might require no more than 25 "tuck" operations in a vertical column of a bitmap 700); (b) the "rules" may limit the number of consecutive needle actions of a particular type within a row 704 and/or column 702 of a knitted design and/or a bitmap 700 to prevent excess stress on the needles (which may lead to needle breakage); (c) the "rules" may require that when a first specific knit structural unit is provided at one location of the garment structure, then one or more other specific types of knit needle actions and/or knit structural features must be placed (or must not be placed) within a certain distance (vertically and/or horizontally) surrounding that first specific knit structural unit (e.g., to reduce stress on needles; to provide better aesthetics, drape, etc.; to provide desired structural stability of the garment and/or performance benefit; etc.); and/or (d) the "rules" also could be used to produce desired garment characteristics or performance benefits, such as a desired level of air permeability/breathability, a desired thermal insulative effect, a desired weight range, etc.

A "knit structural unit" may be illustrated or represented in the bitmap 700 by a specific set of two or more needle actions or bits (e.g., repeating or structurally similar sets of two or more needle actions or bits). Examples of potential knit structural units that may be included in a garment design 500, 510 are shown as sets of thick, dashed lines in FIG. 7. Such collections of needle actions and/or bits may be inserted into and/or removed from the garment design input data 502/revised garment design input data 512 as a single "unit" (thus providing the data in the input data 502/512 for forming a "knit structural unit"). The knit structural units correspond to areas of the garment structure having a desired structure, feature, and/or properties, etc., as described above.

In the translation module and/or other software associated with systems and methods according to aspects of this technology, the steps of creating the garment design input data 502 (or garment design 500) and/or creating the revised garment design input data 512 (or revised garment design 510) may include applying rules to limit or control various features of a garment design and/or a final knitted garment. These "rule" limited and/or controlled features may include, for example, one or more of: (a) the size of the first knit structural unit created in the garment design input data 502 and/or the revised garment design input data 512 (e.g., the number of courses and/or wales); (b) the position of the first knit structural unit created in the garment design input data 502 and/or the revised garment design input data 512; (c) the size of the second knit structural unit created in the garment design input data 502 and/or the revised garment design input data 512 (e.g., the number of courses and/or wales); (d) the position of the second knit structural unit created in the garment design input data 502 and/or the revised garment design input data 512; (e) the relative positioning of the first knit structural unit with respect to the second knit structural unit created in the garment design input data 502 and/or the revised garment design input data 512; (f) the relative positioning of the first knit structural unit with respect to another knit structural unit created in the garment design input data 502 and/or the revised garment design input data 512; (g) the relative positioning of the second knit structural unit with respect to another knit structural unit created in the garment design input data 502 and/or the revised garment design input data 512; (h) a minimum or maximum distance between two occurrences of the first knit structural unit in the garment design input data 502 and/or the revised garment design input data 512; (i) a minimum or maximum number of knit stitch actions (or other needle actions) between two occurrences of the first knit structural unit in the garment design input data 502 and/or the revised garment design input data 512; (j) a minimum or maximum distance between the first knit structural unit and another knit structural unit in the garment design input data 502 and/or the revised garment design input data 512; (k) a minimum or maximum number of knit stitch actions (or other needle actions) between the first knit structural unit and another knit structural unit in the garment design input data 502 and/or the revised garment design input data 512; (l) a maximum number of consecutive occurrences in one dimension of a specific needle action in the garment design input data 502 and/or the revised garment design input data 512; (m) a minimum number of consecutive occurrences in one dimension of a specific needle action in the garment design input data 502 and/or the revised garment design input data 512; (n) an overall weight of the garment design based on the garment design input data 502 and/or the revised garment design input data 512; (o) a weight of a first portion of the garment design based on the garment design input data 502 and/or the revised garment design input data 512; (p) an air permeability of a first portion of the garment design based on the garment design input data 502 and/or the revised garment design input data 512; (q) a thermal conductivity or thermal resistivity of a first portion of the garment design based on the garment design input data 502 and/or the revised garment design input data 512; and/or (r) a total number of structural units based on the garment design input data 502 and/or the revised garment design input data 512.

Additionally or alternatively, in at least some examples of this technology (or in use of at least some examples of systems in accordance with this technology), changes from the garment design input data 502 to the revised garment design input data 512 may reflect a change in the size of the garment design, e.g., from a garment of a first size to a garment of a second size that differs from the first size. Notably, in some examples of this technology (or in use of at least some examples of systems in accordance with this technology), changes from the garment design input data 502 to the revised garment design input data 512 may reflect a change in the size of the garment design from a garment of a first standard size to a garment of a second standard size that differs from the first standard size by at least one standard size gradation amount. These types of size changes can occur, for example, when creating a "line" of garments of the same general design and/or style in several different sizes, e.g., garments of sizes selected from two or more of: child/infant sizes 3 months, 6 months, 9 months, 12 months, and 18 months; toddler/small child sizes 2, 3, 4, 5, 6, and 6X; youth sizes 8, 10, 12, 14, and 16; and/or adult sizes XS, S, M, L, XL, XXL, and XXXL. Such changes may require changes in the dimension(s) of the bitmap 700 (e.g., changes in the number of columns 702 and/or rows 704 in the bitmap 700).

When creating garments of different sizes based on an initial garment design, the sizes of all features of the garment cannot, in at least some instances, simply be scaled proportionally across the entire garment design to create the second garment size. Such complete proportional scaling could result in manufacturing, structural, and/or aesthetic issues (e.g., insufficient space may be provided between adjacent knit structural units to maintain adequate structure in the garment and/or desirable drape, too much space may be provided between adjacent knit structural units for the garment to sit or drape properly on the wearer's body, insufficient space may be provided to allow certain needle actions or combinations of needle actions to be performed safely, etc.). Thus, application of the "structural rules" advantageously may be used in systems and methods in accordance with some examples of this technology when changing overall garment sizes and/or creating garments or garment designs over a size run (e.g., with different standard size gradations). FIGS. 8A-10C provide various examples of application of such "rules," e.g., when creating garment design input data 502 and/or revised garment design input data 512.

Figure 8B:
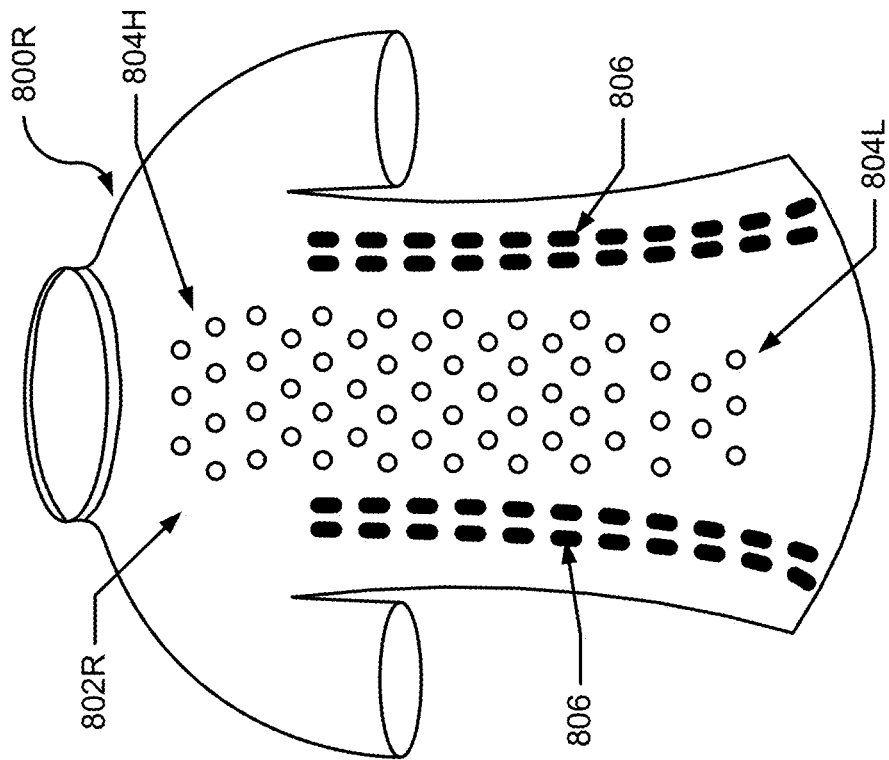
Figure 8A:
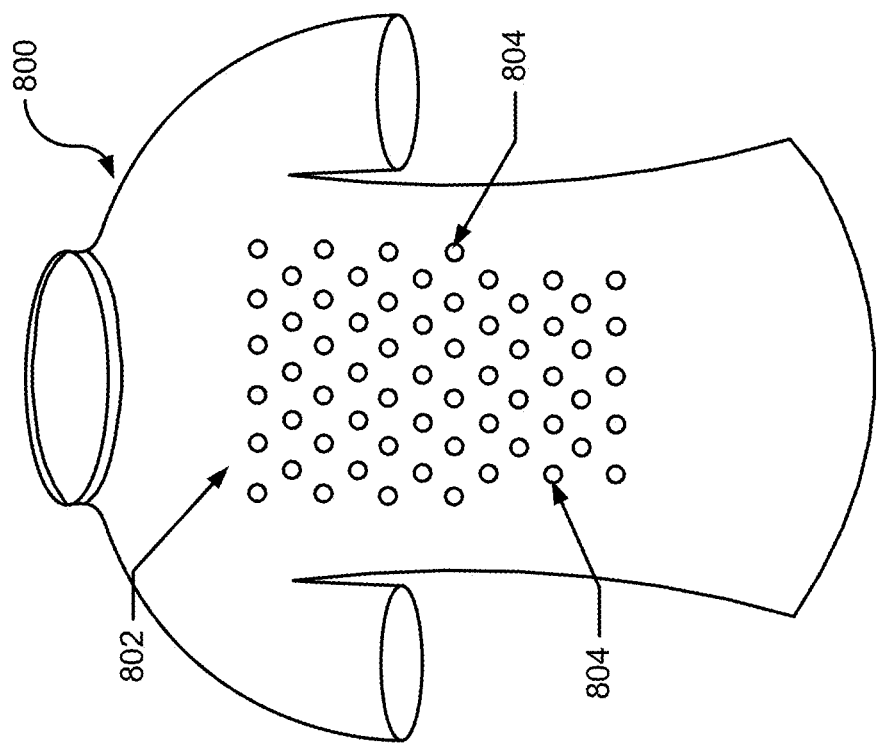

FIGS. 8A and 8B show an example initial garment or garment design 800 (e.g., a jersey or athletic garment, optionally made from initial garment design input data 502 in the system and method described above) and a revised garment or garment design 800R (e.g., optionally made from revised garment design input data 512 in the system and method described above). In this illustrated example, "rules" of the garment design may include a desired level of air permeability for the rear back area of the garment. The rear back area of the garment design may be targeted as a desired zone for providing structures 804 to increase air permeability based on a thermal scan 550 of a body (e.g., as shown in FIG. 5C) because air permeability at the rear back area may tend to better/more efficiently cool the wearer of the garment (as the thermal scan 550 shows increased heat release down the central back of the body). The structures 804 may be knit structural units, such as knitted-in holes or openings, knitted-in texture (e.g., bumps, pleats, or other structures to help keep some of the structural surface of the garment 800 raised off the wearer's skin to promote air flow), thinned areas of material, moisture wicking material, etc.

When the first garment 800 was designed and made (e.g., using systems and methods according to this technology, as described above), a pattern 802 of knit structural units 804 (one or more types) was designed into the garment 800 with the goal of providing a desired level of air permeability, heat release, fit, drape, etc. A wearer (optionally an individual for whom the garment 800 was custom made, such as the person subjected to the thermal scan 550) can don the completed garment 800 and optionally use the garment 800 for desired activities. The fit and/or effectiveness of the garment 800 can be evaluated as the wearer uses the garment 800. Additionally or alternatively, other evaluations or tests can be performed on the garment 800, e.g., to measure its actual air permeability, to take another thermal scan of the wearer when using the garment, to evaluate fit and/or drape, to evaluate "feel" for the wearer, etc. In the example of FIGS. 8A and 8B, the evaluation of the garment 800 (e.g., visually and/or as a result of potential measurements, as described above) may have determined that the garment 800 did not provide sufficient air permeability and/or adequately release heat at the lower back area and/or upper back area and/or that the garment was too tight or constricting around the wearer's core. Then, the designer may input data into the garment graphic design software to change the garment design (e.g., step S508 above) to create a revised garment design (e.g., 510 above). This input data may take on various forms, such as: (a) selecting (using a mouse or other computer selection device) one or more specific zones or regions of the garment design where increased air permeability is desired (e.g., on a graphical user interface), (b) selecting (using a mouse or other computer selection device) one or more specific zones or regions of the garment design where increased size or stretch is desired (e.g., on a graphical user interface), (c) entering data to change an air permeability and/or size parameter setting for the garment design and/or a portion of the garment design, etc.

Based on the input data, the display of the garment design 500 and/or the garment design input data 502 may visually change on the computer screen to show the updated revised garment design 510 and/or the revised garment design input data 512. In this specific example of FIGS. 8A and 8B, the garment design 800 changed to provide a revised pattern 802R of knit structural units concentrated in the central back to provide the air permeability increasing knit structural units 804 both higher and lower down the central back (areas 804H and 804L) and to provide greater stretch knit structural units 806 along the side areas of the garment design. If the revisions are entered to the revised garment design 510, this revised garment design 510 can be converted to revised garment design input data 512 (e.g., going through the translation module), transmitted to a knitting machine, and a garment 800R reflecting the revised garment design can be knitted, e.g., as described above. Alternatively or additionally, as noted above, at least some (and optionally all) of the revisions could be made directly in the garment design input data 502 set to thereby directly create the revised garment design input data 512. The garment review and revision process can repeated, as needed, until a final desired/suitable design is completed.

The translation module also may automatically apply rules to control and/or assist in meeting certain design standards or goals. For example, one structural "rule" may relate to a maximum desired overall weight for a garment design. When the garment design is translated from the graphical design software to the garment design input data 502 and/or the revised garment design input data 512, the resulting garment design input data 502 and/or the revised garment design input data 512 (e.g., the bitmaps 700 described above in conjunction with FIG. 7) will allow systems and methods to know/estimate the amount of thread/yarn of one or more materials in the garment design that will be needed to create the garment. These facts will allow systems and methods according to this aspect of the technology to determine/estimate the final weight of the knitted garment based on that design. If the system/method determines that the projected weight of the knitted garment will be above the value allowed by the structural rule, appropriate action can be taken. For example, the system or method could: (a) advise the designer of the projected excess weight and request their revisions to the design and/or authorization to exceed the standard rule weight, (b) automatically replace some or all of the yarn/thread material in the design with a lighter yarn/thread to keep the design within the desired limit of the rule, (c) provide options or recommendations to the designer (through the computing system) of one or more potential changes to stay within the design rule parameters, (d) automatically change one or more knit structural units or features to keep the design within the desired limit of the rule, etc.

Figure 9A:
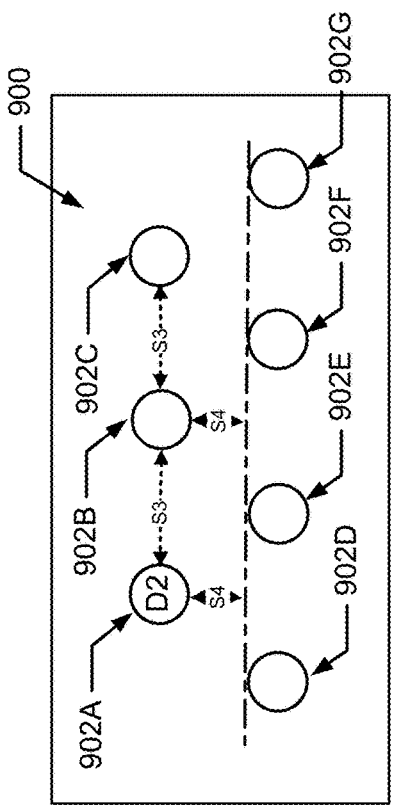
Figure 9B:
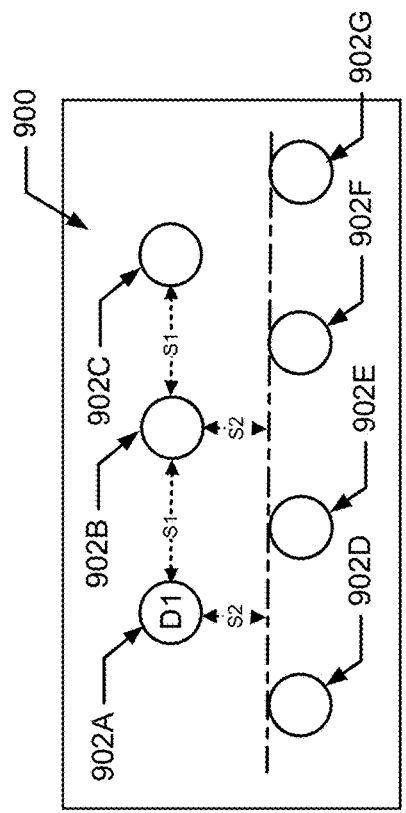
Figure 9C:
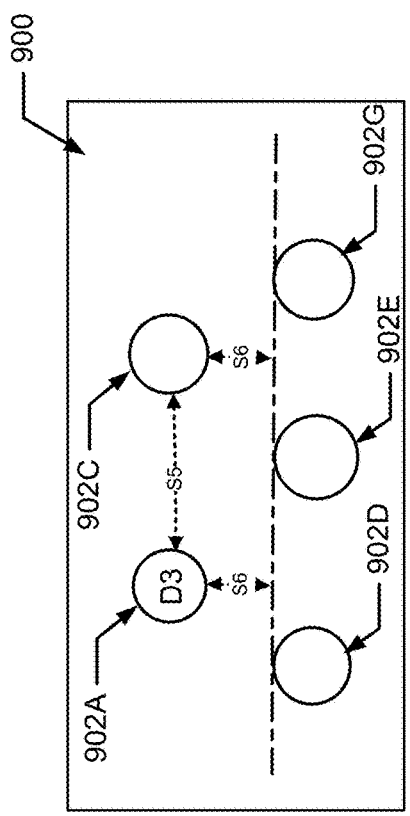

Structural "rules" also can be applied, e.g., by the translation module, as designs change during the designing process, e.g., when sizes, positions, and/or relative positions of knit structural units change from an initial design 500 to a revised design 510. FIGS. 9A-9C illustrate an example of a portion of a knit garment structure or design 900 in an initial design (FIG. 9A) and with two example revisions (FIGS. 9B and 9C). In these specific examples, the revisions change the portion of the knit garment structure or design 900 to a smaller size. FIG. 9A shows an initial design in which the various knit structural units 902A-902G are in the form of open holes, pleats, insulative elements, or texture elements spaced apart in a region of the garment structure or design 900. In this illustrated example: (a) each knit structural unit 902A-902G is generally round with a diameter D1, (b) directly adjacent knit structural units of a row are spaced by a first distance S1, and (c) adjacent rows of knit structural units are spaced by a second distance S2.

If a garment including the design features of FIG. 9A was created and it was determined that some or all of that garment should be reduced in size, the designer may provide input to the design system and/or method to alter at least a portion of the design size (e.g., entering data into the graphic design system or into a revised garment design input data 512 set). As an initial step or option, systems and methods according to some aspects of this technology may attempt to change the size by proportionally scaling down the sizes of the garment components, including scaling down the sizes of the knit structural units 902A-902G and their spacings. This type of generally proportional scaling change is shown in FIG. 9B. In the size changing example of FIGS. 9A and 9B, D2<D1, S3<S1, and S4<S2.

As described above, however, knitted stitches and/or other knit structural units in a garment do not live in isolation. Rather, they may affect and may be affected by stitches and/or structural units that surround them. Therefore, the generally proportional scaling changes described above for the change from the FIG. 9A design to the FIG. 9B design may result in some structural rules being broken. For example, structural rules may require: (a) a certain minimum number of knitted stitches or a minimum distance between directly adjacent knit structural units 902A-902G in a row (e.g., spacings S1 and S3), (b) a certain minimum number of knitted stitches or a minimum distance between directly adjacent rows of structural units (e.g., spacings S2 and S4), and/or (c) a minimum size of a structural unit (e.g., D1 or D2) for various reasons. As examples, such reasons may include: preventing knitting machine/needle damage/breakage; providing sufficient structural support between knitted structural units; providing desired drape; providing desired aesthetic appearance; etc. Thus, the proportional changes provided by the changes to arrive at the FIG. 9B structure from the FIG. 9A structure may cause one or more characteristics of the garment design of FIG. 9B to break one or more of these rules. As specific some examples, by proportionally scaling or changing the size, the design might not meet one or more structural integrity characteristics for a garment design, such as: (a) D2 might shrink to a size below a minimum size required by a rule to prevent needle damage and/or to provide a desired level of performance benefit (e.g., air permeability), and/or (b) S3 and/or S4 might shrink to a size below a minimum size required by a rule to assure that the garment structure remains intact between directly adjacent knit structural elements, to assure that the garment drapes correctly, and/or to assure that the garment meets a desired aesthetic requirement. In these instances, the "translation module" may apply and/or identify some (potential/recommended) changes to the design to place the garment back in compliance with one or more structural integrity rules or other rules, e.g., as shown in FIG. 9C. In the example of FIG. 9C, as compared to the initial design of FIG. 9A and the proportionally scaled example of FIG. 9B, two of the knit structural units have been eliminated (one from each row) and the size (D3) and spacings (S5 and S6) have been changed to meet the requirements of the structural rules. More specifically, in this example, (a) D3 is a size at or above a minimum size required by a rule to prevent needle damage and/or to provide a desired level of performance benefit (e.g., air permeability), and/or (b) S5 and S6 are sizes at or above a minimum size required by a rule to assure that the garment remains intact between directly adjacent knit structural elements, to assure that the garment drapes correctly, and/or to assure that the garment meets a desired aesthetic requirement. D3 may be the same as or different from D1, S5 may be the same as or different from S1, and/or S6 may be the same as or different from S2.

FIGS. 10A-10C illustrate another example of application of structural rules and changing sizes and/or relative positions of knit structural units in a portion of a knit garment structure or design 1000. FIG. 10A shows a portion of an initial design, and FIGS. 10B and 10C shown this same portion with two example revisions. FIG. 10A shows the initial design in which two sets 1002A and 1002B of a first type of knit structural units (e.g., ribs or textural elements spaced apart from one another) are separated by a set 1004 of different knit structural units (e.g., open holes, pleats, insulative elements, or other textural elements spaced apart from one another) in a region of the garment structure or design 1000. In this illustrated example: (a) each knit structural unit of the first set 1002A is spaced from other knit structural units of that set 1002A, (b) the knit structural units of the second set 1002B are spaced from one another, (c) the knit structural units of the third set 1004 are spaced from another, (d) the knit structural units in set 1002A are spaced from the knit structural units of set 1004, and (e) the knit structural units in set 1002B are spaced from the knit structural units of set 1004.

If a garment including the design features of FIG. 10A was created and it was determined that some or all of that garment should be reduced in size, the designer may provide input to the design system and/or method to alter at least a portion of the design size (e.g., entering data into the graphic design system or into a revised garment design input data 512 set). As an initial step or option, systems and methods according to some aspects of this technology may attempt to change the size by proportionally scaling down the sizes of the garment components, including scaling down the sizes of the knit structural units 1002A, 1002B, 1004, and their spacings. This type of generally proportional scaling change is shown in FIG. 10B. In the size changing example of FIGS. 10A and 10B, spacings between adjacent knit structural units are changed by a proportional amount in the horizontal direction (and no size/spacing changes are made in the vertical direction).

The generally proportional changes described above for the change from the FIG. 10A design to the FIG. 10B design, however, may result in some structural rules being broken. In this instance, the "translation module" may apply and/or identify some (potential) changes to the design, e.g., as shown in FIG. 10C. In the example of FIG. 10C, as compared to the initial design of FIG. 10A and the proportional changes of FIG. 10B, one of the knit structural units of set 1002A has been eliminated and the spacings between adjacent knit structural units of set 1002A have been selected to meet the requirements of the structural rules. Also, the spacings between rib elements in set 1002B have been increased (as compared to FIG. 10B) to maintain at least any rule required desired minimum spacing. Spacings between knit structural unit sets 1002A and 1002B and knit structural unit set 1004 have been increased to at least a minimum require by the rules.

While these examples describe rule mandated or rule suggested changes to a design applied/suggested by a translation module when shrinking a design size (or otherwise shortening spaces between knit structural units), increasing a design size (or otherwise increasing spaces between knit structural units) also may invoke violations of structural rules and/or raise mandated and/or suggested changes to designs and knit structural unit placement/relative placement. For example, proportionally increasing spacing between knit structural units may cause the garment to not drape correctly, increase its air permeability, and/or decrease air flow through the garment (e.g., if the spacings of texture elements is too great to hold the garment up off the wearer's skin). In such instances, increasing the size of the garment design may require maintaining a shorter space between adjacent knit structural units and/or addition of more knit structural units to the design (e.g., in order to maintain a desired drape, air permeability, and/or air flow requirement). Additionally or alternatively, increasing a garment size also may cause a garment to exceed a desired weight limit rule, e.g., resulting in a translation module mandated or suggested change in yarn or thread material or other changes.

Any desired types of rules may be applied to garment design and/or applied by a translation module during a garment design process without departing from this disclosure. Such rules may include: (a) mandatory rules (e.g., provided to prevent needle/machine damage/breakage), (b) garment structural integrity based rules (e.g., optionally an overridable rule, for example, to help assure that a garment that will adequately maintain its structure for its desired use and/or for a desired life period), and/or (c) "best practices" rules for a designer or manufacturer (e.g., optionally an overridable rule, for example, to help assure that the garment will meet aesthetic, fit, and/or other requirements of a manufacturer or designer). Aspects of this technology and application of the rules may improve the final garment structures (e.g., by assuring that the garment meets structural integrity and manufacturer mandated/suggested requirements), may improve the design process (e.g., by making the design process more efficient in arriving at suitable final garment designs and design products, by making garment size scaling and gradation features more efficient and reliable, etc.), and/or may eliminate waste (e.g., in reducing iterations of knitting intermediate garments designs to arrive at a suitable final garment design). Application of the structural rules in the examples of FIGS. 5A through 10C may take place using the systems, processes, and/or actions described above with respect to FIGS. 1 through 4.

Additional aspects of this technology relate to systems and methods that include: (a) receiving garment design input data 502 for a garment design including data representing a first knit structural unit at a first location in the garment design and data representing a second knit structural unit at a second location in the garment design; (b) generating, by a computing device (e.g., design computer 102), a graphical representation of the garment design in a first interface (e.g., a computer display device); (c) receiving design input for one or more changes to the garment design; (d) creating revised garment design input data 512 using the design input for one or more changes to the garment design; and (e) visually updating an appearance of the graphical representation of the garment design, e.g., based on the revised garment design input data 512 and/or based on other data entered to reflect the designed changes to the garment design. After the visually updating, the garment design may include changes to at least one of: a size of the first knit structural unit in the garment design, a position of the first knit structural unit in the garment design, a size of the second knit structural unit in the garment design, a position of the second knit structural unit in the garment design, a relative positioning of the first knit structural unit with respect to the second knit structural unit in the garment design, a relative positioning of the first knit structural unit with respect to another knit structural unit in the garment design, a relative positioning of the second knit structural unit with respect to another knit structural unit in the garment design, a total number of knit structural units in the garment design. Additionally, the steps of creating the revised garment design input data 512 and/or visually updating the appearance of the graphical representation of the garment design on the display device may include application of one or more of the structural rules described above. Additionally or alternatively, the display device may display a representation of the garment design 500 and/or the revised garment design 510 and/or the design input may be applied to a computer created and/or displayed garment design 500 and/or 510.

While the above discussion has focused largely on garment design and redesign efforts at the manufacturer and/or designer level, other options are possible without departing from this technology. For example, if desired, the end user (e.g., the purchaser) of the garment may provide input for designing and re-designing garment structures in accordance with at least some examples of this technology. Thus, aspects of this technology may be used with and/or incorporate systems for receiving user input and/or feedback, e.g., like the systems and methods described in U.S. patent application Ser. Nos. 15/055,129, 15/055,113, 15/055,086, 15/055,016, 15/839,032, and U.S. Pat. No. 9,867,425.

Figure 11A:
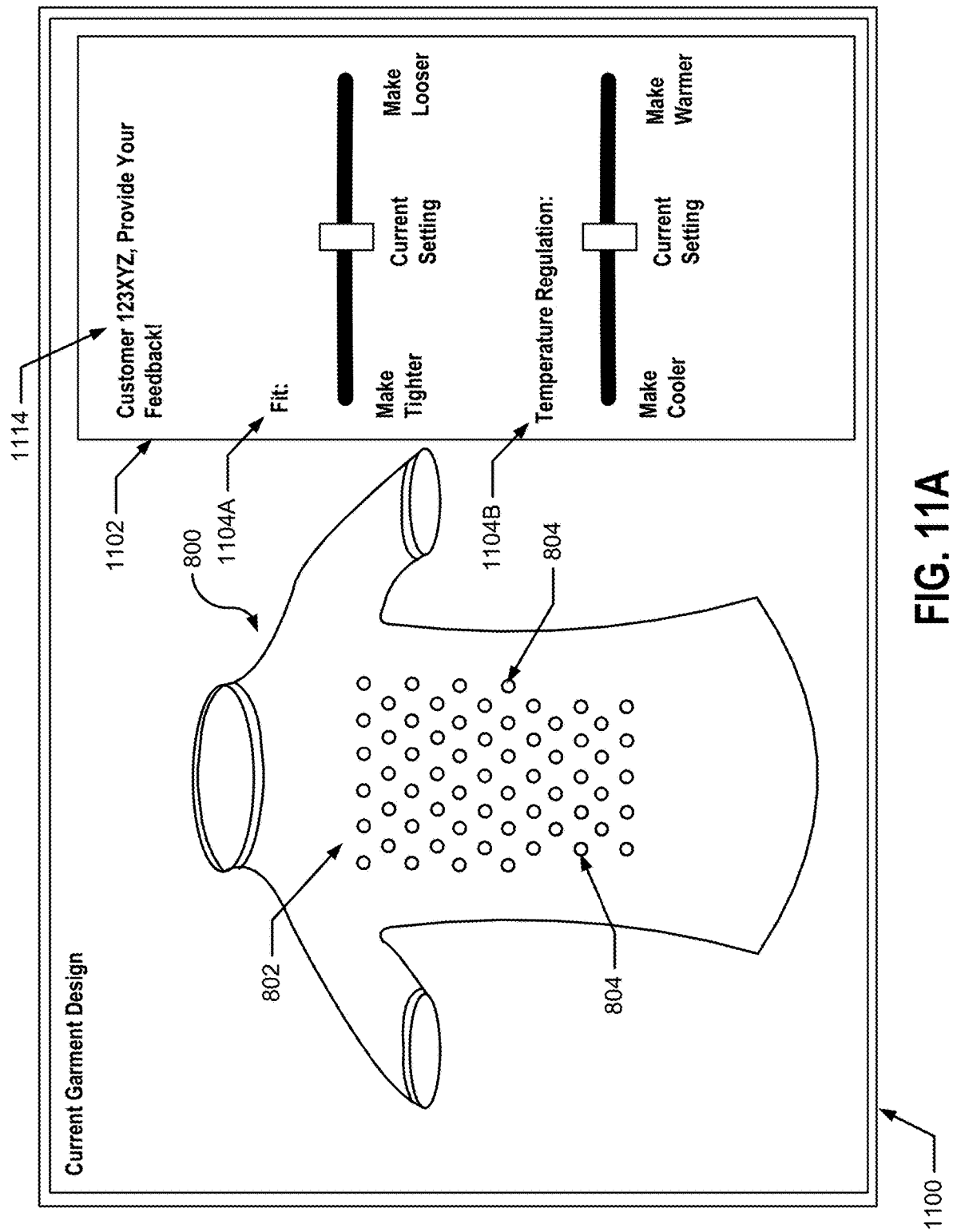
FIGS. 11A and 11B provide various examples of systems and methods of receiving design changes in accordance with one or more aspects of the present disclosure.
Figure 11B:
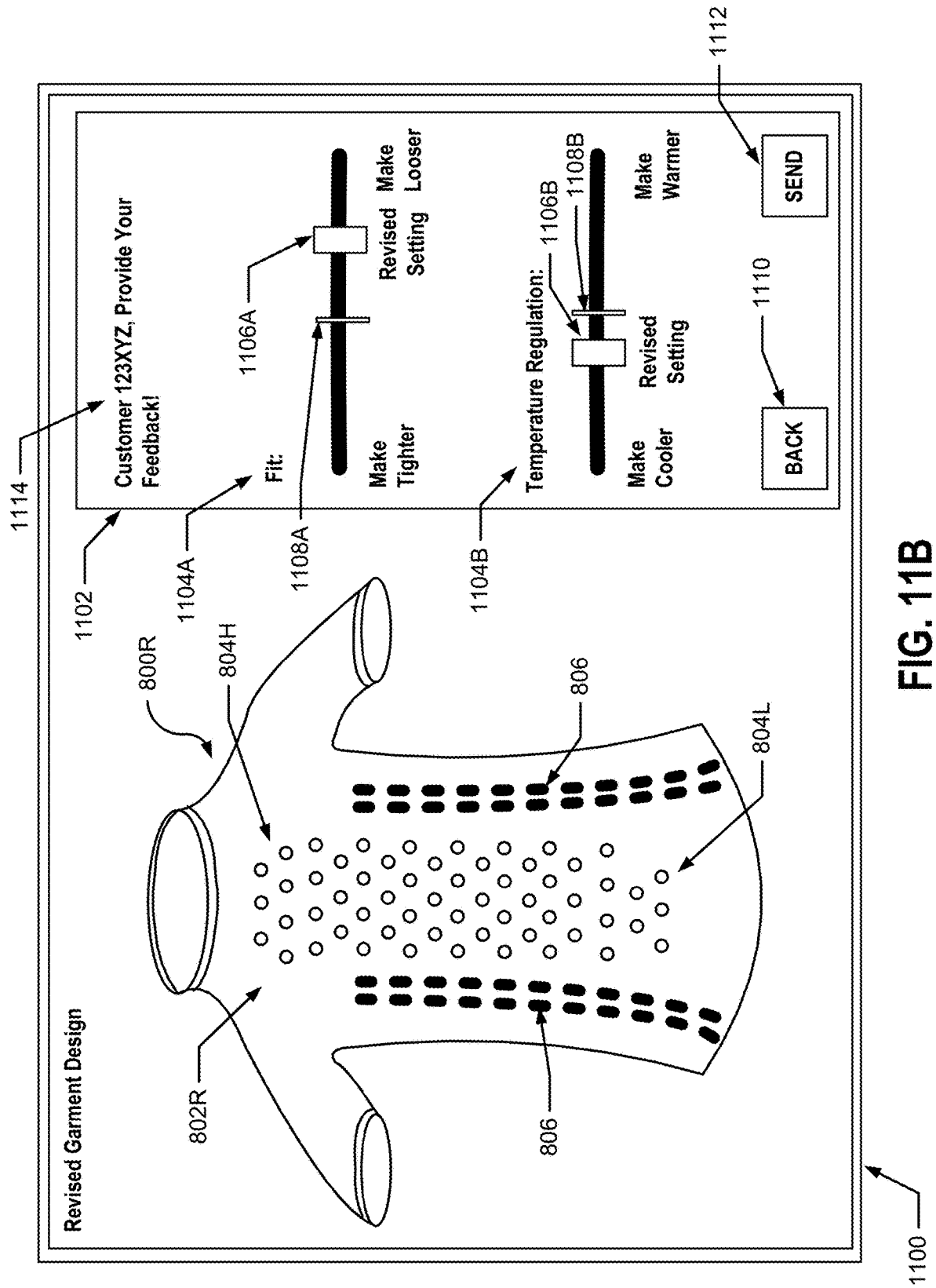

FIGS. 11A and 11B illustrate some more specific examples of user interfaces for receiving input data for redesigning a garment in accordance with aspects of this technology (including any aspects of this technology described above in conjunction with FIGS. 1 to 10C). Such systems and methods for designing, redesigning, and/or manufacturing articles of apparel may include transmitting data (or otherwise providing data) to a computing system (such as a computing system including a display device 1100) for generating a rating system (e.g., user interface panel 1102) on the computing system. This rating system may be used for evaluating at least a first property of a first article of apparel. This first article of apparel may have been previously supplied to (e.g., sold to, given to, etc.) an end user or may otherwise be the subject of design efforts (e.g., internal to a manufacturer/designer). The first article of apparel includes a garment design 800 having a first knitted component (which may constitute some or all of the garment) with at least a first knit structural unit 804 at a first location in the garment design 800 (e.g., any desired type of knit structural unit, including any of the various specific examples described above). FIG. 11A shows several "first knit structural units" 804 at various locations along the central back area of a garment design 800, to provide ventilation/cooling to the wearer. This user interface on the display device 1100 of the computing system further requests input from the user through the computing system of a rating (e.g., a customer-selected rating) or evaluation of at least the first property of the garment. The rating or evaluation system, e.g., in interface panel 1102, may be provided as an application program running on a mobile computing device, such as a web application running on a cellular telephone, tablet, desktop computer, laptop computer, or other computing device.

In this illustrated example, the display device 1100 displays an interface panel 1102 that requests user feedback relating to the fit properties of the garment design 800 in interface component 1104A (e.g., make it tighter, make it looser, just right) and the temperature regulation properties of the garment design 800 in interface component 1104B (e.g., make it cooler, maker it warmer, just right). More, fewer, and/or different adjustable input interface components may be provided in some examples of this technology, including one or more input interface components for adjusting, for example, one or more of: a thermal resistivity property of the first article of apparel, an air permeability property of the first article of apparel, a fit property of the first article of apparel, a support property of the first article of apparel, a moisture management property of the first article of apparel, a weight property of the first article of apparel, a wear resistance property of the first article of apparel, and/or a sizing gradient property for a line of garments corresponding to the first article of apparel (e.g., systems and methods that revise the garment design to one or more additional "standard" sizes).

FIG. 11B shows example changes in the display 1100 as the computing system receives data including changes, such as the customer-selected rating/evaluations of the property(ies). The display 1100 on the computing system in this example produces a revised garment design 800R in response to the user input regarding the desired changes. In this specific example, the user: (a) moved the fit slider interface element 1106A to a revised setting requesting that the garment be made looser and (b) moved the temperature regulation slider interface element 1106B to a revised setting requesting that the garment be made cooler. The prior setting locations may be identified (at least temporarily) by indicators 1108A and 1108B, respectively, and/or the user may "undo" a previous change using "BACK" button 1110.

In response to the user's input, the computing system may create and/or display revised garment design and/or revised garment design input data for the revised garment design, shown in this example as revised garment design 800R on display device 1100. More specifically, in this example, in response to the user input requesting a "looser" garment structure, one or more knit structural units 806 were added to the design to provide areas of increased stretchability (e.g., areas knitted with knit structural units from a more elastic thread or yarn as compared to the thread or yarn used around it and/or used to make a majority of the garment structure; a slightly larger garment (e.g., with more courses and/or wales); etc.). In response to the user input requesting a "cooler" garment structure, one or more "open hole" knit structural units 804H and 804L were added to the revised garment design 800R to provide areas of increased air permeability/ventilation. As an additional or alternative option, one or more additional open hole structural units 804 could be provided within the previously existing area of the central back of the garment design and/or the open hole spacing in the central back area could otherwise be adjusted to allow more open holes and/or open hole area in the central back of the garment design (e.g., assuming any relevant "structural rules" would permit insertion of more open holes and/or open hole area in the revised garment design 800R).

Any desired changes to the garment design/knit structural units may be permitted during this redesign/user feedback process, including any of the changes described above. As some more specific examples, after receiving the redesign information (optionally as the data including the customer-selected rating or evaluation of the first property), the revised garment design input data may include at least one of: changes to a size of the first knit structural unit in the garment design (e.g., making the knitted in open areas 804 bigger or smaller); changes to a position of the first knit structural unit in the garment design (e.g., moving one or more knitted in open areas 804 to another location in the garment design); changes to a relative positioning of the first knit structural unit 804 with respect to one or more other knit structural units in the garment design (e.g., moving the knitted in open areas 804 closer together or farther apart in the garment design); addition of one or more additional first knit structural units 804 to the garment design (e.g., adding more knitted in openings 804); addition of one or more second knit structural units different from the first knit structural unit 804 to the garment design (e.g., adding areas of increased stretchability 806); and/or elimination of one or more knit structural units from the garment design (e.g., taking out some knitted in open areas 804).

Once satisfied with the design, a user may "send" (e.g., by interacting with the "SEND" icon 1112) the revised garment design 800R to an appropriate computer/location to allow new garment design input data 512 to be created (if still necessary) and/or to allow this new garment design 510 to be created as a physical garment product 514. This step may include knitting a second knitted component for a second article of apparel based on the revised garment design input data (for the revised design 800R) and/or taking any other necessary or desired steps to manufacture the garment. Once made, the new/second garment may be provided (e.g., sent, sold, etc.) to the user. The "re-design" process may be repeated as often as necessary and/or desired to arrive at a final desired garment design.

In at least some examples of aspects of the technology described above in conjunction with FIGS. 11A and 11B, the rating system may be provided by a garment manufacturer and/or designer to solicit feedback from its end users (e.g., customers). This may enable manufacturers and/or designers to provide better fitting (and optionally custom fitted) garments to its customers. In at least some such systems and methods, when the first article of apparel is sold or otherwise supplied to a user, customer identification information 1114 may associate that specific garment (and its features) with that specific customer (e.g., by registering the garment with the user on-line, by entering garment identifying information when a user "logs on" to the rating/feedback system, etc.). Revised garment designs and second garments based on the revised designs (and their features) also can be associated with that customer/customer identification information. In this manner, the manufacturer/designer: (a) can know what specific garment the rating/evaluation/feedback/design changes relate to, (b) can track the user's changes over time, and/or (c) can provide better fitting "first" garments when the user makes new purchases of different garments at later times (e.g., creating a new "first" garment based on the most recent designs of a different garment associated with that customer identification information).

Further, in some examples of systems and methods in accordance with this technology, garments may be provided to end users on a type of "subscription" basis, e.g., with a new garment being provided periodically, e.g., at regular intervals and/or over a predetermined cycle or cycle length. In such systems and methods, however, the user can provide rating/evaluation feedback one or more times during the cycle so that later garments can be designed and manufactured that take into account any adjustments desired by the user. In such systems, a first garment may be supplied to a first user (e.g., sold, given, etc.) and the user may be associated with that garment (e.g., by stored customer identification information). A "cycle length" also may be associated with the customer and/or garment, which may determine a frequency with which the end user is supplied with a new garment (e.g., automatically sent, sent after receiving confirmation from the user that a new garment is desired, etc.). The cycle length may be any desired amount of time, e.g., 1 month, 2 months, 3 months, etc.

During the cycle length, the user may provide feedback regarding the garment one or more times (e.g., any time desired, in response to a prompt by the manufacturer/designer, etc.), e.g., using systems and methods like those described above, including those described above in conjunction with FIGS. 11A and 11B. As the user input is received, it can be stored by the designer/manufacturer in a manner that associates the rating/evaluation with the specific customer and/or the specific product. Once the cycle length is at or near its expiration, the garment can be redesigned (e.g., automatically or in response to manufacturer, designer, and/or customer input) taking into account the user's input throughout the cycle length. A new garment may be manufactured based on the revised design and sent to the customer, optionally automatically, in response to a user's request/confirmation, etc. Sending the new garment may trigger the start of a new "cycle," and this type of "subscription," re-design, re-supply service can be repeated as often as desired by one or more of the parties to the subscription transactions.

In some instances, for this type of cyclical and/or "subscription" type service, the user may be instructed to wait at least a predetermined time period after receiving the first article of apparel before submitting any evaluations of the first article of apparel. This may be important, for example, if the garment needs to be "broken in" and/or if it is anticipated that a user may change size and/or other physical characteristics during the garment's cycle length. This predetermined "wait" time period may be any desired time period, such as at least one day, at least one week, at least two weeks, at least one month, at least two months, etc., and it may depend on the cycle length (e.g., wait at least ½ the cycle length). In some examples of systems and methods according to this aspect of the technology, a user may be asked to return the used garment after the cycle length, e.g., to allow the designer/manufacturer to evaluate the wear and/or other properties of the garment after extended use.

Some example systems and methods in accordance with this technology, including the technology described above with respect to FIGS. 1 to 11B, may include other features that provide useful product design and re-design input. For example, the manufacturer's/designer's system may receive input data from the individual user regarding his/her use of the garment (or footwear). This may be accomplished, for example, by sending athletic performance data to the manufacturer's/designer's computing system. This data may be transmitted automatically and/or in response to a user's command/authorization (and/or optionally in response to a manufacturer's/designer's prompt to the user). As some more specific examples, an end user may collect athletic performance data using a mobile application program (e.g., a running app), and that program may include the ability to communicate with the manufacturer's/designer's computing system to provide the end user's performance data to the manufacturer/designer. That performance data may provide additional useful information to the manufacturer/designer, including information relating to: the typical parameters of a user's workouts (e.g., mileage covered, time of day, etc.); the user's typical pace and/or other exertion level information (e.g., calories burned, changes in pace, etc.); the typical weather conditions (e.g., temperature, humidity, wind conditions, precipitation, etc.); the frequency of workouts (e.g., daily, four days/week, etc.); and the like. Any one or more of these factors may provide information useful for design and redesign of products for that specific user. Additionally or alternatively, this type of performance data could be used at least in part (and optionally completely) to determine a "cycle length" for a cyclical and/or subscription type garment (or footwear) supply service, e.g., of the types described above. As some more specific examples, the athletic performance data may track the hours and/or miles over which a garment (or footwear) is being used and trigger product re-design and/or re-supply activities when a predetermined number of hours and/or miles has been reached.

While the above specific examples focus on knit based aspects of this technology, as noted above, aspects of this technology also may be used for design of consumer products by other textile production processes, such as braiding, winding, embroidery, weaving, nonwoven fabric production, fused filament fabrication process, etc. Such aspects of this technology may include one or more of: methods of designing and/or forming garments (including the iterative processes described above), methods of visually depicting garment designs and/or entering design changes, systems for performing the methods, and/or computer readable media, including computer-executable instructions stored thereon, for performing the methods and/or operating the systems. Any of, or any portion of, the systems, methods, and/or other information described above in conjunction with FIGS. 1-11B may be used with and/or incorporated into the systems and methods described below with respect to FIGS. 12A-18J.

Figure 12E:
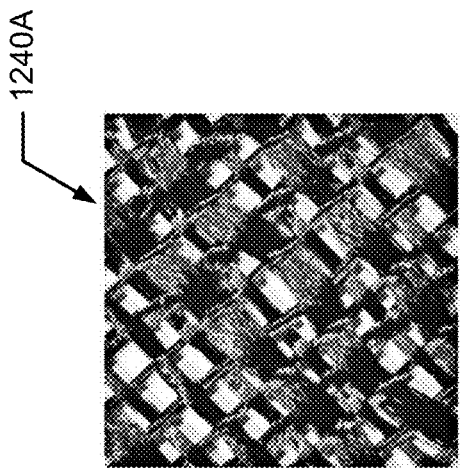
Figure 12E:
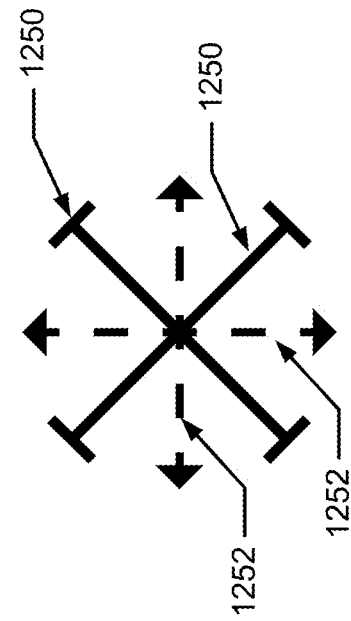

FIGS. 12A-12E provide various examples of braid structural units that can be provided, e.g., in a structural library (e.g., akin to heather library 110) and some potential properties or features available in use of those braided structural units. For example, FIG. 12A provides braided structural unit 1200A, which includes a repeating pattern of a large open hole 1202 surrounded by six smaller holes 1204. As shown by the "Property Lines" in FIG. 12A, this braided structural unit 1200A provides relatively strong "lockdown" (e.g., resistance to stretch) in several directions, i.e., shown by the solid and relatively thick "property lines" 1250 extending in several directions. Due to the relatively large volume of open holes 1202, 1204, this structural unit 1200A is relatively open, providing good breathability/air permeability at locations where the structural unit 1200A is provided. The structural unit 1200A may constitute the braided structure needed to provide and support one central hole 1202 and at least portions of the smaller holes 1204 that surround that central hole 1202. As one example, an individual braided structural unit 1200A of this type may include a hexagonal shaped structure that forms the central hole 1202 and portions of each of the surrounding holes 1204. Alternatively, a structural unit of this type could encompass the braided structure surrounding multiple large central holes 1202 in one or more dimensions.

FIG. 12B provides another example braided structural unit 1210A, which includes a large open hole 1212 surrounded by braided structure (e.g., substantially solid and/or continuous lines of braided material) on four sides. As shown in FIG. 12B, this braided structural unit 1210A provides: (a) relatively strong "lockdown" (e.g., resistance to stretch) in the diagonal directions of FIG. 12B, shown by the solid and relatively thick property lines 1250 extending in the diagonal directions of FIG. 12B (e.g., along directions corresponding to relatively straight and continuous lines of braided materials) and (b) areas/directions of "mobility" (or increased stretch/flexibility) in the vertical and horizontal directions of FIG. 12B, shown by the broken property lines 1252 extending vertical and horizontal in FIG. 12B (e.g., along directions that cross the open holes 1212). Due to the relatively large volume of open holes 1212, this structure is relatively open, providing good breathability/air permeability at locations where the structural unit 1210A is provided. The structural unit 1210A may constitute the braided structure needed to provide and support one central hole 1212. As one example, an individual braided structural unit 1210A of this type may include a diamond shaped structure that forms the central hole 1212 and portions of each of the surrounding holes 1212. Alternatively, a structural unit of this type could encompass the braided structure surrounding multiple holes 1212 in one or more dimensions. While various hole 1212 sizes are possible in this braided structural unit 1210A, in this specifically illustrated example, the holes 1212 may be somewhat smaller than those of braided structural unit 1200A (and thus provide a somewhat less "open" structure or somewhat less breathability compared to structural unit 1200A).

FIG. 12C provides still another example braided structural unit 1220A, and this example includes a relatively large open hole 1222 surrounded by more solid/continuous braided structure as compared to the other holes described above. As shown in FIG. 12C, this braided structural unit 1220A provides: (a) relatively strong "lockdown" (e.g., resistance to stretch) in the vertical direction of FIG. 12C, shown by the solid and relatively thick property line 1250 extending in the vertical direction of FIG. 12C; (b) areas/directions of strong "mobility" (or increased stretch/flexibility) in the horizontal direction of FIG. 12C, shown by the thick broken property line 1254 extending horizontal in FIG. 12C; and (c) areas/directions of lesser (but still useful/advantageous) "lockdown" (e.g., resistance to stretch) in the diagonal directions, shown by the solid and relatively thin property lines 1256 extending in the diagonal directions of FIG. 12C. Due to the more dense/more continuous braid structure of this example, this structural unit 1220A is becoming more closed, providing moderate breathability/air permeability at locations where the structural unit 1220A is provided. An individual structural unit 1220A may constitute the braided structure needed to provide and support one central hole 1222 or other repeated structure in the overall braid structural unit 1220A. Alternatively, a structural unit of this type could encompass the braided structure surrounding multiple holes 1222 in one or more dimensions.

Figure 12D:
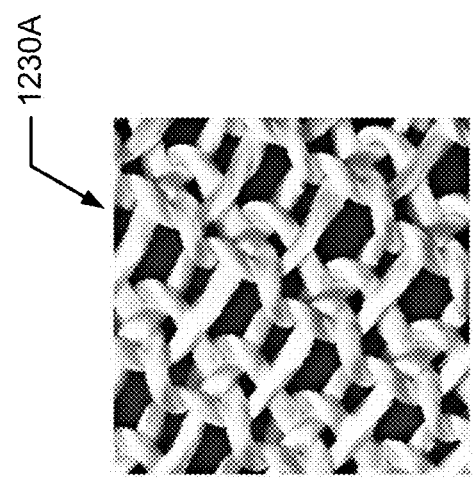
Figure 12D:
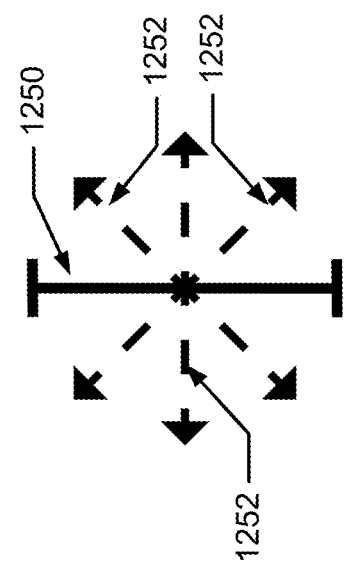

Another example braided structural unit 1230A for a structure library is shown in FIG. 12D. As shown, this braided structural unit 1230A includes a relatively dense braided structure with a repeating series of looped or intertwined textile strands forming relatively small openings. As further shown in FIG. 12D, this braided structural unit 1230A provides: (a) relatively strong "lockdown" (e.g., resistance to stretch) in the vertical direction of FIG. 12D, shown by the solid and relatively thick property line 1250 extending in the vertical direction of FIG. 12D; and (b) areas/directions of "mobility" (or increased stretch/flexibility) in the horizontal and diagonal directions of FIG. 12D, shown by the relatively thin property lines 1252 in FIG. 12D. Due to the more dense braid structure of this example, this structural unit 1230A is even more closed that the example of FIG. 12C, providing less breathability/air permeability at locations where the structural unit 1230A is provided. An individual structural unit 1230A may constitute the braided structure needed to provide and support one repeated unit of the braid structural unit 1230A. Alternatively, a structural unit of this type could encompass the braided structure surrounding multiple repeated units of the braid structure in one or more dimensions.

A final example braided structural unit 1240A is shown in FIG. 12E. As shown, this braided structural unit 1240A includes a dense braided structure that forms a diagonal mesh with a repeating series of looped or intertwined textile strands forming relatively small openings. As further shown in FIG. 12E, this braided structural unit 1240A provides: (a) relatively strong "lockdown" (e.g., resistance to stretch) in the diagonal directions of FIG. 12E, shown by the solid and relatively thick property lines 1250 extending in the diagonal directions of FIG. 12E (e.g., in the directions substantially parallel with relatively straight and continuous lines of braided materials) and (b) areas/directions of "mobility" (or increased stretch/flexibility) in the vertical and horizontal directions of FIG. 12E, shown by the broken property lines 1252 extending vertical and horizontal in FIG. 12E (e.g., along directions that cross the open holes of the mesh). Due to the more dense braid structure of this example, this structural unit 1240A is even more closed that the example of FIG. 12D, providing less breathability/air permeability at locations where the structural unit 1240A is provided. An individual structural unit 1240A may constitute the braided structure needed to provide and support one repeated unit of the braid structural unit 1240A. Alternatively, a structural unit of this type could encompass the braided structure surrounding multiple repeated units of the braid structural unit in one or more dimensions.

Figure 13A:
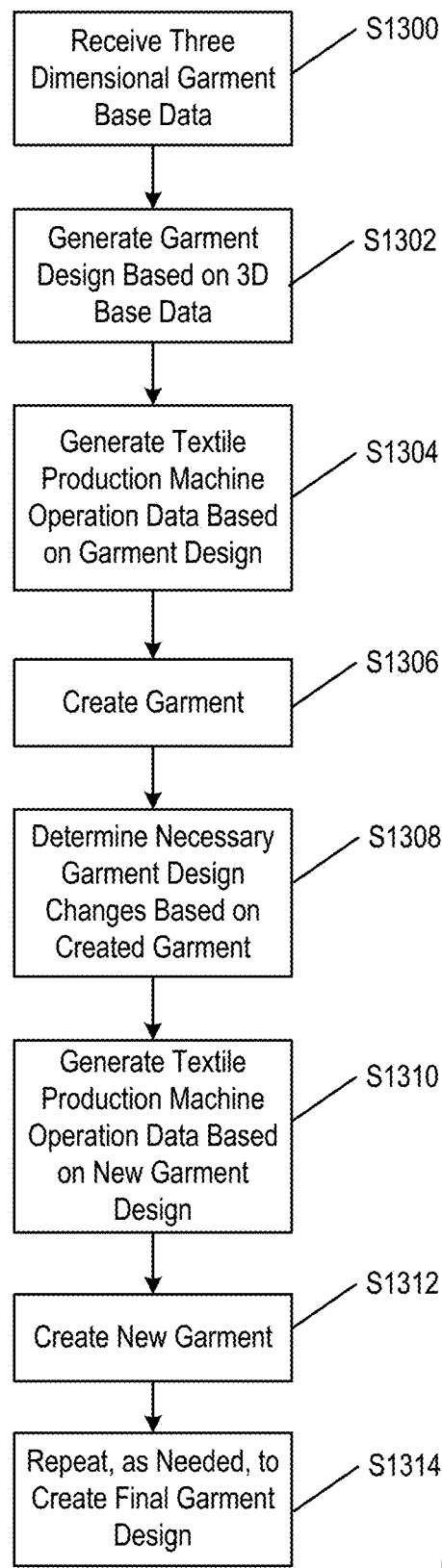
FIGS. 13A and 13B illustrate steps and workflow useful in accordance with one or more aspects of the present disclosure for braiding examples.
Figure 13B:
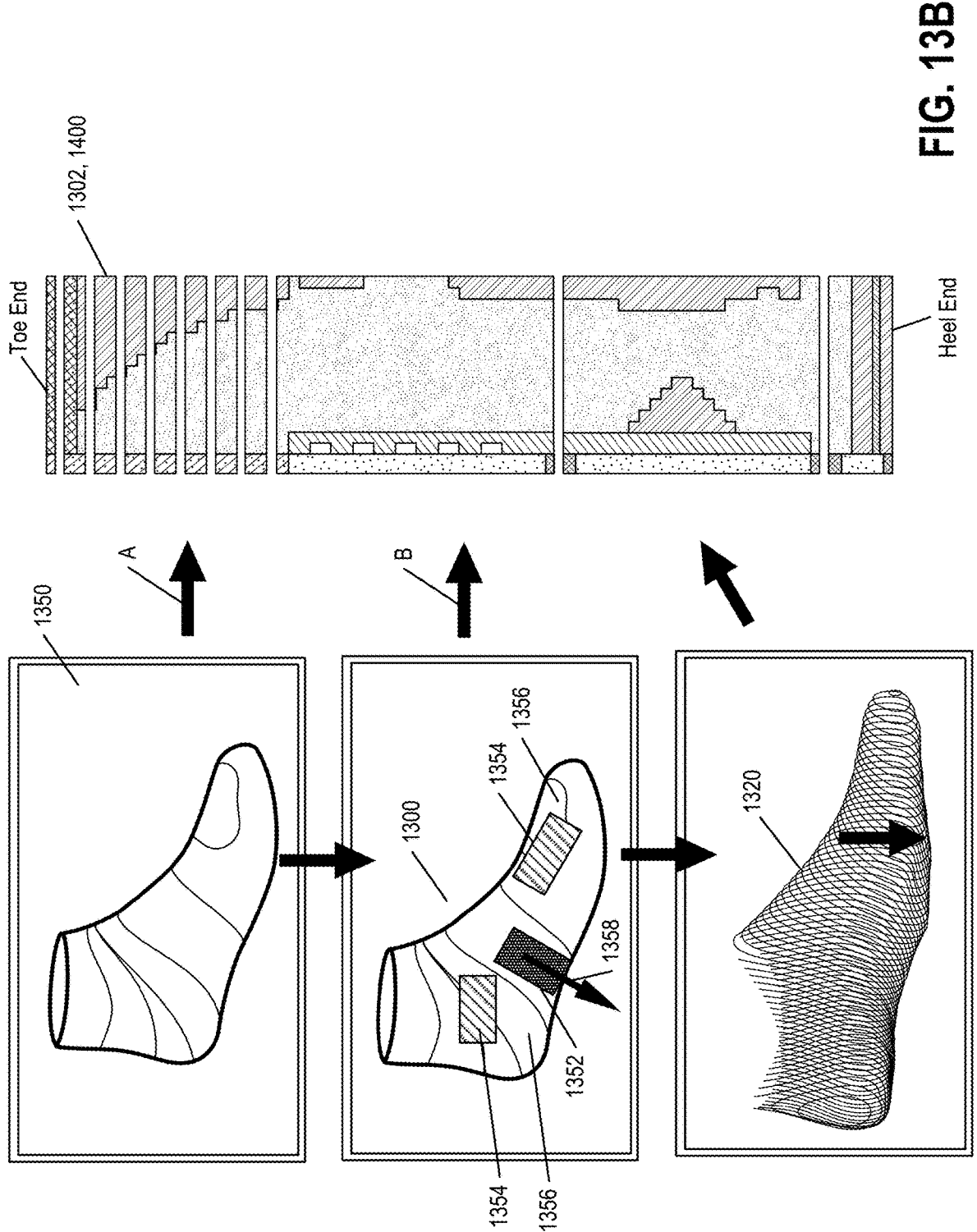

Based on one or more braided structural units (e.g., of the types described above in conjunction with FIGS. 12A-12E), using a structural library, a designer can design a braided garment product (e.g., a shirt, a footwear upper, etc.) to have various desired properties (e.g., lockdown, mobility, flexibility, stretch, stretch resistance, breathability, air permeability, insulative, etc.) at desired locations by placing proper braided structural units that provide the desired properties at the necessary locations. FIGS. 13A and 13B provide an example of application of aspects of this technology to a braiding garment environment, and this process may follow the same general procedures described above in conjunction with the knitting embodiments of FIGS. 5A and 5B. FIG. 13A includes a flow diagram that generally outlines a method in accordance with at least some aspects of this technology, and FIG. 13B illustrates additional details of at least some portions of the workflow and system features relating to this example. As shown in FIG. 13A, an initial step S1300 of this example process includes receiving "three dimensional garment base" data. This garment base data may come from any suitable source, such as: (a) from an optical scan of a specific wearer's body (e.g., to provide dimensional information, optionally to create a customized garment); (b) from a thermal scan of a specific wearer's body (e.g., to provide heat release information, optionally during or after the user is engaged in an activity for which the garment is being designed); (c) from a photograph or video data; (d) from a standard size source (such as a mannequin or other structure sized at a standard garment size (e.g., child/infant sizes 3 months, 6 months, 9 months, 12 months, and 18 months; toddler/small child sizes 2, 3, 4, 5, 6, and 6X; youth sizes 8, 10, 12, 14, and 16; adult sizes XS, S, M, L, XL, XXL, XXXL; etc.)); (e) from a base garment library; etc. The three dimensional garment base data may be provided, for example, in Adobe Illustrator® (graphic design software available from Adobe, Inc.) or other graphic design software. FIG. 13B shows an initial display of three dimensional garment base data on a computer display device at reference number 1350. This specific example of the three dimensional garment base data 1350 includes a foot scan or a garment base for a footwear upper, although other base data, garment structures, and/or other base starting points may be used (such as three dimensional information regarding a last around which a footwear upper may be built, a thermal scan, etc.).

Starting with the three dimensional garment base data 1350 (or other appropriate garment/body information and/or data, such as stored data from a garment design 1300 of a previous iteration of the process described below, a base garment design, etc.), a designer may provide input (through a user interface) indicating or modifying structure/properties for various areas of the garment. This is shown in FIG. 13B by adding "lockdown" areas 1352 to the upper's midfoot area and "breathability" areas 1354, e.g., in the toe box and/or ankle areas. The input data for the "lockdown" areas 1352 may include directional information indicating the direction(s) in which lockdown or stretch resistance is desired, e.g., as shown by arrow 1358 in FIG. 13B. Additionally or alternatively, similar directional information may be provided to indicate desired directions in the garment structure for mobility, stretch, flexibility, or other properties. Such input information may be used by the computer translation module in determining how to orient the braid or other textile structural unit within the garment design to provide the desired directional property(ies) to the final garment. The remainder of the garment design 1300 may be designated to have a "base" braid design 1356 for this garment (e.g., a braid pattern with moderate/intermediate stretchability and moderate/intermediate breathability in remaining areas).

In at least some examples of this technology, a "translation module" of a computer/computer program may automatically generate at least some portions of an initial garment design 1300 (and optionally an entire initial garment design 1300) based at least in part on the three dimensional base garment data 1350 and/or the user's input through the user interface. For example, for the garment design 1300, a computer program may generate a garment design 1300 having areas of higher lockdown 1352 in the garment structure (e.g., areas with extended lengths of solid, braided structure, including braided structure oriented in the correct direction(s) to provide the desired lockdown direction(s) and areas of increased air permeability 1354 (e.g., larger holes) in other areas of the garment design 1300).

At Step S1302, based on the garment design 1300, garment design input data 1302 for the garment design 1300 may be generated. This step S1302 may be performed, at least in part, by a computer using a "translation module" (e.g., "translation" software) examples of which are described in more detail below. This garment design input data 1302 may include a data set with instructions for generating a garment on a computer controlled textile generating machine to produce a physical garment including the desired garment design 1300. The garment design input data 1302 created (e.g., by the translation module) may include data representing different textile structural units and/or different textile production actions at various locations in the garment structure to provide the desired local properties. As some more specific examples, the garment design input data 1302 may include: (a) data representing textile production steps needed to form a first textile structural unit (e.g., in area 1352) at a first location in the garment design 1300 and (b) data representing textile production steps needed to form a second textile structural unit (which may be the same or different from the first textile structural unit, e.g., in area 1354) at a second location in the garment design 1300. A garment design 1300 may have several different or independent textile structural units located at different locations over the garment design 1300. Examples of garment design input data 1302 and different textile structural units are described in more detail below. FIG. 13B generally illustrates a portion of the garment design input data at reference number 1302.

After the initial garment design input data 1302 is generated, this garment design input data 1302 may be converted, if necessary, to a textile producing machine instruction data set (S1304, FIG. 13A). As a more specific example, if necessary, the garment design input data 1302 may be converted to a specific form and/or format used to operate and control a textile producing machine, such as a braiding machine, a winding machine, an embroidery machine, a weaving machine, a nonwoven production machine, a fused filament fabrication machine, etc. This data conversion, when needed, may take place at the design computer 102 used in the garment design process (e.g., for the garment design steps described above), at a computer included with or operating the textile producing machine, at another computer, etc. Computer controlled textile producing machines and software for operating them are known and used in the art. Any desired type of computer controlled textile producing machine may be used in accordance with aspects of this technology, such as braiding machines, winding machines, embroidery machines, weaving machines, nonwoven production machines, fused filament fabrication machines, etc. This aspect of the process can follow the same general flows of the processes described above in conjunction with FIGS. 5A and 5B for knitting machines.

Once the garment design input data 1302 is converted (if needed) to a textile producing machine instruction data set and transmitted to the textile producing machine, the machine instruction data set operates the textile producing machine to create a first garment based on the garment design input data 1302 at Step S1306 (FIG. 13A). As a more specific example, a braiding machine instruction data set may control individual cylinders of a braiding machine to rotate in proper order(s), direction(s), and location(s) to create a first garment, e.g., to create a first garment with the first textile structural unit at a first location in the first garment structure and the second textile structural unit at a second location in the first garment (as well as any other textile structural units in the design).

Because of various factors (e.g., differences in yarn materials (e.g., stretch, strength, contraction, etc.), material shrinkage, material properties, bunching, etc.), sometimes a textile product does not turn out as expected. As some examples, the first garment may have bulges, recesses, areas of excess material and/or bunching; may not drape correctly; may have structural integrity issues; may not physically fit the body correctly; or the like. These unexpected issues especially tend to arise early in the process of designing a new garment and/or when trying new materials and/or new combinations of materials. As other examples, the garment may not perform in the manner desired/anticipated (e.g., may not include adequate structure to hold together for long term or intended use, may not provide the desired level of air permeability, may not provide the desired level of stretch resistance, may not provide the desired texture and/or drape features, may not fit correctly, may not have the desired aesthetic appearance, may be too heavy or too light, may use excess material, may use too many expensive materials, etc.). Any of these types of issues and/or other issues with the first garment produced in this process may cause the garment designer to want to alter the garment design.

Therefore, in at least some examples of this aspect of the technology, at S1308, the first garment produced may be carefully evaluated to determine what garment design changes may be desired in an effort to address some/all of the issues with the first garment and/or to otherwise improve the garment design. In at least some examples of this aspect of the technology, the designer may make changes to the initial/previous garment design 1300 in the graphic design software (e.g., in the Adobe Illustrator® file) and thereby create a revised garment design in the graphic design software (e.g., returning back to the user interface shown in FIG. 13B). The revised garment design may include changes (as compared to the initial garment design 1300) to at least one of: a size of the first textile structural unit in the revised garment design; a position of the first textile structural unit in the revised garment design; a size of the second textile structural unit in the revised garment design; a position of the second textile structural unit in the revised garment design; a relative positioning of the first textile structural unit with respect to the second textile structural unit in the revised garment design; a relative positioning of the first textile structural unit with respect to another textile structural unit in the revised garment design; a relative positioning of the textile knit structural unit with respect to another textile structural unit in the revised garment design; eliminating at least one of the first textile structural unit or the second textile structural unit in the revised garment design; adding one or more additional textile structural units (which may be the same as or different from either or both of the first and/or second textile structural units) in the revised garment design; changing a material in one or more portions of the revised garment design (and optionally changing a material of some or all of the first textile structural unit and/or the second textile structural unit); changing a distance between two occurrences of the first textile structural unit in the revised garment design; changing a distance between the first textile structural unit and another textile structural unit in the revised garment design; and/or changing an orientation of the textile structural unit in the revised garment design.

Again using the "translation" module of the software, the revised garment design from the graphic design software (when used) may be used to generate revised garment design input data (e.g., similar to but revised from the garment design input data 1302 in FIG. 13B). This revised garment design input data may include changes to various features from (or as compared to) the initial garment design input data 1302, such as any one or more of the changes described above.

Additionally or alternatively, rather than making the changes to the garment design in the graphic design software, a designer may make one, some, or all of the desired garment changes directly in the garment design input data 1302. Additionally or alternatively, in at least some examples of this technology, changes to the garment design 1300 made in creating the revised garment design in the user interface and/or the revised garment design input data 1302 may include changes to structure suggested to the user and/or generated automatically by systems and methods according to at least some aspects of this technology, e.g., using "rules," examples of which are described above.

Once the revised garment design input data is created, this revised garment design input data may be converted, if necessary, to a textile producing machine (e.g., a braiding machine) instruction data set (S1310, FIG. 13A). As a more specific example, if necessary, the revised garment design input data may be converted to a specific form and/or format used to operate and control a braiding machine (FIG. 13B), which may be the same braiding machine as used to generate the first garment or a different braiding machine (of the same type/model or different type/model). This data conversion, when needed, may take place at the design computer used in the garment design process (e.g., to create the revised garment design and/or the revised garment design input data and/or used in the other garment design steps described above), at a computer included with or operating the braiding machine, at another computer, etc.

Using the revised textile producing machine instruction data set, at least one textile producing machine (e.g., a braiding machine) creates a second garment (Step S1312). During this step S1312, operation of the textile producing machine is controlled using the revised textile generating machine instruction data set to create (e.g., braid) the second garment corresponding to the revised garment design input data including the changes from the initial garment design input data. As a more specific example, the textile producing machine instruction data set may control individual cylinders of the braiding machine to create the second garment with the changes from the initial garment design input data 1302.

Once created, the second garment may be carefully evaluated to determine what additional garment design changes, if any, may be desired in an effort to address some/all of the issues with the second garment, if any. Because of various factors, as noted above, sometimes even this second generation product (i.e., the second garment in this example) does not turn out as expected. For example, the second garment may have any of the structural, fit, and/or other issues described above. Any of these types of issues with the second garment in this process may cause the garment designer to want to further alter the garment design. In this instance, Steps S1308-S1312 may be repeated, as often as necessary, until a final desired physical garment and/or garment design is/are created (Step S1314).

As shown in FIG. 13B, in some examples of this technology, the garment design input data 1302 may be generated by the translation module directly from the initial three dimensional garment base data 1350 (arrow A) or directly from other initial garment design information. Additionally or alternatively, if desired, the translation module of systems and methods according to some examples of this technology may generate: (a) the initial garment design 1300 from body map data 1350 or other input data and then (b) generate the initial garment design input data 1302 from the initial garment design 1300 (arrow B). Additionally or alternatively, the garment design(s) (e.g., 1300, before and after revisions) may function and/or operate together with the garment design input data (e.g., 1302, before and after revisions) such that changes in one data set will automatically apply and create corresponding changes in the other data set. For example, systems and methods according to at least some examples of this technology may operate such that: (a) changes made in the garment design input data 1302, will be translated to and/or displayed (or displayable) in a graphical user interface showing the garment design 1300, and/or (b) changes made to the visual representation of the garment design 1300 in the graphical user interface will be translated to the garment design input data 1302. Such corresponding changes in the two data sets 1300 and 1302 may take place automatically (e.g., in real time as the changes are being input), after a delay, in response to a "make changes" command, and/or at any other desired time.

The examples above with respect to FIGS. 13A and 13B describe an iterative process for designing garments to change from (e.g., correct issues or problems with) earlier iterations of a design 1300. Similar iterative processes can be used, however, even if the initial garment design input data 1302 and/or the first garment produced provide an acceptable garment product. For example, in methods in accordance with at least some examples of this technology, the second garment (and/or the revised garment design and/or the revised garment design input data) may be changed in overall size as compared to the size of the first garment (and the first garment design 1300 and/or initial garment design input data 1302). In fact, in some examples, systems and methods in accordance with this technology may be used to create graded sizes of a garment design (e.g., sizes graded between two or more individual sizes of: child/infant sizes 3 months, 6 months, 9 months, 12 months, and 18 months; toddler/small child sizes 2, 3, 4, 5, 6, and 6X; youth sizes 8, 10, 12, 14, and 16; and/or adult sizes XS, S, M, L, XL, XXL, and XXXL).

Additional potential features and examples of "translation" from the three dimensional garment base design data 1350 and/or a garment design 1300 to garment design input data 1302 according to this braiding example now will be described. As noted above, in at least some examples of this technology, three dimensional garment base design data 1350 and/or a garment design 1300 may be used as a starting point for creating garment design input data 1302. In some examples of such systems, at an appropriate time, a designer may select a base material and/or a base braid construction for the garment. Using the base design 1350 or garment design 1300, selection tools (e.g., a mouse or other pointer), or other input, the user or translation module software may identify one or more areas on the garment structure where specific braid structural units 1352, 1354 may be needed and/or where one or more changes to a base braid construction may need to be made, e.g., to achieve a desired benefit (e.g., to provide desired lockdown, mobility, stretch resistance, flexibility, air permeability, ventilation, thermal insulation, raised texture, structural support ribs, stretchability, expandability, hydrophobicity, etc.). The translation module then may add data to (or modify data already included in) a garment design input data structure (e.g., to a bitmap or other appropriate data set or data structure) representing these desired braid structural units at the desired locations so that the proper braid structural units will be produced at the desired locations in the garment structure. The display of the garment design 1300 and/or the revised garment design also may be updated to show the changes visually (e.g., addition of and/or modification to braid structural unit features in the displayed depiction of the garment).

If necessary or desired, the translation module also may apply any desired structural rules relating to the braid structural units. This may be accomplished before, while, or after the desired braid structural units are included in the garment design input data 1302 set and/or the revised garment design input data set (and changes may be made by the translation module, if needed, to comply with the rules). Alternatively, the user may be notified that a rule has been violated and asked how they would like to rectify the issue (optionally, by proposing one or more alternatives, by providing a "rule override" option, etc.).

Once all desired braid structural units are inserted into the garment design input data 1302 set and/or the revised garment design input data set at the appropriate locations (and optionally into the garment design 1300 and/or revised garment design as displayed on the design computer display), the translation module can fill in other areas of the data set (e.g., other areas of the bitmap) with data representing the base material and/or the base braid construction for the desired garment. Alternatively, if desired, the garment design 1300, garment design input data 1302, revised garment design, and/or the revised garment design input data could be initially created by creating the entire garment design information using the selected base material and/or the selected base braid construction for the desired garment (or default materials and/or constructions) and then information identifying the desired braid structural units at various zones or areas to achieve the desired effect (e.g., performance benefit) can be substituted into the garment design (e.g., into one or more of the garment design 1300, garment design input data 1302, revised garment design, and/or the revised garment design input data) at the appropriate locations to replace the previously present base material and/or base textile construction. Some more specific examples of operation of the translation module to create and locate the braid structural units are described in more detail below.

The following example relates to use of three dimensional garment base data 1350 in the form of a 3D rendering as a base for creating garment design input data 1302. Using the specialized property areas (e.g., high lockdown areas 1352 and high breathability areas 1354 shown in FIG. 13B) input by the user in a user interface, a computer program translation module may generate a garment design 1300 having specific "braid structural units" (e.g., from a library of braid structures such as those described above in conjunction with FIGS. 12A-12E) to provide areas or zones with braid structures having higher lockdown and to provide areas or zones in the garment design 1300 with braid structures providing higher air permeability.

In such systems and methods, the garment design data 1300 (e.g., from Adobe Illustrator® or other graphic design tool) is transformed or translated (by a computer "translation module") into garment design input data 1302 and/or revised garment design input data. The data or data structure corresponding to the garment design input data 1302 and/or the revised garment design input data may have any desired form, format, and/or configuration without departing from this aspect of the disclosure.

In this illustrated example, the three dimension garment design data 1300 (e.g., from the user interface) is converted into a two dimensional representation of the garment. This is accomplished in this example by dividing the three dimensional design data 1300 into a series of parallel cross sectional planes 1320 as shown FIG. 13B. The planes 1320 of this example are substantially vertical planes that align in the front-to-back (e.g., toe-to-heel) direction as shown in FIG. 13B. The three dimensional garment is then flattened into a two-dimensional representation of the garment, e.g., in a computer equivalent action of cutting the planes 1320 (e.g., along a central axis extending along the sole). Because the garment is hollow, this virtual "cutting" action converts the perimeter of the plane 1320 into a linear structure having a length corresponding to the perimeter of the plane 1320. This linear structure can be laid out to form a flat representation of the garment. From a data point of view, this action may correspond to production of a bit map (which may correspond to the garment design input data 1302) in which the rows of the bitmap correspond to the cross sectional locations of the various planes 1320 and the length of (the number of bits in) each row corresponds to the linear size or perimeter of the plane 1320 in that cross section.

Figure 14:
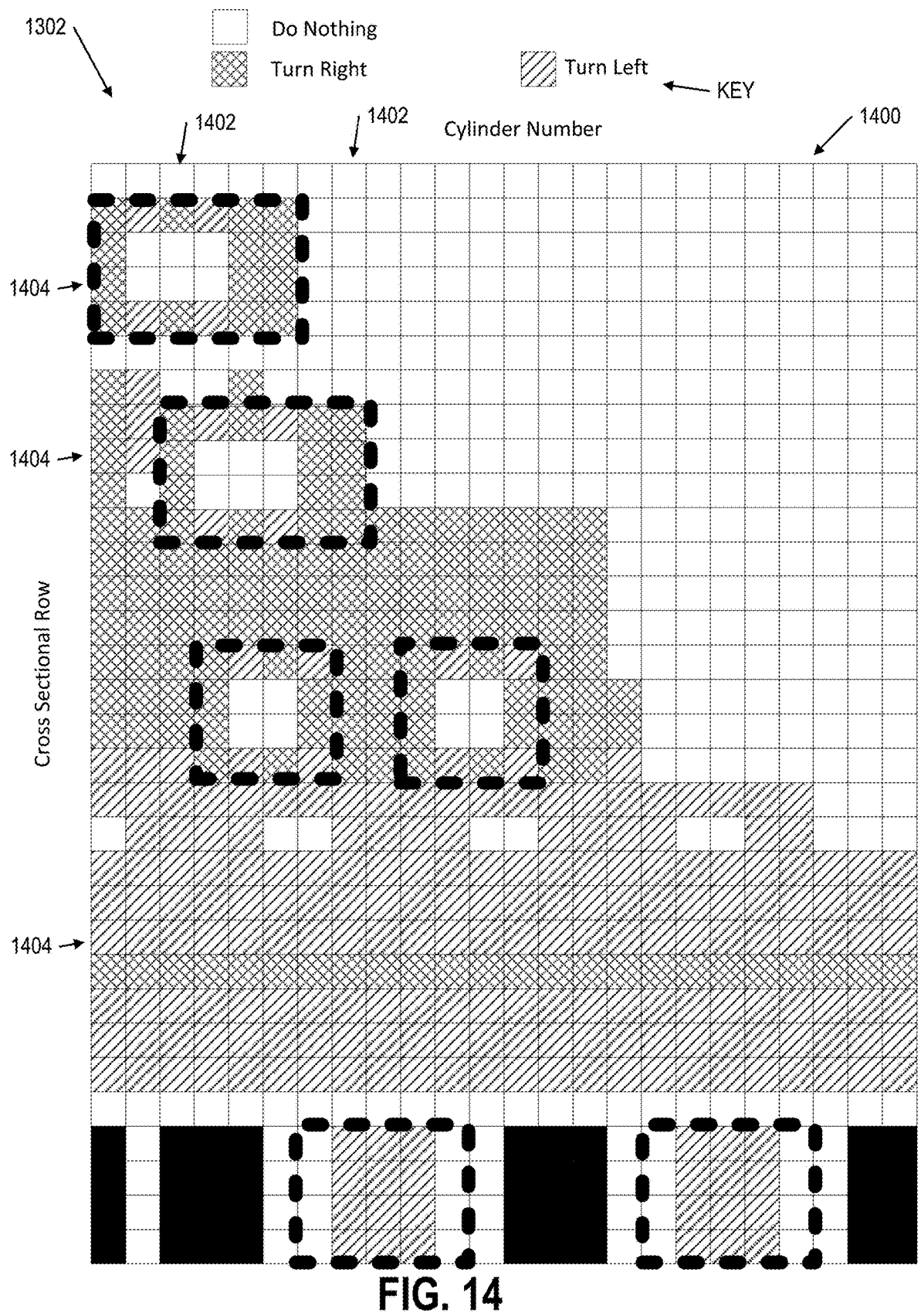
FIG. 14 illustrates an example data structure representation for garment design input data and/or revised garment design input data that may be used in accordance with one or more aspects of the present disclosure for braiding examples.

FIG. 14 illustrates example features of a potential data structure 1400 for garment design input data 1302 and/or revised garment design input data in accordance with at least some examples of this aspect of this technology. In this illustrated example, the garment design input data 1302 and/or the revised garment design input data is provided as a bitmap 1400. Each column 1402 (vertical in FIG. 14) of the bitmap 1400 represents a specific cylinder of a braiding machine and/or a left-to-right location along the garment design or garment structure to be braided. Each row 1404 (horizontal in FIG. 14) of the bitmap 1400 represents a cross section or cross sectional location of the garment design or garment structure to be braided. The different information provided within each individual bit of the bitmap 1400 (e.g., each different type of shading and/or color) provides information as to what the specific cylinder at that specific location of the braiding machine should do during production of that specific cross sectional location 1404 of the braiding operation (i.e., what the specific cylinder of the braiding machine should do when the braiding machine braids that row 1404 of the garment structure). The top-to-bottom structure of the bitmap 1400 of this example corresponds to the length of the garment structure (e.g., an axial length of the braided garment when braided on a braiding machine, which corresponds to the front-to-back or toe-to-heel length in this specific example).

In this example bitmap 1400 data, each bit of the bitmap 1400 is assigned a color (shown by different shading in the example of FIG. 14), and that color provides information as to what the braiding machine cylinder is to do when forming that specific location in the garment structure. For a conventional braiding machine, a cylinder of the machine can take one of at least three actions: (a) rotate to the right (or clockwise when viewed from above), (b) rotate to the left (or counterclockwise when view from above), or (c) not rotate. Therefore, in this example bitmap 1400 data structure, a different color is assigned to each of these cylinder actions, as shown in the KEY at the top of the figure. A bitmap 1400 (or other appropriate data structure) may include colors, shading, data, or other information corresponding to other actions for the cylinder/braiding machine. Examples of repeated braid structural units are shown in FIG. 14 enclosed in the thick broken lines. If desired, a bitmap 1400 also may utilize additional different colors (and/or sets of three colors for the different cylinder actions) to represent different materials to be used in the braiding process.

As described above, each row 1404 on the bitmap 1400 essentially provides information that identifies what the braiding machine is to do with each individual cylinder of the machine as it braids each cross section location of the braided garment design 1300. As examples, the braiding machine actions needed to create the various braid structural units of FIGS. 12A-12E can be retrieved from a structural library and encoded into the bitmap 1400. Controlling the material, the combination of braid structural units, the braid structural unit orientation, or the like used at various areas or zones of the garment design 1300 provides engineered placement of braided structural units. Such control can be used to control air permeability, insulativity, stretchability, support, drape, weight, lockdown, mobility, flexibility, and/or other desired properties and/or performance benefits of the garment structure.

Various examples of the technology described above included "structural rules" 120 that may be applied when designing knitted products. Such "rules" also may be included and utilized in systems and methods according to aspects of this braiding technology as described above with respect to FIGS. 12A-14. These rules may be applied by the "translation module" that creates the garment design 1300, the revised garment design, the garment design input data 1302, and/or the revised garment design input data. In general, braided components and/or other braid structural units do not live in isolation. Rather, they may affect and may be affected by the structures and/or structural units that surround them both in the top-to-bottom (column) and/or the side-to-side (row) directions. Therefore, "rules" may be provided (and enforced by the "translation module") that limit and/or otherwise control features of a braid construction. These "rules" may be provided, for example: (a) to prevent cylinder/machine damage/breakage (e.g., "mandatory rules"), (b) to protect the garment's structural integrity (not necessarily a mandatory rule, e.g., present to produce a stable final product), and/or (c) to follow braiding "best practices" for a designer or manufacturer (also not necessarily a mandatory rule, e.g., present to make an aesthetically pleasing knit structure, to control costs, to improve sustainability etc.).

As some more specific examples: (a) the "rules" may limit the number of consecutive braid structural units of a particular type within a row and/or column of a braided design and/or a bitmap in order to assure that the garment holds together structurally or does not become overly stiff or overly loose; (b) the "rules" may require that when a first specific braid structural unit is provided at one location of the garment structure, then one or more other specific types of braid structural units and/or braid structural features must be placed (or must not be placed) within a certain distance (vertically and/or horizontally) surrounding that first specific braid structural unit (e.g., to reduce stress on the manufacturing equipment; to provide better aesthetics, drape, etc.; to provide desired structural stability of the garment and/or performance benefit; etc.); and/or (c) the "rules" may be used to produce desired garment characteristics or performance benefits, such as a desired level of air permeability/breathability, a desired thermal insulative effect, a desired weight range, a desired sustainability feature, etc.

A "braid structural unit" may be illustrated or represented in the bitmap 1400 by a specific set of two or more cylinder actions or bits (e.g., repeating or structurally similar sets of two or more cylinder actions or bits). Examples of potential braid structural units that may be included in a garment design 1300 are shown enclosed in sets of thick, dashed lines in FIG. 14. Such collections of cylinder actions and/or bits may be inserted into and/or removed from the garment design input data 1302/revised garment design input data as a single "unit" (thus providing the data in the input data 1302 for forming a "braid structural unit"). The braid structural units correspond to areas of the garment structure having a desired structure, feature, and/or properties, etc., as described above.

Figure 15:
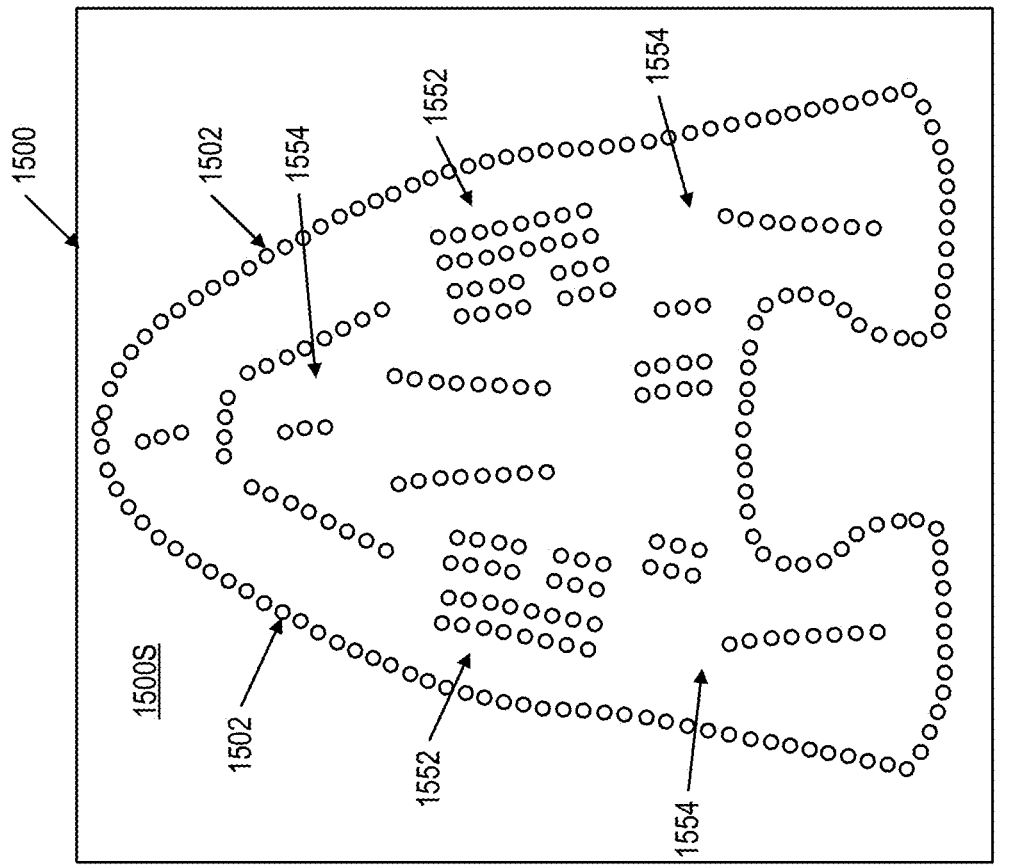
FIG. 15 illustrates steps and workflow useful in accordance with one or more aspects of the present disclosure for winding examples.
Figure 15:
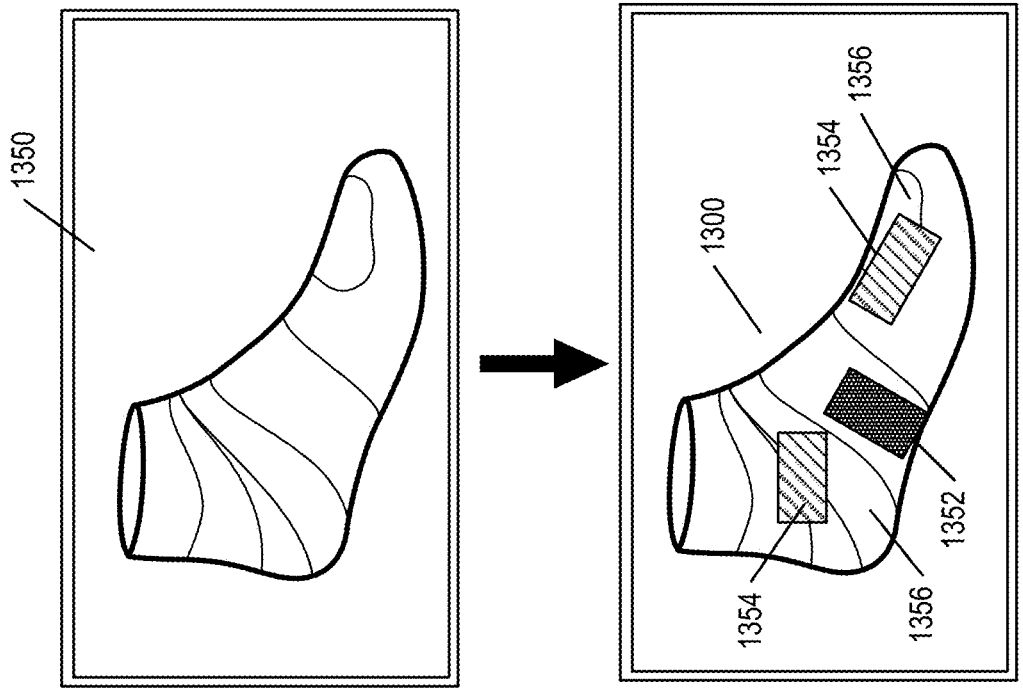

FIGS. 15-17 relate to various aspects and features of application of this technology to a winding method for creating a garment (e.g., by winding one or more threads/filaments around pins 1502 provided on a base member 1500). Winding systems and methods may operate in much the same general manners as the knitting and braiding systems and methods described above in conjunction with FIGS. 1-14, including through the various overall methods described above in conjunction with FIGS. 5A-14. For example, the specific example illustrated in FIG. 15 shows a system and method that starts with three dimensional garment base data 1350 (e.g., from a body scan, a standard starting garment, or other suitable source as described above). From the garment base data 1350, a designer may add various regions designated to include one or more specialized or desired properties through a user interface, such as stretch resistance areas 1352 (e.g., lockdown) and/or increased breathability areas 1354 (e.g., air permeability). Thus, as described above, the designer may produce garment design data 1300 in and using the user interface.

Examples of systems and methods according to this aspect of the technology may include "wound structural units" desired to provide the various specialized or desired properties for the garment design 1300. As some examples, an area of increased stretch resistance may be formed by winding a thread or filament multiple times around a series of closely spaced pins in the desired area for that stretch resistance property. Additionally or alternatively, a less stretchable material may be selected for that area to provide increased stretch resistance (and/or a more stretchable material may be selected for area(s) in which increased stretch is desired). As still additional or alternative features, the number of windings of thread that pass through a given area in one or more different directions (e.g., between any two or more pins) may be controlled to further control features of the design, such as breathability, stretch resistance, etc.

From this garment design data 1300, a "translation module" may convert the three dimensional garment design data 1300 into a two dimensional representation of the garment (optionally, at least in part, using a cross sectional flattening process to produce a two dimensional shape like that described above for FIGS. 13A-14). Once in a two dimensional layout, the translation module can determine pin 1502 placement configurations for a wound structure that will enable creation of the necessary wound structural units in the desired areas to provide the desired properties. For example, as shown in FIG. 15, tighter pin placements are provided in areas 1552 to enable production of wound structures that include several short loops and/or crossing loops to help limit stretch. Additionally or alternatively, different, more stretch resistant materials may be selected for low stretch areas 1352 of the garment design 1300. Wider pin 1502 spacings to enable production of wider openings in the wound structure may be provided in areas 1554 for providing more breathability (e.g., corresponding to increased breathability areas 1354). Other pins 1502 may be provided, e.g., around the perimeter of the garment and/or other locations, to enable production of a base wound design at areas 1356 of the garment design 1300 with the base structure. Thus, wound structural units may be translated into data that describes pin 1502 placement and thread winding information needed to provide the desired wound structural units and/or properties.

FIGS. 16A and 16B provide additional information about pins 1502, the pin base member 1500, and winding features useful according to at least some examples of this technology. As shown in these figures, the pins 1502 extend upward from the surface 1500S of the pin base member 1500 to provide structure around which a thread or filament 1510 may wrap. As shown in FIG. 16A: (a) a thread or filament 1510 may wrap around a pin 1502 from the left with respect to the direction from which the thread/filament dispensing machine approaches the pin (or clockwise, when viewed from above) or (b) a thread or filament 1510 may wrap around a pin 1502 from the right with respect to the direction from which the thread/filament dispensing machine approaches the pin (or counterclockwise, when viewed from above). Also, as shown in FIG. 16B: (a) a thread or filament 1510 may wrap around two pins 1502 in a manner to provide a single open central area 1520 in which the thread/filament 1502 does not cross itself or (b) a thread or filament 1510 may wrap around two pins 1502 in a manner to provide to cross itself (intersection 1522) one or more times, thereby providing two smaller open areas 1524 (one on each side of intersection 1522) or a "Figure-8" type structure. These different winding features of FIGS. 16A and 16B also can be used to control properties of a wound structural unit and/or of the garment.

FIGS. 16A and 16B show threads/filaments 1510 that wrap almost substantially completely around the individual pin(s) 1502 (e.g., around at least 180° or more around a pin 1502) such that the thread/filament 1502 substantially returns in the same general direction from which it originated. Other options are possible. For example, a thread/filament 1510 may wrap less than halfway around the perimeter of a pin 1502 simply to change its direction in the wound structure. As a more specific example, a thread/filament 1510 may wrap around about 90° of a pin 1502 perimeter to change directions in the wound structure by approximately 90°. Some pins 1502 can be wrapped with thread/filament 1510 at even smaller angles around a pin 1502 perimeter, e.g., to deflect the thread/filament 1510 direction by less than 90° (e.g., from 1° to 89°. The thread/filament 1510 also may wrap any amount more than 90° around a pin, e.g., including from 91° to 360°. Also, if desired, a pin may be wrapped more than one full time before the thread/filament 1510 is moved to another pin. Thus, the term "wrap" as used herein means any desired wrap angle/wrap extent around a pin (e.g., from 1° to 360° or even more).

FIG. 17 provides an example data structure 1700 that may be used in at least some examples of winding systems and methods according to aspects of this technology. While FIG. 17 shows the data structure 1700 as a bitmap, any desired type of data structure may be used without departing from this technology, including a stream of bits. In this example system and method, each individual pin 1502 on the pin base member 1500 includes a separate and unique identifier (e.g., a pin number). In the data structure 1700 example of FIG. 17, each individual bit 1702 represents the next pin 1520 to which the thread/filament dispensing machine should move and around which the thread/filament 1510 should move and wrap (e.g., by any angular amount, e.g., from 1° or more) to create the desired design (and to create any desired wound structural units within the design). The color of the individual bits 1702 in FIG. 17 represents the direction around which the thread/filament 1510 should wrap around the pin 1502 (e.g., from the left or from the right as shown in FIG. 16A). Repeated patterns of pin wrapping instructions (not necessarily around the same individual pins) may be used to produce repeated wound structural units within the final wound garments. The pin 1502 arrangement on the pin base member 1500 and/or the wrapping order and direction data structure 1700 may constitute "garment design input data" (and/or "revised garment design input data") of the types described above with respect to elements 502 and/or 1302 in the knitting and braiding embodiments, respectively. A data structure 1700 of this type also may include different colors to represent different thread/filament 1510 materials to be used for various different parts of the garment design (e.g., to enable property control by using different materials).

Once the wound design is completed (e.g., the thread/filament dispensing machine dispensing head completes all pin wrap actions described by the data structure 1700), if necessary or desired, the wound threads/filaments may be held/fixed in place, e.g., by fusing the perimeter edges and/or other locations in the design (e.g., by applying heat and pressure if the threads/filaments used are fusible to one another); by applying a fixing component (e.g., an edge component), e.g., made from textile, plastic, TPU, leather etc., using fusing techniques, printing techniques, adhesives, or the like; or in another manner. Such action may prevent the threads/filaments 1510 from unraveling when removed from the pins 1502, help the garment or textile element maintain its shape, and enable further production and/or use of the wound final garment/textile component (e.g., to incorporate an upper into a shoe structure, to add other design or garment components, etc.).

The pin base member 1500 and the desired pin 1502 arrangement may be provided in any desired manner in accordance with this technology. For example, if desired, the two dimensional base surface 1500S of the pin base member 1500 may include a continuous and regular array of open holes and removable pins 1502 may be provided in the desired pattern (e.g., as shown in FIG. 15) by inserting pins 1502 into the appropriate individual holes. As another example, the two dimensional base surface 1500S of the pin base member 1500 may include an array of retractable pins 1502, and the individual pins may be extended or retracted in a manner to provide the desired pattern (e.g., as shown in FIG. 15). As yet another example, if desired, the pin base member 1500 and its raised pins 1502 may be generated from the computer representation of the two dimensional pin base member 1500/pin 1502 arrangement by a rapid manufacturing technique (e.g., a 3D printing technique). Other ways of creating such a pinned plate 1500 with the desired pin 1502 arrangement (e.g., molding techniques) also may be used with this technology.

As noted above, the braiding and/or winding systems and methods according to aspects of this technology may include use of the iterative design processes described above for the knitting based systems and methods. Additionally or alternatively, in at least some examples of this technology (or in use of at least some examples of systems in accordance with this technology), changes from the garment design input data 1302 to revised garment design input data may reflect a change in the size of the garment design, e.g., from a garment of a first size to a garment of a second size that differs from the first size. Notably, in some examples of this technology (or in use of at least some examples of systems and methods in accordance with this technology), changes from the garment design input data 1302 to revised garment design input data may reflect a change in the size of the garment design from a garment of a first standard size to a garment of a second standard size that differs from the first standard size by at least one standard size gradation amount. These types of size changes can occur, for example, when creating a "line" of garments of the same general design and/or style in several different sizes, e.g., garments of sizes selected from two or more of: child/infant sizes 3 months, 6 months, 9 months, 12 months, and 18 months; toddler/small child sizes 2, 3, 4, 5, 6, and 6X; youth sizes 8, 10, 12, 14, and 16; and/or adult sizes XS, S, M, L, XL, XXL, and XXXL. Such changes may require changes in the dimension(s) of the bitmap 1400 (e.g., changes in the number of columns 1402 and/or rows 1404 in the bitmap 1400 and/changes to the number of active bits within a given row or column) and/or changes in pin placement pattern (1500) and/or the data structure 1700.

When creating garments of different sizes based on an initial garment design, the sizes of all features of the garment cannot, in at least some instances, simply be scaled proportionally across the entire garment design to create the second garment size. Such complete proportional scaling could result in manufacturing, structural, and/or aesthetic issues (e.g., insufficient space may be provided between adjacent textile structural units to maintain adequate structure in the garment and/or desirable drape, too much space may be provided between adjacent textile structural units for the garment to sit or drape properly on the wearer's body, insufficient space may be provided to allow certain machine/manufacturing actions or combinations of such actions to be performed safely, etc.). Thus, application of the "structural rules" advantageously may be used in systems and methods in accordance with some examples of this technology when changing overall garment sizes and/or creating garments or garment designs over a size run (e.g., with different standard size gradations). The systems and methods described above in conjunction with the knit embodiments of FIGS. 8A-10C provide various examples of application of such "rules," and these same or similar type rules, systems, and methods can be used in the braiding systems and/or methods described above with respect to FIGS. 12A-14 and/or in the winding systems and/or methods described above with respect to FIGS. 15-17. Additionally or alternatively, the feedback and/or subscription systems and methods described above in conjunction with FIGS. 11A and 11B also can be used with the braiding systems and methods described above with respect to FIGS. 12A-14 and/or in the winding systems and/or methods described above with respect to FIGS. 15-17.

Any and/or all of the various aspects of this technology described above in conjunction with FIGS. 1-17 may be applied to other garment and/or textile manufacturing processes as well. As some more specific examples, aspects of this technology may be applied to weaving manufacturing processes, nonwoven manufacturing processes, embroidery processes, and fused filament fabrication processes (also known as "fused deposition modeling" or "solid deposition modeling"). While any and/or all of the various systems, methods, and the like described above with respect to FIGS. 1-17 and knitting, braiding, and/or weaving manufacturing processes may be applied to these other manufacturing processes, the following provides some additional examples relating to these additional processes.

Weaving processes, such as using a Jacquard loom, may utilize computer controlled CAD design systems and computer controlled weaving processes. Such processes, and particularly with a Jacquard loom, have wide ranging weave design and production capabilities. These types of weaving systems and methods are known and used in the textile production arts.

In weaving processes, the warp yarns typically are held in tension (e.g., typically vertically) and the weft yarns are introduced into the structure in a direction transverse to the warp yarns (typically horizontally). By selecting appropriate materials and material properties for the individual warp and weft yarns (and/or portions thereof), the properties of the woven product can be controlled, including properties in various local areas of the woven product. As some more specific examples, appropriate weft yarn and/or warp yarn materials may be selected and placed in the weft and warp yarn directions of the weave to control local properties of the resultant woven product. For example, one or more individual yarns (or portions thereof) in the warp direction and/or the weft direction may be selected to have less tensile stretchability (as compared to other yarns in the weave). In this manner, the less stretchable yarn(s) may be provided in specific local locations and/or oriented in appropriate directions to enable production of localized areas having less stretchability in the direction that the less stretchable yarn(s) extend(s). If desired, one or more individual yarns in the weft direction and/or the warp direction may be formed from multiple different materials (e.g., joined together) to provide different localized properties along the longitudinal direction of that specific yarn. The material(s) and the material properties of the yarn strand provided in the various local locations (in both the warp direction and the weft direction) can be used to control stretchability (more or less stretchable), breathability, lockdown, mobility, and/or any one or more other features for textile structural units as described above.

Other potential alternatives or additional features for providing localized control and/or differences in a weave structure include the "tightness" or "openness" of the weave structure. Tightness or openness enable localized control of the breathability features of the final woven product. For example, tighter weaves may provide less breathability (or more insulative ability) than more open weaves. Yarn thickness (e.g., diameter) in the warp and/or weave direction may be used as another alternative to locally control the breathability of the weave structure and the final woven product.

As for an example woven structural unit, in a manner similar to FIGS. 7 and 14, the final desired product may be considered as a two dimensional structure, e.g., one that could be represented on a bitmap. For example, columns of the bitmap in the vertical direction may represent individual warp yarns of the structure and rows of the bitmap may represent individual weft yarns of the structure. The information included in the individual bits of the bitmap may represent, as examples, the type of yarn material, the thickness (e.g., diameter) of the yarn material, and/or other properties of the yarn material. As additional or alternative examples, information in the individual bits of the bitmap (e.g., color) may identify which of the two yarns (e.g., the warp yarn or the weft yarn) should overlay the other yarn at the specific local location. Additionally or alternatively, information in the bitmap may designate and/or encode a specific weave pattern or weave structure to be used in various local areas of the overall woven product configuration. Repeated patterns of weave instructions within the bitmap (akin to one or two-dimensional areas enclosed by large, broken lines in FIGS. 7 and 14) may represent individual woven structural units for this example of the technology. Such woven structural units may be stored in a structural library and inserted into or removed from the garment design (e.g., as garment design data or garment design input data) as a unit.

As yet additional or alternative options, the data structure for this type of weaving technology may constitute a punchcard pattern, e.g., used to provide instructions to commercial weaving systems in accordance with at least some weaving technologies. Additionally or alternatively, if desired, the bitmap or other data structure information described above may be converted to this type of punchcard data/pattern if such information is needed in that form/format to operate a specific weaving machine (e.g., converting from garment design data to garment design input data as described above).

Technology of this type also may be applied to nonwoven textile production. Nonwoven textiles include sheets of fibers or filaments that are entangled together to form a final product. Such nonwoven textiles may have various different properties, including various different localized properties in an overall nonwoven product, such as absorbency, stretch, stretch resistance, softness, strength, insulative, etc. These properties can be varied at various locations to provide localized desired properties to the final product.

Typical nonwoven textile production includes the use of needles (e.g., barbed needles) to puncture a fibrous sheet material to mechanically entangle and interlock—and thus bind—the affected fibers. A higher density of needle punctures within a given area will tend to increase the number of fiber entanglements and thus increase the strength or stretch resistance of the high density area. A higher density of needle punctures within a given area also may decrease the air permeability/breathability of the high density area. Selection of the fibrous material (and its physical properties) and/or the overall thickness of the fiber layers in the starting sheet in the various areas of a product also may affect the properties of the final nonwoven product. By selecting appropriate materials and/or thicknesses of various localized areas, the local properties of the areas may be controlled.

As for a nonwoven structural unit, in a manner similar to FIGS. 7 and 14, the final desired product may be considered as a two dimensional structure, e.g., that could be represented on a bitmap. For example, columns of the bitmap in the vertical direction may represent a "Y-direction" of the final product structure and rows of the bitmap may represent an "X-direction" of the final product structure. The information included in the individual bits of the bitmap may represent, as examples, whether a needle punch action should be conducted within that specific area of the product design. Thus, from the examples above, areas having a higher density or concentration of needle punctures within an area may provide increased strength, stretch resistance, and/or insulative ability. Conversely, from the examples above, areas having a lower density or concentration of needle punctures may provide more flexibility, more mobility, more stretch, and/or improved breathability.

Data structures (e.g., bitmaps) for nonwoven designs may encode other features as well. For example, colors or other information encoded into a bitmap may provide information as to the type of fiber material(s) and/or fiber base material thickness to provide at the areas corresponding to that area in the design. As noted above, these features may affect local properties of the final nonwoven garment product. Repeated patterns of needle punch instructions (e.g., size, shape, and/or density of the needle punched area) and or other information within the bitmap (akin to areas enclosed by large, broken lines in FIGS. 7 and 14) may represent individual nonwoven structural units for this example of the technology. Such nonwoven structural units may be stored in a structural library and inserted into or removed from the garment design (e.g., as garment design data or garment design input data) as a unit.

As further noted above, technology of this type also may be applied to embroidered textile production. Embroidery and embroidered areas may be applied to a base textile component and thereby alter properties of the textile component (including the base material and embroidered structures). As such, embroidery may be used to provide and control various different textile properties, including various different localized properties in an overall embroidered product, such as absorbency, stretch, softness, strength, insulative, etc. Embroidery also may be used to produce textured local areas in the final product. These properties can be varied at various locations, e.g., by selecting the material for the embroidery, the size of the embroidered area (e.g., thickness, length, width, etc.), or the like, to provide localized desired properties to the final product.

Typical embroidery applies and fixes thread/yard to the base textile structure. A higher density and/or increased thickness of applied embroidered material within a given area will tend to increase the material thickness of that area. This higher density/increased thickness within a given area may decrease the air permeability, increase stretch resistance, increase strength, and/or otherwise affect the properties of that local area. Selection of the embroidering material (and its physical properties) and/or the overall thickness of the embroidered layer on the base textile structure also may affect the properties of the embroidered product. By selecting appropriate materials and/or thicknesses of various localized areas, the local properties of the areas may be controlled.

As for an embroidered structural unit, in a manner similar to FIGS. 7 and 14 (and that described above for a non-woven structural unit), the final desired product may be considered as a two dimensional structure, e.g., that could be represented on a bitmap. For example, columns of the bitmap in the vertical direction may represent a "Y-direction" of the final product structure and rows of the bitmap may represent an "X-direction" of the final product structure. The information included in the individual bits of the bitmap may represent, as examples, whether an embroidery process should be conducted within that specific area of the product design and/or the desired thickness of the embroidered structure within that area. Thus, from the examples above, areas having a higher density or high thickness of embroidered thread/yarn within an area may provide increased strength, stretch resistance, and/or insulative ability. Conversely, from the examples above, areas having a lower density or lower thickness of embroidered yarn (or no embroidered yarn) may provide more flexibility, more mobility, more stretch, and/or improved breathability.

Data structures (e.g., bitmaps) for embroidered designs may encode other features as well. For example, colors or other information encoded into a bitmap may provide information as to the type of embroidering thread/yarn and/or thread/yarn thickness to provide at the areas corresponding to that area in the design. As noted above, these features may affect local properties of the final embroidered textile product. Repeated patterns of embroidering instructions and or other information within the bitmap (akin to areas enclosed by large, broken lines in FIGS. 7 and 14) may represent individual embroidered structural units for this example of the technology. Such embroidered structural units may be stored in a structural library and inserted into or removed from the garment design (e.g., as garment design data or garment design input data) as a unit. As another example, an embroidered structural unit may constitute a series (e.g., an array in one or two dimensions) of thickened embroidered areas spaced apart in the garment design to provide texture in the final product. Such texture provided by thicker embroidered areas may help lift a garment off a wearer's skin to provide improved air circulation or breathability.

Still another example of this technology relates to textile production by fused filament fabrication techniques (also called "fused deposition modeling" or "solid deposition modeling"). In such processes, thin filaments of material (e.g., thermoplastic polyurethane materials) are extruded onto a substrate and fused together in any desired pattern(s) so as to form a final product. The substrate may constitute an extruder base member (from which the extruded filament final product is removed) and/or it may constitute an underlying textile component to which the extruded filament is fixed (and the textile component and extruded filament are held together as the final textile product). Systems for performing fused filament fabrication are known and are commercially available.

Properties of a fused filament component may be controlled, e.g., depending on the specific layout or design of the extruded filament in a product. For example, a filament structure formed as a straight line between two points may provide resistance to stretch and/or lockdown in that extruded axial direction and between those points. On the other hand, a curved, wavy, and/or zig-zag extruded filament path may be provided to increase stretch and/or flexibility in a given direction (e.g., in a direction that tends to elongate or straighten the curve or other path under a tensile force). The size (e.g., radius, amplitude, wavelength, frequency, etc.) of the curve, wave, or zig-zag pattern may be controlled to further control the stretchability in a given direction (e.g., in a direction that tends to elongate or straighten the curve or other path under a tensile force). Example features of such fused filament components and/or fused filament structural units are described in more detail below in conjunction with FIGS. 18A-18J.

The number of adjacent and/or overlapping extruded filaments in a specific pattern and/or direction also may be used to further control the degree of stretch resistance and/or lockdown (e.g., with increasing numbers of adjacent filaments and/or increasing numbers of overlapping extruded filaments within a given space, pattern, and/or direction providing higher levels of stretch resistance and/or lockdown and/or with decreasing numbers of adjacent filaments and/or decreasing numbers of overlapping extruded filaments within a given space, pattern, and/or direction providing lower levels of stretch resistance and/or lockdown). Spacings between adjacent filaments may be used to control breathability (with greater spacing providing increased breathability and smaller spacing providing decreased breathability). Additionally, extruded material type and/or extruded filament thickness also may be used to control localized properties of the design and final textile product.

A fused filament structural unit may have a two dimension structure corresponding to an X-direction and Y-direction layout of the textile structure, e.g., in a manner similar to FIGS. 7 and 14 (and/or those described above for a non-woven structural unit and/or an embroidered structural unit). Such a two dimensional structure optionally could be represented as a bitmap. As another option, however, a fused filament structural unit may have a data structure more akin to that described above in conjunction with FIG. 17. In such an example, the data structure may encode a vector and/or other information that controls the direction and/or distance that the extruder head is to move in laying down the extruded filament (e.g., each successive bit in the bitmap, data stream, or other data storage structure may point to a next X, Y coordinate direction in two dimensional space to which the extruder head should move).

Data structures for fused filament structural units and designs may encode other features as well. For example, colors or other information encoded into a bitmap may provide information as to the type of filament material to apply at a given location, the number of adjacent or overlapping layers of filament material to apply at a given location, or the like. As noted above, these features may affect local properties of the final fused filament textile product. Repeated patterns of extruder head movement instructions and/or other information within the data structure (akin to areas enclosed by large, broken lines in FIG. 17) may represent individual fused filament structural units for this example of the technology. Such fused filament structural units may be stored in a structural library and inserted into or removed from the garment design (e.g., as garment design data or garment design input data) as a unit.

FIGS. 18A-18E provide examples of fused filament structural units that may be used in at least some examples of this invention to provide desired local properties (e.g., local stretch properties) to a fused filament textile component. In the specific illustrated examples, stretch properties of a fused filament textile can be controlled and tuned, e.g., based on the waviness (or lack thereof) in a given direction. Curved, sinusoidal, sawtooth, and/or herringbone shaped waves may be used to control stretchability in the direction the extruded filament (e.g., in the direction the wave propagates). In general, the more wavy the filament structure, the more that the structure will stretch in the wave's propagation direction. In this manner, stretchiness can be controlled in multiple directions (e.g., in the X-direction, in the Y-direction, in one or more diagonal directions, etc.).

FIGS. 18A-18D provide various specific examples of fused filament structural units 1800A, 1800B, 1800C, and 1800D, respectively. As shown in FIG. 18A, the structural unit 1800A includes straight lengths of extruded filament 1802 in various directions, i.e., in the vertical ("Y") direction, in the horizontal ("X") direction, and in both diagonal directions. This arrangement of multiple straight extruded filaments 1802 in multiple directions provides strong lockdown and resistance to stretch in many directions. Although each direction of this example structural unit 1800A includes three adjacent (and generally parallel) filaments 1802, any number (e.g., one or more) of adjacent filaments 1802 may be provided in each direction. Rather than adjacent, as shown in FIG. 18A, two or more layers of filaments 1802 in a single direction may at least partially overlap one another in their axial directions over at least a portion of the extruded length in the structural unit 1800A.

FIG. 18B shows another example fused filament structural unit 1800B. This example structural unit 1800B includes: (a) straight lengths of extruded filament 1802 in three directions, i.e., in the horizontal ("X") direction and in both diagonal directions and (b) curved extruded filament 1802 in the vertical ("Y") direction. This arrangement of extruded filaments 1802 provides: (a) strong lockdown and resistance to stretch in the horizontal and diagonal directions and (b) increased stretchability in the vertical direction. Again, each direction of the structural unit 1800B may include any desired number (e.g., one or more) of adjacent filaments 1802 and/or any desired number of at least partially overlapping filaments 1802 over at least a portion of the extruded axial length within the structural unit 1800B.

Another example fused filament structural unit 1800C is shown in FIG. 18C. This example structural unit 1800C includes: (a) straight lengths of extruded filament 1802 in both diagonal directions and (b) curved extruded filament 1802 in the vertical ("Y") and horizontal ("X") directions. This arrangement of extruded filaments 1802 provides: (a) strong lockdown and resistance to stretch in the diagonal directions and (b) increased stretchability in the vertical and horizontal directions. Again, each direction of the structural unit 1800C may include any desired number (e.g., one or more) of adjacent filaments 1802 and/or any desired number of at least partially overlapping filaments 1802 over at least a portion of the extruded axial length within the structural unit 1800C.

As shown in FIG. 18D, the structural unit 1800D includes wavy lengths of extruded filament 1802 in various directions, i.e., in the vertical (Y") direction, in the horizontal ("X") direction, and in both diagonal directions. This arrangement of multiple wavy extruded filaments 1802 in multiple directions provides stretchability in many directions. Although each direction of the example structural unit 1800D includes three adjacent (and generally parallel) filaments 1802, any number (e.g., one or more) of adjacent filaments 1802 may be provided in each direction. Rather than adjacent, as shown in FIG. 18D, two or more layers of filaments 1802 in a single direction may at least partially overlap one another over at least a portion of the extruded axial length in the structural unit 1800D.

FIGS. 18A-18D show extruded structural units having filament arranged in four different directions. Other options are possible. For example, rather than a single structural unit, the structural units 1800A-1800D shown in each of FIGS. 18A-18D, respectively, may be comprised of four separate structural units—one structural unit including the filament(s) extending in the X direction, one structural unit including the filament(s) extending in the Y direction, one structural unit including the filament(s) extending in one diagonal direction, and one structural unit including the filament(s) extending in the other diagonal direction. The various individual direction structural units may be layered on one another to create other fused filament structural units (e.g., multi-layer fused filament structural units made from plural individual layer structural units). Multi-layered structural units of this type may have any number of smaller structural filament unit layers, and each individual structural unit layer may include extruded filament paths extending in one or more directions.

Other arrangements of straight and/or curved filament patterns may be provided to provide desired stretch and/or stretch resistance characteristics in the desired directions. The structural units may be added into and/or taken out of a garment design, garment design data, and/or garment design input data as a single unit. Multiple structural units of these types (and/or other types) may be provided in local areas of a garment design to provide desired local properties to the garment design in those local areas.

FIG. 18E provides a spectrum of stretchability for various types of extruded filament 1802 structures. As shown at the top of FIG. 18E, straight lengths of extruded filament provide the greatest stretch resistance (e.g., based on the tensile stretchability of the specific filament material). Increased stretchability can be provided by adding curvature to the extruded filament 1802 path, with a larger number and/or denser packing of curves (e.g., shorter wavelengths of curved/sawtooth patterns, as shown moving downward in FIG. 18E) providing greater stretchability. Stretch is available because tensile forces applied in a direction to stretch the filament (e.g., in the general filament extrusion direction) will tend to flatten out and elongate the curve segments as the stretch force is applied. Additionally or alternatively, the amplitude (e.g., height) of the curve(s) and/or sawtooths may be used, at least in part, to control the stretchability of the fused filament component in the local areas (with larger amplitudes capable of generally providing greater stretchability).

Figure 18F:
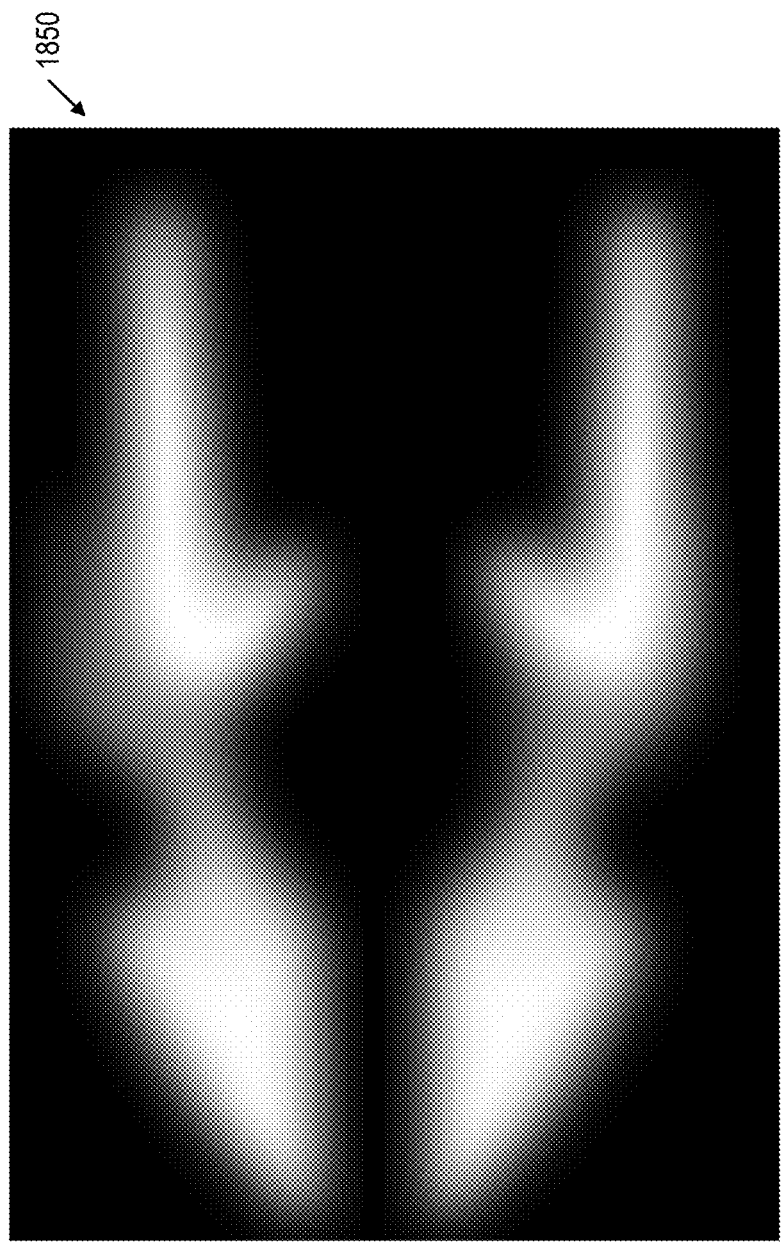

FIGS. 18F-18J provide examples of use of garment base data (e.g., akin to data 550 and/or 1350) in a fused filament production process according to some examples of this technology. FIG. 18F provides a grayscale representation 1850 of properties of a garment, e.g., from a scan, from a base garment structure, etc. In this specific example, grayscale representation 1850 includes a desired stretch modulus (or desired stretch characteristics) for a garment. In this grayscale representation 1850, white and lighter grays (e.g., on a pixel by pixel basis of a scan map) represent areas for increased stretch while black and increasingly darker gray areas represent areas for decreased stretch. Rather than grayscale, color scans and color maps (akin to those shown in FIG. 5C) may be used as the garment base data.

Figure 18G:
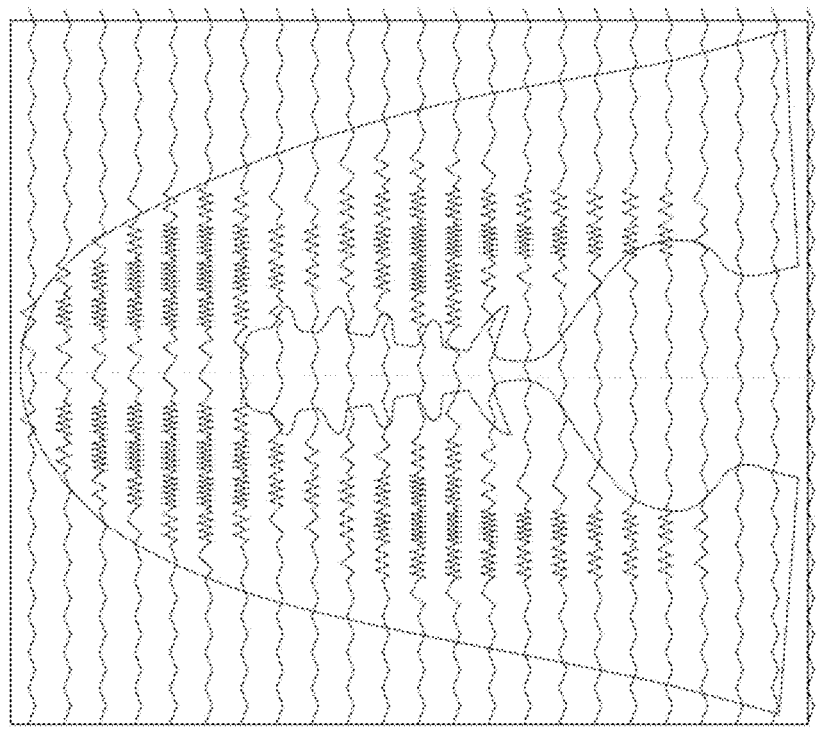

From the gray/color areas of the garment base data 1850, a translation module can substitute fused filament structural units (e.g., of the types described above in conjunction with FIGS. 18A-18D) and/or filament path structures (e.g., of the types shown in FIG. 18E) to provide desired stretch to match the grayscale/color. This translation/substitution may be accomplished in one direction at a time (e.g., in the X-direction, in the Y-direction, in a diagonal direction) or in multiple directions at a time. FIG. 18G provides an example of fused filament structural units extending in only the vertical (Y) direction. As shown in FIG. 18G, filament paths having different patterns of straightness and/or waviness characteristics are provided in the Y direction to provide local areas with different stretch properties. Different fused filament structural units (e.g., from 1800A to 1800D) and/or different extruded filament 1802 paths (e.g., from FIG. 18E) may be arranged together in the Y direction and/or in appropriate local areas to provide the desired stretch properties. Each vertical line of extruded filament shown in FIG. 18G may include multiple fused filament structural units arranged together (e.g., adjacent and/or at least partially overlapping) with extruded filament generally extending in the Y direction (in a straight or wavy manner).

Figure 18H:
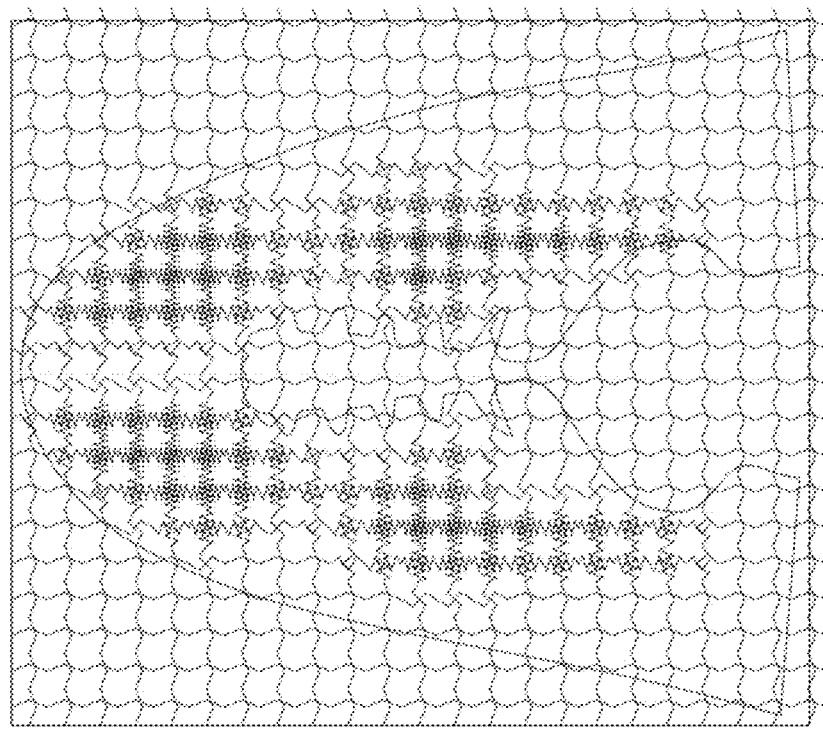

FIG. 18H shows the vertical (Y) directional information of FIG. 18G combined with horizontal (X) structural unit information to provide desired stretch in the X direction in local areas. As shown in FIG. 18H, filament 1802 paths having different patterns of straightness and/or waviness characteristics are provided in the X direction to provide local areas with different stretch properties. Different fused filament structural units (e.g., from 1800A to 1800D) and/or different extruded filament 1802 paths (e.g., from FIG. 18E) may be arranged together in the X direction and/or in appropriate local areas to provide the desired stretch properties. Each horizontal line of extruded filament shown in FIG. 18H may include multiple fused filament structural units arranged together (e.g., adjacent and/or at least partially overlapping) with extruded filament generally extending in the X direction (in a straight or wavy manner).

If desired, additional structural units and/or extruded filament 1802 paths may be provided in other directions in the example garment design of FIGS. 18G and/or 18H, such as in one or more diagonal directions, to provide stretchiness or stretch resistance in the diagonal direction(s) as well.

Figure 18I:
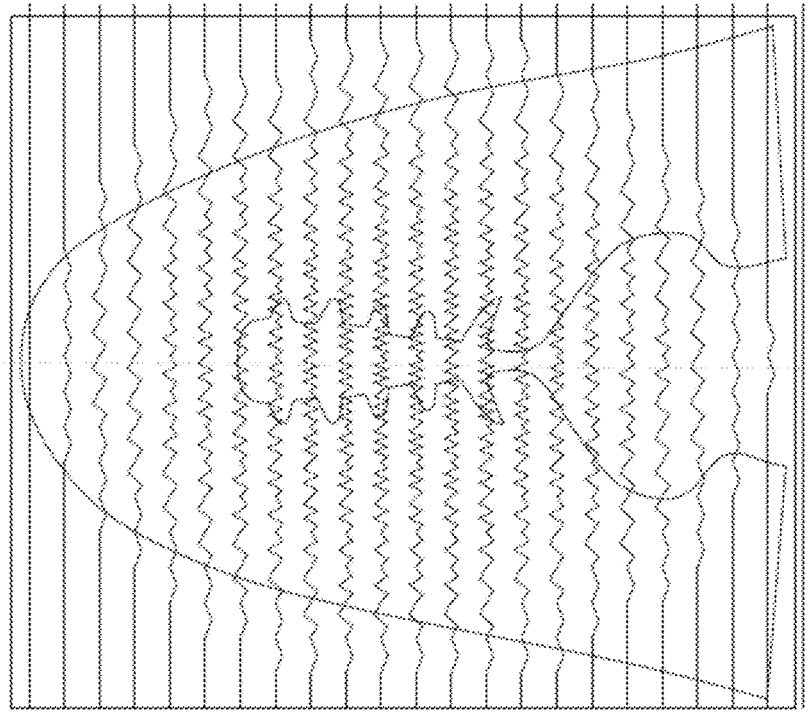
Figure 18J:
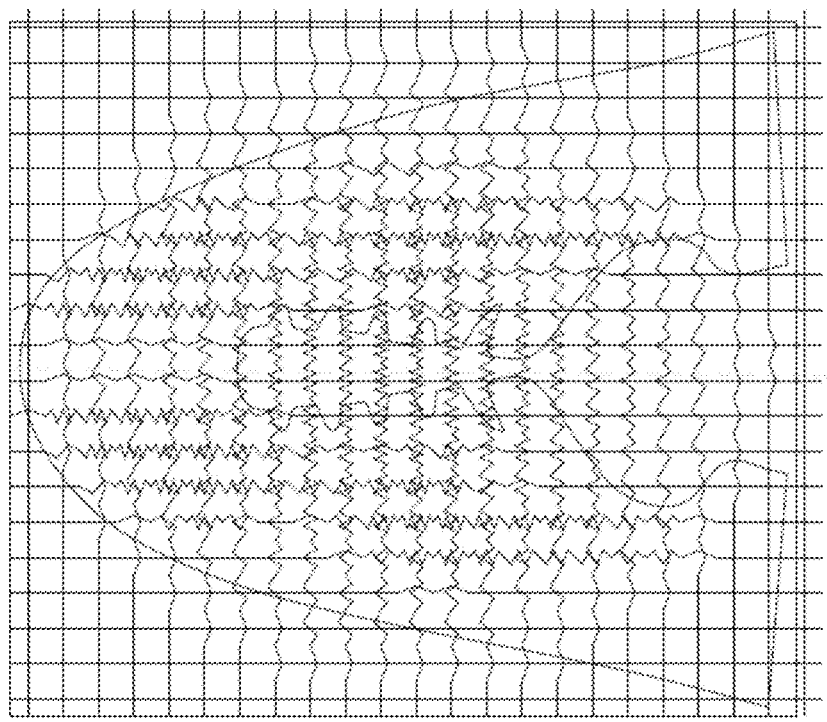

FIGS. 18I and 18J are similar to FIGS. 18G and 18H, respectively, but with different arrangements of fused filament structural units in the Y direction (shown in FIGS. 18I and 18J) and in the X direction (shown in FIG. 18J). The garment design data or garment design input data shown in FIGS. 18I and 18J may be the result of translation of a different stretch modulus base garment data, e.g., a different grayscale scan, from that shown in the example of FIGS. 18F-18H.

The information shown in FIGS. 18G-18J can be further translated, if needed, to provide garment design input data, e.g., to control the extruder head of a fused filament fabrication machine to lay down extruded filament 1802 in the desired patterns in the desired areas to form the desired design and desired stretch characteristics. This data may be stored as a bitmap, as a stream of extruder head movement information (e.g., movement direction and/or movement distance information from point to point, etc.), or in any appropriate manner to control the extruder head (e.g., as described above). The data structure for providing the extruder path and/or extrusion process may include additional information, if needed, such as information indicating one or more of: a type of material to use for a specific extruded layer, structural unit, or portion thereof; a thickness of the extruded filament in an extruded layer, structural unit, or portion thereof; a number of adjacent filaments and/or overlapping filaments to be extruded for a layer, structural unit, or portion thereof; etc.

The information with respect to the woven, nonwoven, embroidery, and/or fused filament fabrication systems and methods described above (and in conjunction with FIGS. 18A-18J) also may be used in any of the knitting, braiding, and/or winding systems and methods described above, including, for example, features of multi-layer structural units, etc. The systems and methods described above in conjunction with the knit embodiments of FIGS. 8A-10C provide various examples of application of "rules," and these same or similar type rules, systems, and methods can be used in the weaving, nonwoven, embroidery, and/or fused filament fabrication systems and/or methods described above and with respect to FIGS. 18A-18J. Additionally or alternatively, the feedback and/or subscription systems and methods described above in conjunction with FIGS. 11A and 11B also can be used with the weaving, nonwoven, embroidery, and/or fused filament fabrication systems and/or methods described above and with respect to FIGS. 18A-18J. The repetitive and overlapping disclosure of these features as applied to weaving, nonwoven production, embroidery, and/or fused filament fabrication will not be repeated herein.

Systems and methods according to some further aspects of this technology, as described above, may provide cost estimates and/or projected costs associated with an individual design. Such cost estimate information may be provided with any of the knitting, braiding, winding, embroidery, weaving, nonwoven production, fused filament fabrication, and/or other textile production techniques as described above. If desired, the systems and methods may provide recommendations to the designer for design changes, e.g., to reduce material costs and/or to improve sustainability of a given design (e.g., by substituting one material type for another, by changing structural units in a design to reduce material usage, etc.). Such cost estimates, cost reducing recommendations, and/or sustainability improving recommendations may help a designer arrive at an optimized design in an easier and quicker manner.

Additional aspects of this technology relate to non-transitory machine readable media storing instructions that, when executed, cause the computing device(s) to perform the methods described above in conjunction with FIGS. 1 to 18J and/or to operate the systems described above in conjunction with FIGS. 1 to 18J. Examples of such tangible non-transitory computer-readable media include: a solid state memory; a magnetic memory; computer-readable memories, both internal to a computer (e.g., hard drives) or separable from the computer (such as disks, solid state or flash memory devices, data available over a networked connection, etc.), including any type of computer readable media that is conventionally known and used in the computer arts. The change(s) in visual depiction of the design and/or changes to the design in the examples of FIGS. 5A through 18J may take place using the systems, processes, and/or actions described above with respect to FIGS. 1 through 4.

CONCLUSION

While the present disclosure have been described with respect to specific examples including presently preferred modes of carrying out aspects of the present disclosure, those skilled in the art will appreciate that numerous variations and permutations of the above described systems and techniques may be made without departing from the present disclosure. For example, the systems, methods, and/or user interfaces may include more, less, and/or different functionality from that described above, and the various features of the systems, methods, and/or user interfaces may be activated or interacted with in various different manners (e.g., using different types of interface elements) from those described above. Also the various process steps may be changed, changed in order, some omitted, and/or include additional steps or features without departing from the present disclosure. Various changes and modifications to the systems, methods, and user interfaces may be made without departing from the spirit and scope of the present disclosure, as set forth in the appended claims.

For the avoidance of doubt, the present application includes at least the subject matter described in the following numbered Clauses:

Clause 1. A method of manufacturing a garment, comprising:
- receiving garment design input data for a garment design including data representing a first knit structural unit at a first location in the garment design and data representing a second knit structural unit at a second location in the garment design;
- generating a knitting machine instruction data set based on the garment design input data;
- transmitting the knitting machine instruction data set to a first knitting machine;
- knitting a first garment using the first knitting machine, wherein during the knitting step,
- operation of the first knitting machine is controlled using the knitting machine instruction data set to create the first knit structural unit at a first location in the first garment and to create the second knit structural unit at a second location in the first garment;
- creating revised garment design input data for the garment design based on the first garment created in the knitting step, wherein the revised garment design input data includes changes to at least one of: a size of the first knit structural unit in the garment design, a position of the first knit structural unit in the garment design, a size of the second knit structural unit in the garment design, a position of the second knit structural unit in the garment design, a relative positioning of the first knit structural unit with respect to the second knit structural unit in the garment design, a relative positioning of the first knit structural unit with respect to another knit structural unit in the garment design, a relative positioning of the second knit structural unit with respect to another knit structural unit in the garment design, and a total number of knit structural units in the garment design;
- generating revised knitting machine instruction data set based on the revised garment design input data;
- transmitting the revised knitting machine instruction data set to at least one of the first knitting machine or a second knitting machine; and
- knitting a second garment using at least one of the first knitting machine or the second knitting machine, wherein during the step of knitting the second garment, operation of the first knitting machine and/or the second knitting machine is controlled using the revised knitting machine instruction data set to create the second garment corresponding to the revised garment design input data including the changes.

Clause 2. The method according to Clause 1, further comprising: creating the garment design input data at least in part from body map data.

Clause 3. The method according to Clause 2, further comprising: scanning at least a portion of a human body to generate the body map data.

Clause 4. The method according to Clause 2 or 3, wherein the body map data includes dimensional features for the garment design based on an individual from whom the body map data was collected.

Clause 5. The method according to Clause 1, further comprising: creating the garment design input data at least in part from a thermal image of a body.

Clause 6. The method according to Clause 5, further comprising: thermal scanning at least a portion of a human body to generate the thermal image.

Clause 7. The method according to any one of Clauses 1 to 6, wherein at least one of the first knit structural unit and the second knit structural unit corresponds to a hole to be created in a garment during a knitting operation.

Clause 8. The method according to any one of Clauses 1 to 7, wherein at least one of the first knit structural unit and the second knit structural unit corresponds to a pleat to be created in a garment during a knitting operation.

Clause 9. The method according to any one of Clauses 1 to 8, wherein at least one of the first knit structural unit and the second knit structural unit corresponds to a rib structure to be created in a garment during a knitting operation.

Clause 10. The method according to any one of Clauses 1 to 9, wherein at least one of the first knit structural unit and the second knit structural unit corresponds to a region of increased thermal insulativity or increased thermal conductivity to be created in a garment during a knitting operation.

Clause 11. The method according to any one of Clauses 1 to 10, wherein the garment design input data includes a first bitmap, wherein a first dimension of the first bitmap corresponds to a number of knitting needles in a row of needles of the first knitting machine, and wherein a second dimension of the first bitmap corresponds to a number of courses to be knitted to form the first garment.

Clause 12. The method according to Clause 11, wherein individual bits of the first bitmap correspond to an action to be performed by an individual needle of the first knitting machine at a specific location when knitting the first garment.

Clause 13. The method according to Clause 12, wherein the actions include a member selected from the group consisting of: a knit action, a tuck action, a miss action, and a transfer action.

Clause 14. The method according to Clause 12 or 13, wherein individual bits of the first bitmap include one of a plurality of different colors, wherein the color, at least in part, identifies the action to be performed by the individual needle of the first knitting machine at the specific location corresponding to the respective individual bit.

Clause 15. The method according to Clause 14, wherein the color of individual bits of the first bitmap further identifies at least one of a specific thread or yarn to be used or a specific spool from which thread or yarn is to be drawn and used in the action to be performed by the individual needle of the first knitting machine at the specific location corresponding to the respective individual bit.

Clause 16. The method according to any one of Clauses 1 to 15, wherein the revised garment design input data includes a second bitmap, wherein a first dimension of the second bitmap corresponds to a number of knitting needles in a row of needles of at least one of the first knitting machine or the second knitting machine, and wherein a second dimension of the second bitmap corresponds to a number of courses to be knitted to form the second garment.

Clause 17. The method according to Clause 16, wherein individual bits of the second bitmap correspond to an action to be performed by an individual needle of the first knitting machine or the second knitting machine at a specific location when knitting the second garment.

Clause 18. The method according to Clause 17, wherein the actions to be performed by the individual needle of the first knitting machine or the second knitting machine at the specific location when knitting the second garment include a member selected from the group consisting of: a knit action, a tuck action, a miss action, and a transfer action.

Clause 19. The method according to Clause 17 or 18, wherein individual bits of the second bitmap include one of a plurality of different colors, wherein the color, at least in part, identifies the action to be performed by the individual needle of the first knitting machine or the second knitting machine at the specific location corresponding to the respective individual bit when knitting the second garment.

Clause 20. The method according to Clause 19, wherein the color of individual bits of the second bitmap further identifies at least one of a specific thread or yarn to be used or a specific spool from which thread or yard is to be drawn and used in the action to be performed by the individual needle of the first knitting machine or the second knitting machine at the specific location corresponding to the respective individual bit when knitting the second garment.

Clause 21. The method according to any one of Clauses 1 to 20, further comprising: (a) displaying a first visual representation of the garment design corresponding to the garment design input data on a display screen; (b) receiving data corresponding to the changes desired for the revised garment design input data; and (c) displaying a second visual representation of the garment design corresponding to the revised garment design input data on the display screen.

Clause 22. The method according to any one of Clauses 1 to 21, wherein the step of creating the revised garment design input data includes applying rules to limit or control at least one of: the size of the first knit structural unit created in the revised garment design input data; the position of the first knit structural unit created in the revised garment design input data; the size of the second knit structural unit created in the revised garment design input data; the position of the second knit structural unit created in the revised garment design input data; the relative positioning of the first knit structural unit with respect to the second knit structural unit created in the revised garment design input data; the relative positioning of the first knit structural unit with respect to another knit structural unit created in the revised garment design input data; the relative positioning of the second knit structural unit with respect to another knit structural unit created in the revised garment design input data; and a total number of knit structural units in the revised garment design input data.

Clause 23. The method according to any one of Clauses 1 to 21, wherein the step of creating the revised garment design input data includes applying rules to limit or control at least one of: a distance between two occurrences of the first knit structural unit in the revised garment design input data; a number of knit stitch actions between two occurrences of the first knit structural unit in the revised garment design input data; a distance between the first knit structural unit and another knit structural unit in the revised garment design input data; a number of knit stitch actions between the first knit structural unit and another knit structural unit in the revised garment design input data; a maximum number of consecutive occurrences in one dimension of a specific needle action in the revised garment design input data; and a minimum number of consecutive occurrences in one dimension of a specific needle action in the revised garment design input data.

Clause 24. The method according to any one of Clauses 1 to 21, wherein the step of creating the revised garment design input data includes applying rules to limit or control at least one of: an overall weight of the garment design based on the revised garment design input data; a weight of a first portion of the garment design based on the revised garment design input data; an air permeability of a first portion of the garment design based on the revised garment design input data; and a thermal conductivity of a first portion of the garment design based on the revised garment design input data.

Clause 25. The method according to any one of Clauses 1 to 24, wherein the garment design input data corresponds to a garment of a first size, and wherein the revised garment design input data corresponds to a garment of a second size that differs from the first size.

Clause 26. The method according to any one of Clauses 1 to 24, wherein the garment design input data corresponds to a garment of a first standard size, and wherein the revised garment design input data corresponds to a garment of a second standard size that differs from the first standard size by at least one standard size gradation amount.

Clause 27. The method according to any one of Clauses 1 to 26, wherein the step of receiving the garment design input data for the garment design includes receiving garment design data and generating the garment design input data from the garment design data.

Clause 28. The method according to Clause 27, wherein the garment design data includes data from a three dimensional rendering of the garment design.

Clause 29. A system for manufacturing garments, comprising:
a computing device including: (a) one or more processors, and (b) memory storing instructions that, when executed, cause the computing device to:
receive garment design input data for a garment design including data representing a first knit structural unit at a first location in the garment design and data representing a second knit structural unit at a second location in the garment design;
generate a knitting machine instruction data set based on the garment design input data;
transmit the knitting machine instruction data set to a first knitting machine;
create revised garment design input data for the garment design, wherein the revised garment design input data includes changes to at least one of: a size of the first knit structural unit in the garment design, a position of the first knit structural unit in the garment design, a size of the second knit structural unit in the garment design, a position of the second knit structural unit in the garment design, a relative positioning of the first knit structural unit with respect to the second knit structural unit in the garment design, a relative positioning of the first knit structural unit with respect to another knit structural unit in the garment design, a relative positioning of the second knit structural unit with respect to another knit structural unit in the garment design, a total number of knit structural units in the garment design;
generate revised knitting machine instruction data set based on the revised garment design input data; and
transmit the revised knitting machine instruction data set to at least one of the first knitting machine or a second knitting machine; and
a first knitting machine including an input system for receiving the knitting machine instruction data set and the revised knitting machine instruction data set, and a plurality of knitting needles that are selectively controllable to knit a garment based on the knitting machine instruction data set and the revised knitting machine instruction data set.

Clause 30. The system according to Clause 29, further comprising a scanner for scanning at least a portion of a human body and for generating body map data based on at least the portion of the human body, wherein the garment design input data is based, at least in part, on the body map data.

Clause 31. The system according to Clause 30, wherein the body map data includes dimensional features for the garment design based on an individual from whom the body map data was collected.

Clause 32. The system according to Clause 29, further comprising a thermal scanner for thermally scanning at least a portion of a human body and for generating a thermal image based on at least the portion of the human body, wherein the garment design input data is based, at least in part, on the thermal image.

Clause 33. The system according to any one of Clauses 29 to 32, wherein the garment design input data includes a first bitmap, wherein a first dimension of the first bitmap corresponds to a number of knitting needles in a row of needles of the first knitting machine, and wherein a second dimension of the first bitmap corresponds to a number of courses to be knitted to form the garment.

Clause 34. The system according to Clause 33, wherein individual bits of the first bitmap correspond to an action to be performed by an individual needle of the first knitting machine at a specific location when knitting the garment.

Clause 35. The system according to Clause 34, wherein the actions include a member selected from the group consisting of: a knit action, a tuck action, a miss action, and a transfer action.

Clause 36. The system according to Clause 34 or 35, wherein individual bits of the first bitmap include one of a plurality of different colors, wherein the color, at least in part, identifies the action to be performed by the individual needle of the first knitting machine at the specific location corresponding to the respective individual bit.

Clause 37. The system according to Clause 36, wherein the color of individual bits of the first bitmap further identifies at least one of a specific thread or yarn to be used or a specific spool from which thread or yarn is to be drawn and used in the action to be performed by the individual needle of the first knitting machine at the specific location corresponding to the respective individual bit.

Clause 38. The system according to any one of Clauses 29 to 37, wherein the revised garment design input data includes a second bitmap, wherein a first dimension of the second bitmap corresponds to a number of knitting needles in a row of needles of the first knitting machine, and wherein a second dimension of the second bitmap corresponds to a number of courses to be knitted to form a second garment based on the revised knitting machine instruction data set.

Clause 39. The system according to Clause 38, wherein individual bits of the second bitmap correspond to an action to be performed by an individual needle of the first knitting machine at a specific location when knitting the second garment.

Clause 40. The system according to Clause 39, wherein the actions to be performed by the individual needle of the first knitting machine at the specific location when knitting the second garment include a member selected from the group consisting of: a knit action, a tuck action, a miss action, and a transfer action.

Clause 41. The system according to Clause 39 or 40, wherein individual bits of the second bitmap include one of a plurality of different colors, wherein the color, at least in part, identifies the action to be performed by the individual needle of the first knitting machine at the specific location corresponding to the respective individual bit when knitting the second garment.

Clause 42. The system according to Clause 41, wherein the color of individual bits of the second bitmap further identifies at least one of a specific thread or yarn to be used or a specific spool from which thread or yard is to be drawn and used in the action to be performed by the individual needle of the first knitting machine at the specific location corresponding to the respective individual bit when knitting the second garment.

Clause 43. The system according to any one of Clauses 29 to 42, further comprising: a display device provided with or engaged with the computing device, wherein the display device displays a first visual representation of the garment design corresponding to the garment design input data and a second visual representation of the garment design corresponding to the revised garment design input data.

Clause 44. The system according to any one of Clauses 29 to 43, wherein, when creating the revised garment design input data, the instructions, when executed, cause the computing device to apply rules to limit or control at least one of: the size of the first knit structural unit created in the revised garment design input data; the position of the first knit structural unit created in the revised garment design input data; the size of the second knit structural unit created in the revised garment design input data; the position of the second knit structural unit created in the revised garment design input data; the relative positioning of the first knit structural unit with respect to the second knit structural unit created in the revised garment design input data; the relative positioning of the first knit structural unit with respect to another knit structural unit created in the revised garment design input data; the relative positioning of the second knit structural unit with respect to another knit structural unit created in the revised garment design input data; a total number of knit structural units in the revised garment design input data.

Clause 45. The system according to any one of Clauses 29 to 43, wherein, when creating the revised garment design input data, the instructions, when executed, cause the computing device to apply rules to limit or control at least one of: a distance between two occurrences of the first knit structural unit in the revised garment design input data; a number of knit stitch actions between two occurrences of the first knit structural unit in the revised garment design input data; a distance between the first knit structural unit and another knit structural unit in the revised garment design input data; a number of knit stitch actions between the first knit structural unit and another knit structural unit in the revised garment design input data; a maximum number of consecutive occurrences in one dimension of a specific needle action in the revised garment design input data; and a minimum number of consecutive occurrences in one dimension of a specific needle action in the revised garment design input data.

Clause 46. The system according to any one of Clauses 29 to 43, wherein, when creating the revised garment design input data, the instructions, when executed, cause the computing device to apply rules to limit or control at least one of: an overall weight of the garment design based on the revised garment design input data; a weight of a first portion of the garment design based on the revised garment design input data; an air permeability of a first portion of the garment design based on the revised garment design input data; and a thermal conductivity of a first portion of the garment design based on the revised garment design input data.

Clause 47. The system according to any one of Clauses 29 to 46, wherein, in the receiving step, the instructions, when executed, cause the computing device to receive garment design data and generate the garment design input data from the garment design data.

Clause 48. The system according to Clause 47, wherein the garment design data includes data from a three dimensional rendering of the garment design.

Clause 49. A method, comprising:
receiving garment design input data for a garment design including data representing a first knit structural unit at a first location in the garment design and data representing a second knit structural unit at a second location in the garment design;
generating, by a computing device, a graphical representation of the garment design in a first interface;
receiving design input for one or more changes to the garment design;
creating revised garment design input data using the design input for one or more changes to the garment design; and
visually updating an appearance of the graphical representation of the garment design on a display device to display changes corresponding to the revised garment input data, wherein after the visually updating, the garment design includes changes to at least one of: a size of the first knit structural unit in the garment design, a position of the first knit structural unit in the garment design, a size of the second knit structural unit in the garment design, a position of the second knit structural unit in the garment design, a relative positioning of the first knit structural unit with respect to the second knit structural unit in the garment design, a relative positioning of the first knit structural unit with respect to another knit structural unit in the garment design, a relative positioning of the second knit structural unit with respect to another knit structural unit in the garment design, a total number of knit structural units in the garment design.

Clause 50. The method according to Clause 49, wherein receiving design input for one or more changes to the garment design further comprises: determining if the received design input for the one or more changes meets at least one structural integrity characteristic for the garment design.

Clause 51. The method according to Clause 50, further comprising: recommending one or more design modifications to place the garment design in conformity with the at least one structural integrity characteristic if the received design input for the one or more changes is determined to not meet the at least one structural integrity characteristic for the garment design.

Clause 52. The method according to any one of Clauses 49 to 51, wherein receiving design input for one or more changes to the garment design includes receiving design input changing a material for one or more portions of the garment design.

Clause 53. The method according to any one of Clauses 49 to 51, wherein receiving design input for one or more changes to the garment design includes receiving design input changing the size of the first knit structural unit in the garment design.

Clause 54. The method according to any one of Clauses 49 to 51, wherein receiving design input for one or more changes to the garment design includes receiving design input changing the position of the first knit structural unit in the garment design.

Clause 55. The method according to any one of Clauses 49 to 51, wherein receiving design input for one or more changes to the garment design includes receiving design input changing the size of the second knit structural unit in the garment design.

Clause 56. The method according to any one of Clauses 49 to 51, wherein receiving design input for one or more changes to the garment design includes receiving design input changing the position of the second knit structural unit in the garment design.

Clause 57. The method according to any one of Clauses 49 to 51, wherein receiving design input for one or more changes to the garment design includes receiving design input changing the relative positioning of the first knit structural unit with respect to the second knit structural unit in the garment design.

Clause 58. The method according to any one of Clauses 49 to 51, wherein receiving design input for one or more changes to the garment design includes receiving design input changing the relative positioning of the first knit structural unit with respect to another knit structural unit in the garment design.

Clause 59. The method according to any one of Clauses 49 to 51, wherein receiving design input for one or more changes to the garment design includes receiving design input changing the relative positioning of the second knit structural unit with respect to another knit structural unit in the garment design.

Clause 60. The method according to any one of Clauses 49 to 59, further comprising: creating the garment design input data at least in part from body map data.

Clause 61. The method according to Clause 60, further comprising: scanning at least a portion of a human body to generate the body map data.

Clause 62. The method according to Clause 60 or 61, wherein the body map data includes dimensional features for the garment design based on an individual from whom the body map data was collected.

Clause 63. The method according to any one of Clauses 49 to 59, further comprising: creating the garment design input data at least in part from a thermal image of a body.

Clause 64. The method according to Clause 63, further comprising: thermal scanning at least a portion of a human body to generate the thermal image.

Clause 65. The method according to any one of Clauses 49 to 64, wherein at least one of the first knit structural unit and the second knit structural unit corresponds to a hole to be created in a garment during a knitting operation.

Clause 66. The method according to any one of Clauses 49 to 65, wherein at least one of the first knit structural unit and the second knit structural unit corresponds to a pleat to be created in a garment during a knitting operation.

Clause 67. The method according to any one of Clauses 49 to 66, wherein at least one of the first knit structural unit and the second knit structural unit corresponds to a rib structure to be created in a garment during a knitting operation.

Clause 68. The method according to any one of Clauses 49 to 67, wherein at least one of the first knit structural unit and the second knit structural unit corresponds to a region of increased thermal insulativity or increased thermal conductivity to be created in a garment during a knitting operation.

Clause 69. The method according to any one of Clauses 49 to 68, wherein the garment design input data includes a first bitmap, wherein a first dimension of the first bitmap corresponds to a number of knitting needles in a row of needles of a knitting machine to be used to form the garment, and wherein a second dimension of the first bitmap corresponds to a number of courses to be knitted to form the garment.

Clause 70. The method according to Clause 69, wherein individual bits of the first bitmap correspond to an action to be performed by an individual needle of the knitting machine at a specific location when knitting the garment.

Clause 71. The method according to Clause 70, wherein the actions include a member selected from the group consisting of: a knit action, a tuck action, a miss action, and a transfer action.

Clause 72. The method according to Clause 70 or 71, wherein individual bits of the first bitmap include one of a plurality of different colors, wherein the color, at least in part, identifies the action to be performed by the individual needle of the knitting machine at the specific location corresponding to the respective individual bit.

Clause 73. The method according to Clause 72, wherein the color of individual bits of the first bitmap further identifies at least one of a specific thread or yarn to be used or a specific spool from which thread or yarn is to be drawn and used in the action to be performed by the individual needle of the knitting machine at the specific location corresponding to the respective individual bit.

Clause 74. The method according to any one of Clauses 49 to 73, wherein the revised garment design input data includes a second bitmap, wherein a first dimension of the second bitmap corresponds to a number of knitting needles in a row of needles of a knitting machine to be used to form the garment, and wherein a second dimension of the second bitmap corresponds to a number of courses to be knitted to form the garment.

Clause 75. The method according to Clause 74, wherein individual bits of the second bitmap correspond to an action to be performed by an individual needle of the knitting machine at a specific location when knitting the garment.

Clause 76. The method according to Clause 75, wherein the actions to be performed by the individual needle of the knitting machine at the specific location when knitting the garment include a member selected from the group consisting of: a knit action, a tuck action, a miss action, and a transfer action.

Clause 77. The method according to Clause 75 or 76, wherein individual bits of the second bitmap include one of a plurality of different colors, wherein the color, at least in part, identifies the action to be performed by the individual needle of the knitting machine at the specific location corresponding to the respective individual bit when knitting the garment.

Clause 78. The method according to Clause 77, wherein the color of individual bits of the second bitmap further identifies at least one of a specific thread or yarn to be used or a specific spool from which thread or yarn is to be drawn and used in the action to be performed by the individual needle of the knitting machine at the specific location corresponding to the respective individual bit when knitting the garment.

Clause 79. The method according to any one of Clauses 49 to 78, wherein receiving design input for one or more changes to the garment design further comprises applying rules to limit or control at least one of: the size of the first knit structural unit created in the garment design; the position of the first knit structural unit created in the garment design; the size of the second knit structural unit created in the garment design; the position of the second knit structural unit created in the garment design; the relative positioning of the first knit structural unit with respect to the second knit structural unit created in the garment design; the relative positioning of the first knit structural unit with respect to another knit structural unit created in the garment design; the relative positioning of the second knit structural unit with respect to another knit structural unit created in the garment design; and a total number of knit structural units in the garment design.

Clause 80. The method according to any one of Clauses 49 to 78, wherein receiving design input for one or more changes to the garment design further comprises applying rules to limit or control at least one of: a distance between two occurrences of the first knit structural unit in the garment design; a number of knit stitch actions between two occurrences of the first knit structural unit in the garment design; a distance between the first knit structural unit and another knit structural unit in the garment design; a number of knit stitch actions between the first knit structural unit and another knit structural unit in the garment design; a maximum number of consecutive occurrences in one dimension of a specific needle action in the garment design; and a minimum number of consecutive occurrences in one dimension of a specific needle action in the garment design.

Clause 81. The method according to any one of Clauses 49 to 78, wherein receiving design input for one or more changes to the garment design further comprises applying rules to limit or control at least one of: an overall weight of the garment design based on the received design input; a weight of a first portion of the garment design based on the received design input; an air permeability of a first portion of the garment design based on the received design input; and a thermal conductivity of a first portion of the garment design based on the received design input.

Clause 82. The method according to any one of Clauses 49 to 81, wherein the garment design input data corresponds to a garment of a first size, and wherein the received design input for one or more changes to the garment design corresponds to a garment of a second size that differs from the first size.

Clause 83. The method according to any one of Clauses 49 to 81, wherein the garment design input data corresponds to a garment of a first standard size, and wherein the received design input for one or more changes to the garment design corresponds to a garment of a second standard size that differs from the first standard size by at least one standard size gradation amount.

Clause 84. The method according to any one of Clauses 49 to 83, wherein the step of receiving the garment design input data for the garment design includes receiving garment design data and generating the garment design input data from the garment design data.

Clause 85. The method according to Clause 84, wherein the garment design data includes data from a three dimensional rendering of the garment design.

Clause 86. A non-transitory machine readable medium storing instructions that, when executed, cause a computing device to:
  receive garment design input data for a garment design including data representing a first knit structural unit at a first location in the garment design and data representing a second knit structural unit at a second location in the garment design;
  generate, in a first interface, a graphical representation of the garment design;
  receive design input for one or more changes to the garment design;

create revised garment design input data using the design input for one or more changes to the garment design; and visually update, an appearance of the graphical representation of the garment design in the first interface on a display device to display changes corresponding to the revised garment input data, wherein after the visually updating, the garment design includes changes to at least one of: a size of the first knit structural unit in the garment design, a position of the first knit structural unit in the garment design, a size of the second knit structural unit in the garment design, a position of the second knit structural unit in the garment design, a relative positioning of the first knit structural unit with respect to the second knit structural unit in the garment design, a relative positioning of the first knit structural unit with respect to another knit structural unit in the garment design, a relative positioning of the second knit structural unit with respect to another knit structural unit in the garment design, a total number of knit structural units in the garment design.

Clause 87. The non-transitory machine readable medium according to Clause 86, wherein the instructions, when executed, further cause the computing device to: determine if the received design input for the one or more changes meets at least one structural integrity characteristic for the garment design.

Clause 88. The non-transitory machine readable medium according to Clause 87, wherein the instructions, when executed, further cause the computing device to: recommend one or more design modifications to place the garment design in conformity with the at least one structural integrity characteristic if the received design input for the one or more changes is determined to not meet the at least one structural integrity characteristic for the garment design.

Clause 89. The non-transitory machine readable medium according to any one of Clauses 86 to 88, wherein the design input for one or more changes to the garment design includes design input changing a material for one or more portions of the garment design.

Clause 90. The non-transitory machine readable medium according to any one of Clauses 86 to 88, wherein the design input for one or more changes to the garment design includes design input changing the size of the first knit structural unit in the garment design.

Clause 91. The non-transitory machine readable medium according to any one of Clauses 86 to 88, wherein the design input for one or more changes to the garment design includes design input changing the position of the first knit structural unit in the garment design.

Clause 92. The non-transitory machine readable medium according to any one of Clauses 86 to 88, wherein the design input for one or more changes to the garment design includes design input changing the size of the second knit structural unit in the garment design.

Clause 93. The non-transitory machine readable medium according to any one of Clauses 86 to 88, wherein the design input for one or more changes to the garment design includes design input changing the position of the second knit structural unit in the garment design Clause 94. The non-transitory machine readable medium according to any one of Clauses 86 to 88, wherein the design input for one or more changes to the garment design includes design input changing the relative positioning of the first knit structural unit with respect to the second knit structural unit in the garment design.

Clause 95. The non-transitory machine readable medium according to any one of Clauses 86 to 88, wherein the design input for one or more changes to the garment design includes design input changing the relative positioning of the first knit structural unit with respect to another knit structural unit in the garment design.

Clause 96. The non-transitory machine readable medium according to any one of Clauses 86 to 88, wherein the design input for one or more changes to the garment design includes design input changing the relative positioning of the second knit structural unit with respect to another knit structural unit in the garment design.

Clause 97. The non-transitory machine readable medium according to any one of Clauses 86 to 96, wherein the instructions, when executed, further cause the computing device to:

create the garment design input data at least in part from body map data.

Clause 98. The non-transitory machine readable medium according to Clause 97, wherein the instructions, when executed, further cause the computing device to: scan at least a portion of a human body to generate the body map data.

Clause 99. The non-transitory machine readable medium according to Clause 97 or 98, wherein the body map data includes dimensional features for the garment design based on an individual from whom the body map data was collected.

Clause 100. The non-transitory machine readable medium according to any one of Clauses 86 to 96, wherein the instructions, when executed, further cause the computing device to: create the garment design input data at least in part from a thermal image of an individual's body.

Clause 101. The non-transitory machine readable medium according to Clause 100, wherein the instructions, when executed, further cause the computing device to: thermal scan at least a portion of a human body to generate the thermal image.

Clause 102. The non-transitory machine readable medium according to any one of Clauses 86 to 101, wherein at least one of the first knit structural unit and the second knit structural unit corresponds to: (a) a hole to be created in a garment during a knitting operation, (b) a pleat to be created in a garment during a knitting operation, (c) a rib structure to be created in a garment during a knitting operation, or (d) a region of increased thermal insulativity or increased thermal conductivity to be created in a garment during a knitting operation.

Clause 103. The non-transitory machine readable medium according to any one of Clauses 86 to 102, wherein the garment design input data includes a first bitmap, wherein a first dimension of the first bitmap corresponds to a number of knitting needles in a row of needles of a knitting machine to be used to form the garment, and wherein a second dimension of the first bitmap corresponds to a number of courses to be knitted to form the garment.

Clause 104. The non-transitory machine readable medium according to Clause 103, wherein individual bits of the first bitmap correspond to an action to be performed by an individual needle of the knitting machine at a specific location when knitting the garment.

Clause 105. The non-transitory machine readable medium according to Clause 104, wherein the actions include a member selected from the group consisting of: a knit action, a tuck action, a miss action, and a transfer action.

Clause 106. The non-transitory machine readable medium according to Clause 104 or 105, wherein individual bits of the first bitmap include one of a plurality of different colors, wherein the color, at least in part, identifies the action to be performed by the individual needle of the knitting machine at the specific location corresponding to the respective individual bit.

Clause 107. The non-transitory machine readable medium according to Clause 106, wherein the color of individual bits of the first bitmap further identifies at least one of a specific thread or yarn to be used or a specific spool from which thread or yarn is to be drawn and used in the action to be performed by the individual needle of the knitting machine at the specific location corresponding to the respective individual bit.

Clause 108. The non-transitory machine readable medium according to any one of Clauses 86 to 107, wherein when creating the revised garment design, the instructions, when executed, cause the computing device to create the revised garment design input data as a second bitmap, wherein a first dimension of the second bitmap corresponds to a number of knitting needles in a row of needles of a knitting machine to be used to form the garment, and wherein a second dimension of the second bitmap corresponds to a number of courses to be knitted to form the garment.

Clause 109. The non-transitory machine readable medium according to Clause 108, wherein individual bits of the second bitmap correspond to an action to be performed by an individual needle of the knitting machine at a specific location when knitting the garment.

Clause 110. The non-transitory machine readable medium according to Clause 109, wherein the actions to be performed by the individual needle of the knitting machine at the specific location when knitting the garment include a member selected from the group consisting of: a knit action, a tuck action, a miss action, and a transfer action.

Clause 111. The non-transitory machine readable medium according to Clause 109 or 110, wherein individual bits of the second bitmap include one of a plurality of different colors, wherein the color, at least in part, identifies the action to be performed by the individual needle of the knitting machine at the specific location corresponding to the respective individual bit when knitting the garment.

Clause 112. The non-transitory machine readable medium according to Clause 111, wherein the color of individual bits of the second bitmap further identifies at least one of a specific thread or yarn to be used or a specific spool from which thread or yarn is to be drawn and used in the action to be performed by the individual needle of the knitting machine at the specific location corresponding to the respective individual bit when knitting the garment.

Clause 113. The non-transitory machine readable medium according to any one of Clauses 86 to 112, wherein after receiving the design input for one or more changes to the garment design, the instructions, when executed, cause the computing device to apply rules to limit or control at least one of: the size of the first knit structural unit created in the garment design; the position of the first knit structural unit created in the garment design; the size of the second knit structural unit created in the garment design; the position of the second knit structural unit created in the garment design; the relative positioning of the first knit structural unit with respect to the second knit structural unit created in the garment design; the relative positioning of the first knit structural unit with respect to another knit structural unit created in the garment design; the relative positioning of the second knit structural unit with respect to another knit structural unit created in the garment design; and a total number of knit structural units in the garment design.

Clause 114. The non-transitory machine readable medium according to any one of Clauses 86 to 112, wherein after receiving the design input for one or more changes to the garment design, the instructions, when executed, cause the computing device to apply rules to limit or control at least one of: a distance between two occurrences of the first knit structural unit in the garment design; a number of knit stitch actions between two occurrences of the first knit structural unit in the garment design; a distance between the first knit structural unit and another knit structural unit in the garment design; a number of knit stitch actions between the first knit structural unit and another knit structural unit in the garment design; a maximum number of consecutive occurrences in one dimension of a specific needle action in the garment design; and a minimum number of consecutive occurrences in one dimension of a specific needle action in the garment design.

Clause 115. The non-transitory machine readable medium according to any one of Clauses 86 to 112, wherein after receiving the design input for one or more changes to the garment design, the instructions, when executed, cause the computing device to apply rules to limit or control at least one of: an overall weight of the garment design based on the received design input; a weight of a first portion of the garment design based on the received design input; an air permeability of a first portion of the garment design based on the received design input; and a thermal conductivity of a first portion of the garment design based on the received design input.

Clause 116. The non-transitory machine readable medium according to any one of Clauses 86 to 115, wherein in the step of receiving the garment design input data for the garment design, the instructions, when executed, cause the computing device to receive garment design data and generate the garment design input data from the garment design data.

Clause 117. The non-transitory machine readable medium according to Clause 116, wherein the garment design data includes data from a three dimensional rendering of the garment design.

Clause 118. An apparatus, comprising:
one or more processors; and
memory storing instructions that, when executed, cause the apparatus to:
receive garment design input data for a garment design including data representing a first knit structural unit at a first location in the garment design and data representing a second knit structural unit at a second location in the garment design;
generate, in a first interface, a graphical representation of the garment design;
receive design input for one or more changes to the garment design;
create revised garment design input data using the design input for one or more changes to the garment design; and
visually update an appearance of the graphical representation of the garment design in the first interface on a display device to display changes corresponding to the revised garment input data, wherein after the visually updating, the garment design includes changes to at least one of: a size of the first knit structural unit in the garment design, a position of the first knit structural unit in the garment design, a size of the second knit structural unit in the garment design, a position of the second knit structural unit in the garment design, a relative positioning of the first knit structural unit with respect to the second knit structural unit in the garment design, a relative positioning of the first knit structural unit with respect to another knit structural unit in the garment design, a relative positioning of the second knit structural unit with respect to another knit structural unit in the garment design, and a total number of knit structural units in the garment design.

Clause 119. The apparatus according to Clause 118, wherein the instructions, when executed, further cause the apparatus to: determine if the received design input for the one or more changes meets at least one structural integrity characteristic for the garment design.

Clause 120. The apparatus according to Clause 119, wherein the instructions, when executed, further cause the apparatus to: recommend one or more design modifications to place the garment design in conformity with the at least one structural integrity characteristic if the received design input for the one or more changes is determined to not meet the at least one structural integrity characteristic for the garment design.

Clause 121. The apparatus according to any one of Clauses 118 to 120, wherein the instructions, when executed, further cause the apparatus to: create the garment design input data at least in part from body map data.

Clause 122. The apparatus according to Clause 121, further comprising: a scanner that scans at least a portion of a human body and generates the body map data based on the scan.

Clause 123. The apparatus according to Clause 121 or 122, wherein the body map data includes dimensional features for the garment design based on an individual from whom the body map data was collected.

Clause 124. The apparatus according to any one of Clauses 118 to 120, wherein the instructions, when executed, further cause the apparatus to: create the garment design input data at least in part from a thermal image of an individual's body.

Clause 125. The apparatus according to Clause 124, further comprising: a thermal scanner that scans at least a portion of a human body to generate the thermal image.

Clause 126. The apparatus according to any one of Clauses 118 to 125, wherein at least one of the first knit structural unit and the second knit structural unit corresponds to: (a) a hole to be created in a garment during a knitting operation, (b) a pleat to be created in a garment during a knitting operation, (c) a rib structure to be created in a garment during a knitting operation, or (d) a region of increased thermal insulativity or increased thermal conductivity to be created in a garment during a knitting operation.

Clause 127. The apparatus according to any one of Clauses 118 to 126, wherein the garment design input data includes a first bitmap, wherein a first dimension of the first bitmap corresponds to a number of knitting needles in a row of needles of a knitting machine to be used to form the garment, and wherein a second dimension of the first bitmap corresponds to a number of courses to be knitted to form the garment.

Clause 128. The apparatus according to Clause 127, wherein individual bits of the first bitmap correspond to an action to be performed by an individual needle of the knitting machine at a specific location when knitting the garment.

Clause 129. The apparatus according to Clause 128, wherein the actions include a member selected from the group consisting of: a knit action, a tuck action, a miss action, and a transfer action.

Clause 130. The apparatus according to Clause 128 or 129, wherein individual bits of the first bitmap include one of a plurality of different colors, wherein the color, at least in part, identifies the action to be performed by the individual needle of the knitting machine at the specific location corresponding to the respective individual bit.

Clause 131. The apparatus according to Clause 130, wherein the color of individual bits of the first bitmap further identifies at least one of a specific thread or yarn to be used or a specific spool from which thread or yarn is to be drawn and used in the action to be performed by the individual needle of the knitting machine at the specific location corresponding to the respective individual bit.

Clause 132. The apparatus according to any one of Clauses 118 to 131, wherein when creating the revised garment design, the instructions, when executed, cause the apparatus to create the revised garment design input data as a second bitmap, wherein a first dimension of the second bitmap corresponds to a number of knitting needles in a row of needles of a knitting machine to be used to form the garment, and wherein a second dimension of the second bitmap corresponds to a number of courses to be knitted to form the garment.

Clause 133. The apparatus according to Clause 132, wherein individual bits of the second bitmap correspond to an action to be performed by an individual needle of the knitting machine at a specific location when knitting the garment.

Clause 134. The apparatus according to Clause 133, wherein the actions to be performed by the individual needle of the knitting machine at the specific location when knitting the garment include a member selected from the group consisting of: a knit action, a tuck action, a miss action, and a transfer action.

Clause 135. The apparatus according to Clause 133 or 134, wherein individual bits of the second bitmap include one of a plurality of different colors, wherein the color, at least in part, identifies the action to be performed by the individual needle of the knitting machine at the specific location corresponding to the respective individual bit when knitting the garment.

Clause 136. The apparatus according to Clause 135, wherein the color of individual bits of the second bitmap further identifies at least one of a specific thread or yarn to be used or a specific spool from which thread or yarn is to be drawn and used in the action to be performed by the individual needle of the knitting machine at the specific location corresponding to the respective individual bit when knitting the garment.

Clause 137. The apparatus according to any one of Clauses 118 to 136, wherein after receiving the design input for one or more changes to the garment design, the instructions, when executed, cause the computing device to apply rules to limit or control at least one of: the size of the first knit structural unit created in the garment design; the position of the first knit structural unit created in the garment design; the size of the second knit structural unit created in the garment design; the position of the second knit structural unit created in the garment design; the relative positioning of the first knit structural unit with respect to the second knit structural unit created in the garment design; the relative positioning of the first knit structural unit with respect to another knit structural unit created in the garment design; the relative positioning of the second knit structural unit with respect to another knit structural unit created in the garment design; and a total number of knit structural units in the garment design.

Clause 138. The apparatus according to any one of Clauses 118 to 136, wherein after receiving the design input for one or more changes to the garment design, the instructions, when executed, cause the computing device to apply rules to limit or control at least one of: a distance between two occurrences of the first knit structural unit in the garment design; a number of knit stitch actions between two occurrences of the first knit structural unit in the garment design; a distance between the first knit structural unit and another knit structural unit in the garment design; a number of knit stitch actions between the first knit structural unit and another knit structural unit in the garment design; a maximum number of consecutive occurrences in one dimension of a specific needle action in the garment design; and a minimum number of consecutive occurrences in one dimension of a specific needle action in the garment design.

Clause 139. The apparatus according to any one of Clauses 118 to 136, wherein after receiving the design input for one or more changes to the garment design, the instructions, when executed, cause the computing device to apply rules to limit or control at least one of: an overall weight of the garment design based on the received design input; a weight of a first portion of the garment design based on the received design input; an air permeability of a first portion of the garment design based on the received design input; and a thermal conductivity of a first portion of the garment design based on the received design input.

Clause 140. The apparatus according to any one of Clauses 118 to 139, wherein, in the step of receiving the garment design input data for the garment design, the instructions cause the apparatus to receive garment design data and generate the garment design input data from the garment design data.

Clause 141. The apparatus according to Clause 140, wherein the garment design data includes data from a three dimensional rendering of the garment design.

Clause 142. A method of manufacturing articles of apparel, comprising:
  transmitting data to a computing system for: (a) generating a rating system on the computing system for evaluating a first property of a first article of apparel, wherein the first article of apparel includes a garment design having a first knitted component with a first knit structural unit at a first location in the garment design, and (b) requesting input through the computing system of a customer-selected rating of the first property;
  receiving data from the computing system including the customer-selected rating of the first property;
  creating revised garment design input data for the garment design based on the data including the customer-selected rating of the first property, wherein the revised garment design input data includes at least one of: changes to a size of the first knit structural unit in the garment design; changes to a position of the first knit structural unit in the garment design; changes to a relative positioning of the first knit structural unit with respect to one or more other knit structural units in the garment design; addition of one or more additional first knit structural units to the garment design; addition of one or more second knit structural units different from the first knit structural unit to the garment design; or elimination of one or more knit structural units from the garment design;
  knitting a second knitted component for a second article of apparel based on the revised garment design input data; and
  providing a user with the second article of apparel including the second knitted component made based on the revised garment design input data.

Clause 143. A method of manufacturing articles of apparel, comprising:
  manufacturing a first article of apparel, wherein the first article of apparel includes a garment design having a first knitted component with a first knit structural unit at a first location in the garment design;
  providing a user with the first article of apparel;
  transmitting data to a computing system for: (a) generating a rating system on the computing system for evaluating a first property of the first article of apparel, and (b) requesting input through the computing system of a customer-selected rating of the first property;
  receiving data from the computing system including the customer-selected rating of the first property;
  creating revised garment design input data for the garment design based on the data including the customer-selected rating of the first property, wherein the revised garment design input data includes at least one of: changes to a size of the first knit structural unit in the garment design; changes to a position of the first knit structural unit in the garment design; changes to a relative positioning of the first knit structural unit with respect to one or more other knit structural units in the garment design; addition of one or more additional first knit structural units to the garment design; addition of one or more second knit structural units different from the first knit structural unit to the garment design; or elimination of one or more knit structural units from the garment design;
  knitting a second knitted component based on the revised garment design input data; manufacturing a second article of apparel including the second knitted component; and providing the user with the second article of apparel.

Clause 144. The method according to Clause 142 or Clause 143, wherein the data transmitted to the computing system for generating the rating system on the computing system includes an application program for generating the rating system on a mobile computer device.

Clause 145. The method according to Clause 144, wherein the data transmitted to the computing system for generating the rating system on the computing system includes data for generating a rating system having a sliding scale for rating the first property.

Clause 146. The method according to any one of Clauses 142 to 145, wherein the step of generating the rating system includes providing a graphical user interface on the computing system through which the user can input information regarding the first property.

Clause 147. A method of manufacturing articles of apparel, comprising:
  manufacturing a first article of apparel, wherein the first article of apparel includes a garment design having a first knitted component with a first knit structural unit at a first location in the garment design;
  providing the first article of apparel to a customer, the customer being associated with customer identification information;
  designating the first article of apparel as being owned by the customer associated with the customer identification information;
  providing an evaluation system for evaluating a first property of the first article of apparel;

receiving a customer-selected evaluation of the first property;
designating the customer-selected evaluation as being received from the customer associated with the customer identification information;
creating revised garment design input data for the garment design based on the data including the customer-selected evaluation of the first property, wherein the revised garment design input data includes at least one of: changes to a size of the first knit structural unit in the garment design; changes to a position of the first knit structural unit in the garment design; changes to a relative positioning of the first knit structural unit with respect to one or more other knit structural units in the garment design; addition of one or more additional first knit structural units to the garment design; addition of one or more second knit structural units different from the first knit structural unit to the garment design; or elimination of one or more knit structural units from the garment design;
knitting a second knitted component based on the revised garment design input data;
manufacturing a second article of apparel including the second knitted component;
providing the user with the second article of apparel; and
designating the second article of apparel as being owned by the customer associated with the customer identification information.

Clause 148. A method of manufacturing articles of apparel, comprising:
associating a cycle length with a customer;
manufacturing a first article of apparel, wherein the first article of apparel includes a garment design having a first knitted component with a first knit structural unit at a first location in the garment design;
providing the first article of apparel to a customer, the customer being associated with customer identification information;
designating the first article of apparel as being owned by the customer associated with the customer identification information;
providing an evaluation system for evaluating a first property of the first article of apparel;
receiving a customer-selected evaluation of the first property;
designating the customer-selected evaluation as being received from the customer associated with the customer identification information;
creating revised garment design input data for the garment design based on the data including the customer-selected evaluation of the first property, wherein the revised garment design input data includes at least one of: changes to a size of the first knit structural unit in the garment design; changes to a position of the first knit structural unit in the garment design; changes to a relative positioning of the first knit structural unit with respect to one or more other knit structural units in the garment design; addition of one or more additional first knit structural units to the garment design; addition of one or more second knit structural units different from the first knit structural unit to the garment design; or elimination of one or more knit structural units from the garment design;
knitting a second knitted component based on the revised garment design input data;
manufacturing a second article of apparel including the second knitted component;
providing the user with the second article of apparel when the cycle length is satisfied; and
designating the second article of apparel as being owned by the customer associated with the customer identification information.

Clause 149. The method according to Clause 147 or Clause 148, wherein the evaluation system is provided as an application running on a mobile computing device.

Clause 150. The method according to Clause 147 or Clause 148, wherein the evaluation system is provided as a web application.

Clause 151. The method according to any one of Clauses 147 to 150, further comprising instructing the customer to wait at least a predetermined time period after receiving the first article of apparel before submitting any evaluations of the first article of apparel.

Clause 152. The method according to Clause 151, wherein the predetermined time period is at least one day.

Clause 153. The method according to Clause 151, wherein the predetermined time period is at least two weeks.

Clause 154. The method according to any one of Clauses 142 to 153, wherein the first property of the first article of apparel includes at least one of: a thermal resistivity property of the first article of apparel; an air permeability property of the first article of apparel; a fit property of the first article of apparel; a support property of the first article of apparel; a moisture management property of the first article of apparel; a weight property of the first article of apparel; and a wear resistance property of the first article of apparel.

Clause 155. The method according to any one of Clauses 142 to 154, wherein the first knit structural unit is a member selected from the group consisting of:
knitted-in open holes;
knitted-in texture on at least one surface;
pleats;
ribbed structures;
areas of increased material thickness (e.g., as compared to a thickness of a surrounding area and/or a thickness of a largest proportion of the continuous knitted structure);
areas of decreased material thickness (e.g., as compared to a thickness of a surrounding area and/or a thickness of a largest proportion of the continuous knitted structure);
areas of increased thermal conductivity (e.g., as compared to a thermal conductivity of a surrounding area and/or a thermal conductivity of a largest proportion of the continuous knitted structure);
areas of decreased thermal conductivity (e.g., as compared to a thermal conductivity of a surrounding area and/or a thermal conductivity of a largest proportion of the continuous knitted structure);
areas of increased air permeability (e.g., as compared to an air permeability of a surrounding area and/or an air permeability of a largest proportion of the continuous knitted structure);
areas of decreased air permeability (e.g., as compared to an air permeability of a surrounding area and/or an air permeability of a largest proportion of the continuous knitted structure);
areas of increased moisture wicking capability (e.g., as compared to a moisture wicking capability of a surrounding area and/or a moisture wicking capability of a largest proportion of the continuous knitted structure);

areas of decreased moisture wicking capability (e.g., as compared to a moisture wicking capability of a surrounding area and/or a moisture wicking capability of a largest proportion of the continuous knitted structure);

areas of increased stretchability (e.g., as compared to a stretchability of a surrounding area and/or a stretchability of a largest proportion of the continuous knitted structure);

areas of decreased stretchability (e.g., as compared to a stretchability of a surrounding area and/or a stretchability of a largest proportion of the continuous knitted structure);

areas of increased durability (e.g., as compared to a durability of a surrounding area and/or a durability of a largest proportion of the continuous knitted structure);

areas of decreased durability (e.g., as compared to a durability of a surrounding area and/or a durability of a largest proportion of the continuous knitted structure);

areas of increased material density (e.g., as compared to a material density of a surrounding area and/or a material density of a largest proportion of the continuous knitted structure);

areas of decreased material density (e.g., as compared to a material density of a surrounding area and/or a material density of a largest proportion of the continuous knitted structure);

areas of increased hydrophobicity (e.g., as compared to a hydrophobicity of a surrounding area and/or a hydrophobicity of a largest proportion of the continuous knitted structure);

areas of decreased hydrophobicity (e.g., as compared to a hydrophobicity of a surrounding area and/or a hydrophobicity of a largest proportion of the continuous knitted structure); and areas having a surface texture that differs from a surface texture of a surrounding area and/or from a surface texture of a largest proportion of the continuous knitted structure.

Clause 156. A method of manufacturing a garment, comprising:

receiving garment design input data for a garment design including data representing a first textile structural unit at a first location in the garment design and data representing a second textile structural unit at a second location in the garment design;

generating a textile production machine instruction data set based on the garment design input data;

transmitting the textile production machine instruction data set to a first textile production machine;

forming a first garment using the first textile production machine, wherein during the forming step, operation of the first textile production machine is controlled using the textile production machine instruction data set to create the first textile structural unit at a first location in the first garment and to create the second textile structural unit at a second location in the first garment;

creating revised garment design input data for the garment design based on the first garment created in the forming step, wherein the revised garment design input data includes changes to at least one of: a size of the first textile structural unit in the garment design, a position of the first textile structural unit in the garment design, a size of the second textile structural unit in the garment design, a position of the second textile structural unit in the garment design, a relative positioning of the first textile structural unit with respect to the second textile structural unit in the garment design, a relative positioning of the first textile structural unit with respect to another textile structural unit in the garment design, a relative positioning of the second textile structural unit with respect to another textile structural unit in the garment design, and a total number of textile structural units in the garment design;

generating revised textile production machine instruction data set based on the revised garment design input data;

transmitting the revised textile production machine instruction data set to at least one of the first textile production machine or a second textile production machine; and forming a second garment using at least one of the first textile production machine or the second textile production machine, wherein during the step of forming the second garment, operation of the first textile production machine and/or the second textile production machine is controlled using the revised textile production machine instruction data set to create the second garment corresponding to the revised garment design input data including the changes.

Clause 157. The method according to Clause 156, further comprising: creating the garment design input data at least in part from body map data.

Clause 158. The method according to Clause 157, further comprising: scanning at least a portion of a human body to generate the body map data.

Clause 159. The method according to Clause 157 or 158, wherein the body map data includes dimensional features for the garment design based on an individual from whom the body map data was collected.

Clause 160. The method according to any one of Clauses 156 to 159, wherein at least one of the first textile structural unit and the second textile structural unit corresponds to a hole to be created in a garment during the forming step.

Clause 161. The method according to any one of Clauses 156 to 160, wherein at least one of the first textile structural unit and the second textile structural unit corresponds to a region of increased stretch resistance to be created in a garment during the forming step.

Clause 162. The method according to any one of Clauses 156 to 161, wherein the first textile production machine is a braiding machine, wherein the garment design input data includes a first bitmap, wherein a first dimension of the first bitmap corresponds to a number of cylinders in the braiding machine, and wherein a second dimension of the first bitmap corresponds to a cross-sectional location of the first garment to be formed.

Clause 163. The method according to Clause 162, wherein individual bits of the first bitmap correspond to an action to be performed by an individual cylinder of the braiding machine at a specific location when forming the first garment.

Clause 164. The method according to Clause 163, wherein the actions include a member selected from the group consisting of: a left rotation action, a right rotation action, and a no rotation action.

Clause 165. The method according to Clause 163 or 164, wherein individual bits of the first bitmap include one of a plurality of different colors, wherein the color, at least in part, identifies the action to be performed by the individual cylinder of the braiding machine at the specific location corresponding to the respective individual bit.

Clause 166. The method according to any one of Clauses 156 to 165, wherein the first textile production machine is a first braiding machine and the second textile production machine is a second braiding machine, wherein the revised garment design input data includes a second bitmap, wherein a first dimension of the second bitmap corresponds to a number of cylinders in the first braiding machine or the second braiding machine, and wherein a second dimension of the second bitmap corresponds to a cross-sectional location of the second garment to be formed.

Clause 167. The method according to Clause 166, wherein individual bits of the second bitmap correspond to an action to be performed by an individual cylinder of the first braiding machine or the second braiding machine at a specific location when forming the second garment.

Clause 168. The method according to Clause 167, wherein the actions to be performed by the individual cylinder of the first braiding machine or the second braiding machine when forming the second garment include a member selected from the group consisting of: a left rotation action, a right rotation action, and a no rotation action.

Clause 169. The method according to Clause 167 or 168, wherein individual bits of the second bitmap include one of a plurality of different colors, wherein the color, at least in part, identifies the action to be performed by the individual cylinder of the first braiding machine or the second braiding machine at the specific location corresponding to the respective individual bit when forming the second garment.

Clause 170. The method according to any one of Clauses 156 to 161, wherein the first textile production machine is a winding machine, and wherein the garment design input data includes at least one of: pin-to-pin movement information; winding machine dispenser head movement direction information; and pin winding direction information.

Clause 171. The method according to any one of Clauses 156 to 170, further comprising: (a) displaying a first visual representation of the garment design corresponding to the garment design input data on a display screen; (b) receiving data corresponding to the changes desired for the revised garment design input data; and (c) displaying a second visual representation of the garment design corresponding to the revised garment design input data on the display screen.

Clause 172. The method according to any one of Clauses 156 to 171, wherein the step of creating the revised garment design input data includes applying rules to limit or control at least one of: the size of the first textile structural unit created in the revised garment design input data; the position of the first textile structural unit created in the revised garment design input data; the size of the second textile structural unit created in the revised garment design input data; the position of the second textile structural unit created in the revised garment design input data; the relative positioning of the first textile structural unit with respect to the second textile structural unit created in the revised garment design input data; the relative positioning of the first textile structural unit with respect to another textile structural unit created in the revised garment design input data; and the relative positioning of the second textile structural unit with respect to another textile structural unit created in the revised garment design input data.

Clause 173. The method according to any one of Clauses 156 to 171, wherein the step of creating the revised garment design input data includes applying rules to limit or control at least one of: an overall weight of the garment design based on the revised garment design input data; a weight of a first portion of the garment design based on the revised garment design input data; an air permeability of a first portion of the garment design based on the revised garment design input data; and a stretchability of a first portion of the garment design based on the revised garment design input data.

Clause 174. The method according to any one of Clauses 156 to 173, wherein the garment design input data corresponds to a garment of a first size, and wherein the revised garment design input data corresponds to a garment of a second size that differs from the first size.

Clause 175. The method according to any one of Clauses 156 to 173, wherein the garment design input data corresponds to a garment of a first standard size, and wherein the revised garment design input data corresponds to a garment of a second standard size that differs from the first standard size by at least one standard size gradation amount.

Clause 176. The method according to any one of Clauses 156 to 175, wherein the step of receiving the garment design input data for the garment design includes receiving garment design data and generating the garment design input data from the garment design data.

Clause 177. The method according to Clause 176, wherein the garment design data includes data from a three dimensional rendering of the garment design.

Clause 178. A system for manufacturing garments, comprising:
   a computing device including: (a) one or more processors, and (b) memory storing instructions that, when executed, cause the computing device to:
      receive garment design input data for a garment design including data representing a first textile structural unit at a first location in the garment design and data representing a second textile structural unit at a second location in the garment design;
      generate a textile production machine instruction data set based on the garment design input data;
      transmit the textile production machine instruction data set to a first textile production machine;
      create revised garment design input data for the garment design, wherein the revised garment design input data includes changes to at least one of: a size of the first textile structural unit in the garment design, a position of the first textile structural unit in the garment design, a size of the second textile structural unit in the garment design, a position of the second textile structural unit in the garment design, a relative positioning of the first textile structural unit with respect to the second textile structural unit in the garment design, a relative positioning of the first textile structural unit with respect to another textile structural unit in the garment design, a relative positioning of the second textile structural unit with respect to another textile structural unit in the garment design, and a total number of textile structural units in the garment design;
      generate revised textile production machine instruction data set based on the revised garment design input data; and
      transmit the revised textile production machine instruction data set to at least one of the first textile production machine or a second textile production machine; and
   a first textile production machine including an input system for receiving the textile production machine instruction data set and the revised textile production machine instruction data set, wherein the first textile production machine is selectively controllable to form a garment based on the textile production machine instruction data set and the revised textile production machine instruction data set.

Clause 179. The system according to Clause 178, further comprising a scanner for scanning at least a portion of a human body and for generating body map data based on at least the portion of the human body, wherein the garment design input data is based, at least in part, on the body map data.

Clause 180. The system according to Clause 179, wherein the body map data includes dimensional features for the garment design based on an individual from whom the body map data was collected.

Clause 181. The system according to any one of Clauses 178 to 180, wherein the first textile production machine is a braiding machine, wherein the garment design input data includes a first bitmap, wherein a first dimension of the first bitmap corresponds to a number of cylinders in the braiding machine, and wherein a second dimension of the first bitmap corresponds to a cross-sectional location of the first garment to be formed.

Clause 182. The system according to Clause 181, wherein individual bits of the first bitmap correspond to an action to be performed by an individual cylinder of the braiding machine at a specific location when forming the first garment.

Clause 183. The system according to Clause 182, wherein the actions include a member selected from the group consisting of: a left rotation action, a right rotation action, and a no rotation action.

Clause 184. The system according to Clause 182 or 183, wherein individual bits of the first bitmap include one of a plurality of different colors, wherein the color, at least in part, identifies the action to be performed by the individual cylinder of the braiding machine at the specific location corresponding to the respective individual bit.

Clause 185. The system according to any one of Clauses 178 to 184, wherein the first textile production machine is a braiding machine, wherein the revised garment design input data includes a second bitmap, wherein a first dimension of the second bitmap corresponds to a number of cylinders in the first braiding machine, and wherein a second dimension of the second bitmap corresponds to a cross-sectional location of the second garment to be formed.

Clause 186. The system according to Clause 185, wherein individual bits of the second bitmap correspond to an action to be performed by an individual cylinder of the first braiding machine at a specific location when forming the second garment.

Clause 187. The system according to Clause 186, wherein the actions to be performed by the individual cylinder of the first braiding machine when forming the second garment include a member selected from the group consisting of: a left rotation action, a right rotation action, and a no rotation action.

Clause 188. The system according to Clause 186 or 187, wherein individual bits of the second bitmap include one of a plurality of different colors, wherein the color, at least in part, identifies the action to be performed by the individual cylinder of the first braiding machine at the specific location corresponding to the respective individual bit when forming the second garment.

Clause 189. The system according to any one of Clauses 178 to 187, wherein the first textile production machine is a winding machine, and wherein the garment design input data includes at least one of: pin-to-pin movement information; winding machine dispenser head movement direction information; and pin winding direction information.

Clause 190. The system according to any one of Clauses 178 to 189, further comprising: a display device provided with or engaged with the computing device, wherein the display device displays a first visual representation of the garment design corresponding to the garment design input data and a second visual representation of the garment design corresponding to the revised garment design input data.

Clause 191. The system according to any one of Clauses 178 to 190, wherein, when creating the revised garment design input data, the instructions, when executed, cause the computing device to apply rules to limit or control at least one of: the size of the first textile structural unit created in the revised garment design input data; the position of the first textile structural unit created in the revised garment design input data; the size of the second textile structural unit created in the revised garment design input data; the position of the second textile structural unit created in the revised garment design input data; the relative positioning of the first textile structural unit with respect to the second textile structural unit created in the revised garment design input data; the relative positioning of the first textile structural unit with respect to another textile structural unit created in the revised garment design input data; the relative positioning of the second textile structural unit with respect to another textile structural unit created in the revised garment design input data; and a total number of textile structural units in the revised garment design input data.

Clause 192. The system according to any one of Clauses 178 to 190, wherein, when creating the revised garment design input data, the instructions, when executed, cause the computing device to apply rules to limit or control at least one of: an overall weight of the garment design based on the revised garment design input data; a weight of a first portion of the garment design based on the revised garment design input data; an air permeability of a first portion of the garment design based on the revised garment design input data; and a stretchability of a first portion of the garment design based on the revised garment design input data.

Clause 193. The system according to any one of Clauses 178 to 192, wherein, in the receiving step, the instructions, when executed, cause the computing device to receive garment design data and generate the garment design input data from the garment design data.

Clause 194. The system according to Clause 193, wherein the garment design data includes data from a three dimensional rendering of the garment design.

Clause 195. A method, comprising:
receiving garment design input data for a garment design including data representing a first textile structural unit at a first location in the garment design and data representing a second textile structural unit at a second location in the garment design;
generating, by a computing device, a graphical representation of the garment design in a first interface;
receiving design input for one or more changes to the garment design;
creating revised garment design input data using the design input for one or more changes to the garment design; and
visually updating an appearance of the graphical representation of the garment design on a display device to display changes corresponding to the revised garment input data, wherein after the visually updating, the garment design includes changes to at least one of: a size of the first textile structural unit in the garment design, a position of the first textile structural unit in the garment design, a size of the second textile structural unit in the garment design, a position of the second textile structural unit in the garment design, a relative positioning of the first textile structural unit with respect to the second textile structural unit in the garment design, a relative positioning of the first textile structural unit with respect to another textile structural unit in the garment design, a relative positioning of the second textile structural unit with respect to another textile structural unit in the garment design, and a total number of textile structural units in the garment design.

Clause 196. The method according to Clause 195, wherein receiving design input for one or more changes to the garment design further comprises: determining if the received design input for the one or more changes meets at least one structural integrity characteristic for the garment design.

Clause 197. The method according to Clause 196, further comprising: recommending one or more design modifications to place the garment design in conformity with the at least one structural integrity characteristic if the received design input for the one or more changes is determined to not meet the at least one structural integrity characteristic for the garment design.

Clause 198. The method according to any one of Clauses 195 to 197, wherein receiving design input for one or more changes to the garment design includes receiving design input changing a material for one or more portions of the garment design.

Clause 199. The method according to any one of Clauses 195 to 197, wherein receiving design input for one or more changes to the garment design includes receiving design input changing the size of the first textile structural unit in the garment design.

Clause 200. The method according to any one of Clauses 195 to 197, wherein receiving design input for one or more changes to the garment design includes receiving design input changing the position of the first textile structural unit in the garment design.

Clause 201. The method according to any one of Clauses 195 to 197, wherein receiving design input for one or more changes to the garment design includes receiving design input changing the size of the second textile structural unit in the garment design.

Clause 202. The method according to any one of Clauses 195 to 197, wherein receiving design input for one or more changes to the garment design includes receiving design input changing the position of the second textile structural unit in the garment design.

Clause 203. The method according to any one of Clauses 195 to 197, wherein receiving design input for one or more changes to the garment design includes receiving design input changing the relative positioning of the first textile structural unit with respect to the second textile structural unit in the garment design.

Clause 204. The method according to any one of Clauses 195 to 197, wherein receiving design input for one or more changes to the garment design includes receiving design input changing the relative positioning of the first textile structural unit with respect to another textile structural unit in the garment design.

Clause 205. The method according to any one of Clauses 195 to 197, wherein receiving design input for one or more changes to the garment design includes receiving design input changing the relative positioning of the second textile structural unit with respect to another textile structural unit in the garment design.

Clause 206. The method according to any one of Clauses 195 to 205, further comprising: creating the garment design input data at least in part from body map data.

Clause 207. The method according to Clause 206, further comprising: scanning at least a portion of a human body to generate the body map data.

Clause 208. The method according to Clause 206 or 207, wherein the body map data includes dimensional features for the garment design based on an individual from whom the body map data was collected.

Clause 209. The method according to any one of Clauses 195 to 208, wherein at least one of the first textile structural unit and the second textile structural unit corresponds to a hole to be created in a garment during a textile production operation.

Clause 210. The method according to any one of Clauses 195 to 209, wherein at least one of the first textile structural unit and the second textile structural unit corresponds to a region of increased stretch resistance to be created in a garment during a textile production operation.

Clause 211. The method according to any one of Clauses 195 to 209, wherein the garment design input data includes a first bitmap, wherein a first dimension of the first bitmap corresponds to a number of cylinders in a braiding machine to be used to form the garment, and wherein a second dimension of the first bitmap corresponds to a cross-sectional location of the garment to be formed.

Clause 212. The method according to Clause 211, wherein individual bits of the first bitmap correspond to an action to be performed by an individual cylinder of the braiding machine at a specific location when forming the garment.

Clause 213. The method according to Clause 212, wherein the actions include a member selected from the group consisting of: a left rotation action, a right rotation action, and a no rotation action.

Clause 214. The method according to Clause 212 or 213, wherein individual bits of the first bitmap include one of a plurality of different colors, wherein the color, at least in part, identifies the action to be performed by the individual cylinder of the braiding machine at the specific location corresponding to the respective individual bit.

Clause 215. The method according to any one of Clauses 195 to 214, wherein the revised garment design input data includes a second bitmap, wherein a first dimension of the second bitmap corresponds to a number of cylinders in a braiding machine to be used to form the garment, and wherein a second dimension of the second bitmap corresponds to a cross-sectional location of the garment to be formed.

Clause 216. The method according to Clause 215, wherein individual bits of the second bitmap correspond to an action to be performed by an individual cylinder of the braiding machine at a specific location when forming the garment.

Clause 217. The method according to Clause 216, wherein the actions to be performed by the individual needle of the textile production machine at the specific location when forming the garment include a member selected from the group consisting of: a left rotation action, a right rotation action, and a no rotation action.

Clause 218. The method according to Clause 216 or 217, wherein individual bits of the second bitmap include one of a plurality of different colors, wherein the color, at least in part, identifies the action to be performed by the individual cylinder of the braiding machine at the specific location corresponding to the respective individual bit when forming the garment.

Clause 219. The method according to any one of Clauses 195 to 210, wherein the garment design input data includes at least one of: pin-to-pin movement direction information for a winding machine; winding machine dispenser head movement direction information; and pin winding direction information.

Clause 220. The method according to any one of Clauses 195 to 219, wherein receiving design input for one or more changes to the garment design further comprises applying rules to limit or control at least one of: the size of the first textile structural unit created in the garment design; the position of the first textile structural unit created in the garment design; the size of the second textile structural unit created in the garment design; the position of the second textile structural unit created in the garment design; the relative positioning of the first textile structural unit with respect to the second textile structural unit created in the garment design; the relative positioning of the first textile structural unit with respect to another textile structural unit created in the garment design; the relative positioning of the second textile structural unit with respect to another textile structural unit created in the garment design; and a total number of textile structural units in the garment design.

Clause 221. The method according to any one of Clauses 195 to 219, wherein receiving design input for one or more changes to the garment design further comprises applying rules to limit or control at least one of: an overall weight of the garment design based on the received design input; a weight of a first portion of the garment design based on the received design input; an air permeability of a first portion of the garment design based on the received design input; and a stretchability of a first portion of the garment design based on the received design input.

Clause 222. The method according to any one of Clauses 195 to 221, wherein the garment design input data corresponds to a garment of a first size, and wherein the received design input for one or more changes to the garment design corresponds to a garment of a second size that differs from the first size.

Clause 223. The method according to any one of Clauses 195 to 221, wherein the garment design input data corresponds to a garment of a first standard size, and wherein the received design input for one or more changes to the garment design corresponds to a garment of a second standard size that differs from the first standard size by at least one standard size gradation amount.

Clause 224. The method according to any one of Clauses 195 to 223, wherein the step of receiving the garment design input data for the garment design includes receiving garment design data and generating the garment design input data from the garment design data.

Clause 225. The method according to Clause 224, wherein the garment design data includes data from a three dimensional rendering of the garment design.

Clause 226. A non-transitory machine readable medium storing instructions that, when executed, cause a computing device to perform the method according to any one of Clauses 195 to 225.

Clause 227. An apparatus, comprising:
one or more processors; and
memory storing instructions that, when executed, cause the apparatus to:
receive garment design input data for a garment design including data representing a first textile structural unit at a first location in the garment design and data representing a second textile structural unit at a second location in the garment design;
generate, in a first interface, a graphical representation of the garment design;
receive design input for one or more changes to the garment design;
create revised garment design input data using the design input for one or more changes to the garment design; and
visually update an appearance of the graphical representation of the garment design in the first interface on a display device to display changes corresponding to the revised garment input data, wherein after the visually updating, the garment design includes changes to at least one of: a size of the first textile structural unit in the garment design, a position of the first textile structural unit in the garment design, a size of the second textile structural unit in the garment design, a position of the second textile structural unit in the garment design, a relative positioning of the first textile structural unit with respect to the second textile structural unit in the garment design, a relative positioning of the first textile structural unit with respect to another textile structural unit in the garment design, a relative positioning of the second textile structural unit with respect to another textile structural unit in the garment design, and a total number of textile structural units in the garment design.

Clause 228. The apparatus according to Clause 227, wherein the instructions, when executed, further cause the apparatus to: determine if the received design input for the one or more changes meets at least one structural integrity characteristic for the garment design.

Clause 229. The apparatus according to Clause 228, wherein the instructions, when executed, further cause the apparatus to: recommend one or more design modifications to place the garment design in conformity with the at least one structural integrity characteristic if the received design input for the one or more changes is determined to not meet at least one structural integrity characteristic for the garment design.

Clause 230. The apparatus according to any one of Clauses 227 to 229, wherein the instructions, when executed, further cause the apparatus to: create the garment design input data at least in part from body map data.

Clause 231. The apparatus according to Clause 230, further comprising: a scanner that scans at least a portion of a human body and generates the body map data based on the scan.

Clause 232. The apparatus according to Clause 230 or 231, wherein the body map data includes dimensional features for the garment design based on an individual from whom the body map data was collected.

Clause 233. The apparatus according to any one of Clauses 227 to 232, wherein at least one of the first textile structural unit and the second textile structural unit corresponds to: (a) a hole to be created in a garment during a textile production operation, (b) a region of increased stretch resistance to be created in a garment during a textile production operation, and (c) a region of decreased stretch resistance to be created in a garment during a textile production operation.

Clause 234. The apparatus according to any one of Clauses 227 to 233, wherein the garment design input data includes a first bitmap, wherein a first dimension of the first bitmap corresponds to a number of cylinders in a braiding machine to be used to form the garment, and wherein a second dimension of the first bitmap corresponds to a cross-sectional location of the garment to be formed.

Clause 235. The apparatus according to Clause 234, wherein individual bits of the first bitmap correspond to an action to be performed by an individual cylinder of the braiding machine at a specific location when forming the garment.

Clause 236. The apparatus according to Clause 235, wherein the actions include a member selected from the group consisting of: a left rotation action, a right rotation action, and a no rotation action.

Clause 237. The apparatus according to Clause 235 or 236, wherein individual bits of the first bitmap include one of a plurality of different colors, wherein the color, at least in part, identifies the action to be performed by the individual cylinder of the braiding machine at the specific location corresponding to the respective individual bit.

Clause 238. The apparatus according to any one of Clauses 227 to 237, wherein when creating the revised garment design, the instructions, when executed, cause the apparatus to create the revised garment design input data as a second bitmap, wherein a first dimension of the second bitmap corresponds to a number of cylinders in a braiding machine to be used to form the garment, and wherein a second dimension of the second bitmap corresponds to a cross-sectional location of the garment to be formed.

Clause 239. The apparatus according to Clause 238, wherein individual bits of the second bitmap correspond to an action to be performed by an individual cylinder of the braiding machine at a specific location when forming the garment.

Clause 240. The apparatus according to Clause 239, wherein the actions to be performed by the individual needle of the textile production machine at the specific location when forming the garment include a member selected from the group consisting of: a left rotation action, a right rotation action, and a no rotation action.

Clause 241. The apparatus according to Clause 239 or 240, wherein individual bits of the second bitmap include one of a plurality of different colors, wherein the color, at least in part, identifies the action to be performed by the individual cylinder of the braiding machine at the specific location corresponding to the respective individual bit when forming the garment.

Clause 242. The apparatus according to any one of Clauses 227 to 233, wherein the garment design input data includes at least one of: pin-to-pin movement direction information for a winding machine; winding machine dispenser head movement direction information; and pin winding direction information.

Clause 243. The apparatus according to any one of Clauses 227 to 242, wherein after receiving the design input for one or more changes to the garment design, the instructions, when executed, cause the computing device to apply rules to limit or control at least one of: the size of the first textile structural unit created in the garment design; the position of the first textile structural unit created in the garment design; the size of the second textile structural unit created in the garment design; the position of the second textile structural unit created in the garment design; the relative positioning of the first textile structural unit with respect to the second textile structural unit created in the garment design; the relative positioning of the first textile structural unit with respect to another textile structural unit created in the garment design; the relative positioning of the second textile structural unit with respect to another textile structural unit created in the garment design; and a total number of knit structural units in the garment design.

Clause 244. The apparatus according to any one of Clauses 227 to 242, wherein after receiving the design input for one or more changes to the garment design, the instructions, when executed, cause the computing device to apply rules to limit or control at least one of: an overall weight of the garment design based on the received design input; a weight of a first portion of the garment design based on the received design input; an air permeability of a first portion of the garment design based on the received design input; and a stretch resistance of a first portion of the garment design based on the received design input.

Clause 245. The apparatus according to any one of Clauses 227 to 244, wherein, in the step of receiving the garment design input data for the garment design, the instructions cause the apparatus to receive garment design data and generate the garment design input data from the garment design data.

Clause 246. The apparatus according to Clause 245, wherein the garment design data includes data from a three dimensional rendering of the garment design.

Clause 247. A method of manufacturing articles of apparel, comprising:
transmitting data to a computing system for: (a) generating a rating system on the computing system for evaluating a first property of a first article of apparel, wherein the first article of apparel includes a garment design having a first textile structural component with a first textile structural unit at a first location in the garment design, and (b) requesting input through the computing system of a customer-selected rating of the first property;
receiving data from the computing system including the customer-selected rating of the first property;
creating revised garment design input data for the garment design based on the data including the customer-selected rating of the first property, wherein the revised garment design input data includes at least one of: changes to a size of the first textile structural unit in the garment design; changes to a position of the first textile structural unit in the garment design; changes to a relative positioning of the first textile structural unit with respect to one or more other textile structural units in the garment design; addition of one or more additional first textile structural units to the garment design; addition of one or more second textile structural units different from the first textile structural unit to the garment design; or elimination of one or more textile structural units from the garment design;
forming a second textile structural component for a second article of apparel based on the revised garment design input data; and
providing a user with the second article of apparel including the second textile structural component made based on the revised garment design input data.

Clause 248. A method of manufacturing articles of apparel, comprising:
manufacturing a first article of apparel, wherein the first article of apparel includes a garment design having a first textile structural component with a first textile structural unit at a first location in the garment design;
providing a user with the first article of apparel;
transmitting data to a computing system for: (a) generating a rating system on the computing system for evaluating a first property of the first article of apparel, and (b) requesting input through the computing system of a customer-selected rating of the first property;

receiving data from the computing system including the customer-selected rating of the first property;

creating revised garment design input data for the garment design based on the data including the customer-selected rating of the first property, wherein the revised garment design input data includes at least one of: changes to a size of the first textile structural unit in the garment design; changes to a position of the first textile structural unit in the garment design; changes to a relative positioning of the first textile structural unit with respect to one or more other textile structural units in the garment design; addition of one or more additional first textile structural units to the garment design; addition of one or more second textile structural units different from the first textile structural unit to the garment design; or elimination of one or more textile structural units from the garment design;

forming a second textile structural component based on the revised garment design input data;

manufacturing a second article of apparel including the second textile structural component; and providing the user with the second article of apparel.

Clause 249. The method according to Clause 247 or Clause 248, wherein the data transmitted to the computing system for generating the rating system on the computing system includes an application program for generating the rating system on a mobile computer device.

Clause 250. The method according to Clause 249, wherein the data transmitted to the computing system for generating the rating system on the computing system includes data for generating a rating system having a sliding scale for rating the first property.

Clause 251. The method according to any one of Clauses 247 to 250, wherein the step of generating the rating system includes providing a graphical user interface on the computing system through which the user can input information regarding the first property.

Clause 252. A method of manufacturing articles of apparel, comprising:

manufacturing a first article of apparel, wherein the first article of apparel includes a garment design having a first textile structural component with a first textile structural unit at a first location in the garment design;

providing the first article of apparel to a customer, the customer being associated with customer identification information;

designating the first article of apparel as being owned by the customer associated with the customer identification information;

providing an evaluation system for evaluating a first property of the first article of apparel;

receiving a customer-selected evaluation of the first property;

designating the customer-selected evaluation as being received from the customer associated with the customer identification information;

creating revised garment design input data for the garment design based on the data including the customer-selected evaluation of the first property, wherein the revised garment design input data includes at least one of: changes to a size of the first textile structural unit in the garment design; changes to a position of the first textile structural unit in the garment design; changes to a relative positioning of the first textile structural unit with respect to one or more other textile structural units in the garment design; addition of one or more additional first textile structural units to the garment design; addition of one or more second textile structural units different from the first textile structural unit to the garment design; or elimination of one or more textile structural units from the garment design;

forming a second textile structural component based on the revised garment design input data;

manufacturing a second article of apparel including the second textile structural component;

providing the user with the second article of apparel; and designating the second article of apparel as being owned by the customer associated with the customer identification information.

Clause 253. A method of manufacturing articles of apparel, comprising:

associating a cycle length with a customer;

manufacturing a first article of apparel, wherein the first article of apparel includes a garment design having a first textile structural component with a first textile structural unit at a first location in the garment design;

providing the first article of apparel to a customer, the customer being associated with customer identification information;

designating the first article of apparel as being owned by the customer associated with the customer identification information;

providing an evaluation system for evaluating a first property of the first article of apparel;

receiving a customer-selected evaluation of the first property;

designating the customer-selected evaluation as being received from the customer associated with the customer identification information;

creating revised garment design input data for the garment design based on the data including the customer-selected evaluation of the first property, wherein the revised garment design input data includes at least one of: changes to a size of the first textile structural unit in the garment design; changes to a position of the first textile structural unit in the garment design; changes to a relative positioning of the first textile structural unit with respect to one or more other textile structural units in the garment design; addition of one or more additional first textile structural units to the garment design; addition of one or more second textile structural units different from the first textile structural unit to the garment design; or elimination of one or more textile structural units from the garment design;

forming a second textile structural component based on the revised garment design input data;

manufacturing a second article of apparel including the second textile structural component;

providing the user with the second article of apparel when the cycle length is satisfied; and designating the second article of apparel as being owned by the customer associated with the customer identification information.

Clause 254. The method according to Clause 252 or Clause 253, wherein the evaluation system is provided as an application running on a mobile computing device.

Clause 255. The method according to Clause 252 or Clause 253, wherein the evaluation system is provided as a web application.

Clause 256. The method according to any one of Clauses 252 to 255, further comprising instructing the customer to wait at least a predetermined time period after receiving the first article of apparel before submitting any evaluations of the first article of apparel.

Clause 257. The method according to Clause 256, wherein the predetermined time period is at least one day.

Clause 258. The method according to Clause 256, wherein the predetermined time period is at least two weeks.

Clause 259. The method according to any one of Clauses 247 to 258, wherein the first property of the first article of apparel includes at least one of: a thermal resistivity property of the first article of apparel; an air permeability property of the first article of apparel; a fit property of the first article of apparel; a support property of the first article of apparel; a moisture management property of the first article of apparel; a weight property of the first article of apparel; a stretch resistance property of the first article of apparel; and a wear resistance property of the first article of apparel.

Clause 260. The method according to any one of Clauses 247 to 259, wherein the first textile structural unit is a member selected from the group consisting of:

- textile structure formed around an open hole;
- texture on at least one surface;
- pleats;
- ribbed structures;
- areas of increased material thickness (e.g., as compared to a thickness of a surrounding area and/or a thickness of a largest proportion of the continuous textile structure);
- areas of decreased material thickness (e.g., as compared to a thickness of a surrounding area and/or a thickness of a largest proportion of the continuous textile structure);
- areas of increased thermal conductivity (e.g., as compared to a thermal conductivity of a surrounding area and/or a thermal conductivity of a largest proportion of the continuous textile structure);
- areas of decreased thermal conductivity (e.g., as compared to a thermal conductivity of a surrounding area and/or a thermal conductivity of a largest proportion of the continuous textile structure);
- areas of increased air permeability (e.g., as compared to an air permeability of a surrounding area and/or an air permeability of a largest proportion of the continuous textile structure);
- areas of decreased air permeability (e.g., as compared to an air permeability of a surrounding area and/or an air permeability of a largest proportion of the continuous textile structure);
- areas of increased moisture wicking capability (e.g., as compared to a moisture wicking capability of a surrounding area and/or a moisture wicking capability of a largest proportion of the continuous textile structure);
- areas of decreased moisture wicking capability (e.g., as compared to a moisture wicking capability of a surrounding area and/or a moisture wicking capability of a largest proportion of the continuous textile structure);
- areas of increased stretchability (e.g., as compared to a stretchability of a surrounding area and/or a stretchability of a largest proportion of the continuous textile structure);
- areas of decreased stretchability (e.g., as compared to a stretchability of a surrounding area and/or a stretchability of a largest proportion of the continuous textile structure);
- areas of increased durability (e.g., as compared to a durability of a surrounding area and/or a durability of a largest proportion of the continuous textile structure);
- areas of decreased durability (e.g., as compared to a durability of a surrounding area and/or a durability of a largest proportion of the continuous textile structure);
- areas of increased material density (e.g., as compared to a material density of a surrounding area and/or a material density of a largest proportion of the continuous textile structure);
- areas of decreased material density (e.g., as compared to a material density of a surrounding area and/or a material density of a largest proportion of the continuous textile structure);
- areas of increased hydrophobicity (e.g., as compared to a hydrophobicity of a surrounding area and/or a hydrophobicity of a largest proportion of the continuous textile structure);
- areas of decreased hydrophobicity (e.g., as compared to a hydrophobicity of a surrounding area and/or a hydrophobicity of a largest proportion of the continuous textile structure); and
- areas having a surface texture that differs from a surface texture of a surrounding area and/or from a surface texture of a largest proportion of the continuous textile structure.

The invention claimed is:

1. A method comprising:

creating garment design input data for a garment design, wherein creating the garment design input data includes modifying an initial generic design based at least in part on body map data, wherein the garment design input data includes data representing a first textile structural unit at a first location in the garment design and data representing a second textile structural unit at a second location in the garment design, wherein a structure of the first textile structural unit differs from a structure of the second textile structural unit based on the body map data, wherein the garment design input data includes a first bitmap, wherein a first dimension of the first bitmap corresponds to a number of knitting needles in a first textile production machine to be used to form a first garment, and wherein a second dimension of the first bitmap corresponds to a number of courses to be knitted to form the first garment;

forming the first garment using the first textile production machine, wherein during the forming step, operation of the first textile production machine is controlled using a textile production machine instruction data set to create the first textile structural unit at a first location in the first garment and to create the second textile structural unit at a second location in the first garment based on the garment design input data;

receiving additional body map data relating to the first garment, wherein the additional body map data includes thermal scan data;

identifying, using a translation module, changes to the first garment based on the additional body map data, wherein the identifying of the changes includes determining a first modification to the first textile structural unit and a second modification to the second textile structural unit based on the additional body map data, wherein the first modification includes a modification to a first textile property specific to the additional body map data and the second modification includes a modification to a second textile property specific to the additional body map data, and wherein at least one of the first modification and the second modification includes a zone of at least one of: air permeability, thermal insulation, moisture wicking, and hydrophobicity, and wherein each zone is determined based on the thermal scan data;

creating revised garment design input data for the garment design, wherein the revised garment design input data includes the changes identified using the translation module based on the additional body map data; and forming a second garment using at least one of the first textile production machine or a second textile production machine, wherein during the step of forming the second garment, operation of the first textile production machine and/or the second textile production machine is controlled using a revised textile production machine instruction data set to create the second garment corresponding to the revised garment design input data including the changes based on the additional body map data.

2. The method according to claim 1, wherein forming the first garment includes:

generating the textile production machine instruction data set based on the garment design input data; and transmitting the textile production machine instruction data set to the first textile production machine.

3. The method according to claim 2, wherein forming the second garment includes:

generating the revised textile production machine instruction data set based on the revised garment design input data; and transmitting the revised textile production machine instruction data set to at least one of the first textile production machine or the second textile production machine.

4. The method according to claim 1, further comprising: scanning at least a portion of a user's body to generate the body map data.

5. The method according to claim 1, wherein the changes based on the additional body map data include at least one of: a size of the first textile structural unit in the garment design, a position of the first textile structural unit in the garment design, a size of the second textile structural unit in the garment design, a position of the second textile structural unit in the garment design, a relative positioning of the first textile structural unit with respect to the second textile structural unit in the garment design, a relative positioning of the first textile structural unit with respect to another textile structural unit in the garment design, a relative positioning of the second textile structural unit with respect to another textile structural unit in the garment design, and a total number of textile structural units in the garment design.

6. The method according to claim 1, wherein each individual bit of the first bitmap corresponds to an individual action to be performed by an individual needle of the first textile production machine at a specific location when knitting the first garment.

7. The method according to claim 6, wherein each individual action includes one of: a knit action, a tuck action, a miss action, or a transfer action.

8. The method according to claim 1, wherein the revised garment design input data includes a second bitmap, wherein a first dimension of the second bitmap corresponds to a number of knitting needles in the first textile production machine or the second textile production machine to be used to form the second garment, and wherein a second dimension of the second bitmap corresponds to a number of courses to be knitted to form the second garment.

9. The method according to claim 8, wherein each individual bit of the second bitmap corresponds to an individual action to be performed by an individual needle of the first textile production machine or the second textile production machine at a specific location when forming the second garment.

10. A method comprising:

creating garment design input data for a garment design, wherein the garment design input data is created at least in part from body map data, and wherein the garment design input data includes data representing a first knit structural unit and data representing a second knit structural unit, wherein a structure of the first knit structural unit differs from a structure of the second knit structural unit based on the body map data, wherein the garment design input data includes a first bitmap, wherein a first dimension of the first bitmap corresponds to a number of knitting needles in a row of needles of a first knitting machine, and wherein a second dimension of the first bitmap corresponds to a number of courses to be knitted to form a first garment;

knitting the first garment using the first knitting machine, wherein during the knitting step, operation of the first knitting machine is controlled using a knitting machine instruction data set to create the first knit structural unit at at least a first location in the first garment and to create the second knit structural unit at at least a second location in the first garment based on the garment design input data;

receiving an evaluation of the first garment from an interaction with an interface element;

receiving thermal scan data relating to the first garment;

based on the evaluation of the first garment and the thermal scan data relating to the first garment, identifying, using a translation module, changes to the first garment, wherein the identifying of the changes includes determining a first modification to the first knit structural unit and a second modification to the second knit structural unit based on the evaluation, wherein the first modification includes a modification to a first textile property and the second modification includes a modification to a second textile property, and wherein at least one of the first modification and the second modification includes a zone of at least one of: air permeability, thermal insulation, moisture wicking, and hydrophobicity, and wherein each zone is determined based on the thermal scan data;

creating revised garment design input data for the garment design based on the first garment created in the knitting step, wherein the revised garment design input data includes the changes identified using the translation module; and knitting a second garment using at least one of the first knitting machine or a second knitting machine, wherein during the step of knitting the second garment, operation of the first knitting machine and/or the second knitting machine is controlled using a revised knitting machine instruction data set to create the second garment corresponding to the revised garment design input data including the changes.

11. The method according to claim 10, further comprising: scanning at least a portion of a user's body to generate the body map data.

12. The method according to claim 10, wherein each individual bit of the first bitmap corresponds to an individual action to be performed by an individual needle of the first knitting machine at a specific location when knitting the first garment.

13. The method according to claim 12, wherein each individual action includes one of: a knit action, a tuck action, a miss action, or a transfer action.

14. The method according to claim 10, wherein the revised garment design input data includes a second bitmap, wherein a first dimension of the second bitmap corresponds to a number of knitting needles in a row of needles of at least one of the first knitting machine or the second knitting machine, and wherein a second dimension of the second bitmap corresponds to a number of courses to be knitted to form the second garment.

15. The method according to claim 14, wherein each individual bit of the second bitmap corresponds to an individual action to be performed by an individual needle of the first knitting machine or the second knitting machine at a specific location when knitting the second garment.

16. The method according to claim 10, further comprising:

displaying a first visual representation of the garment design corresponding to the garment design input data on a display screen;

receiving data corresponding to the changes desired for the revised garment design input data; and displaying a second visual representation of the garment design corresponding to the revised garment design input data on the display screen.

17. The method according to claim 10, wherein the step of creating the revised garment design input data includes applying rules to limit or control at least one of: a size of the first knit structural unit created in the revised garment design input data; a position of the first knit structural unit created in the revised garment design input data; a size of the second knit structural unit created in the revised garment design input data; a position of the second knit structural unit created in the revised garment design input data; a relative positioning of the first knit structural unit with respect to the second knit structural unit created in the revised garment design input data; a relative positioning of the first knit structural unit with respect to another knit structural unit created in the revised garment design input data; a relative positioning of the second knit structural unit with respect to another knit structural unit created in the revised garment design input data; and a total number of knit structural units in the revised garment design input data.

18. The method according to claim 10, wherein the first knit structural unit includes a plurality of occurrences, and wherein the step of creating the revised garment design input data includes applying rules to limit or control at least one of: a distance between two occurrences of the first knit structural unit in the revised garment design input data; a number of knit stitch actions between two occurrences of the first knit structural unit in the revised garment design input data; a distance between the first knit structural unit and another knit structural unit in the revised garment design input data; a number of knit stitch actions between the first knit structural unit and another knit structural unit in the revised garment design input data; a maximum number of consecutive occurrences in one dimension of a specific needle action in the revised garment design input data; and a minimum number of consecutive occurrences in one dimension of a specific needle action in the revised garment design input data.

19. The method according to claim 10, wherein knitting the first garment includes:

generating the knitting machine instruction data set based on the garment design input data; and transmitting the knitting machine instruction data set to the first knitting machine, and wherein knitting the second garment includes:

generating the revised knitting machine instruction data set based on the revised garment design input data; and transmitting the revised knitting machine instruction data set to at least one of the first knitting machine or the second knitting machine.

20. A method of manufacturing comprising:

creating garment design input data for a garment design, wherein creating the garment design input data includes modifying an initial generic design based at least in part on body map data, and wherein the garment design input data includes data representing a first textile structural unit at a first location in the garment design and data representing a second textile structural unit at a second location in the garment design, wherein a structure of the first textile structural unit differs from a structure of the second textile structural unit based on the body map data;

receiving, from a scanner, additional body map data relating to the garment input design data, wherein the additional body map data includes thermal scan data;

identifying, using a translation module, changes to the garment design based on the additional body map data, wherein the identifying of the changes includes determining a first modification to the first textile structural unit and a second modification to the second textile structural unit based on the additional body map data, wherein the first modification includes a modification to a first textile property specific to the additional body map data and the second modification includes a modification to a second textile property specific to the additional body map data, and wherein at least one of the first modification and the second modification includes a zone of at least one of: air permeability, thermal insulation, moisture wicking, and hydrophobicity, and wherein each zone is determined based on the thermal scan data;

creating revised garment design input data for the garment design, wherein the revised garment design input data includes the changes identified using the translation module based on the additional body map data, wherein the changes based on the additional body map data include at least one of: a size of the first textile structural unit in the garment design, a position of the first textile structural unit in the garment design, a size of the second textile structural unit in the garment design, a position of the second textile structural unit in the garment design, a relative positioning of the first textile structural unit with respect to the second textile structural unit in the garment design, a relative positioning of the first textile structural unit with respect to another textile structural unit in the garment design, a relative positioning of the second textile structural unit with respect to another textile structural unit in the garment design, and a total number of textile structural units in the garment design; and forming a garment using at least one textile production machine, wherein during the step of forming the garment, operation of the textile production machine is controlled using a revised textile production machine instruction data set to create the garment corresponding to the revised garment design input data including the changes based on the additional body map data.

\* \* \* \* \*